(12) United States Patent
Dorris et al.

(10) Patent No.: US 10,011,528 B2
(45) Date of Patent: Jul. 3, 2018

(54) COMPOSITIONS, PANELS AND SHEETS COMPRISING MINERAL FILLERS AND METHODS TO PRODUCE THE SAME

(71) Applicant: FPInnovations, Pointe-Claire (CA)

(72) Inventors: Gilles Dorris, Vimont (CA); Yuxia Ben, Kirkland (CA); Qiaozhi An, Montréal (CA); Annie Dorris, Montréal (CA); Xiaoyu Wang, Saint-Laurent (CA)

(73) Assignee: FPINNOVATIONS, Pointe-Claire (CA)

( * ) Notice: Subject to any disclaimer, the term of this patent is extended or adjusted under 35 U.S.C. 154(b) by 126 days.

(21) Appl. No.: 14/876,244

(22) Filed: Oct. 6, 2015

(65) Prior Publication Data

US 2016/0102018 A1    Apr. 14, 2016

Related U.S. Application Data

(60) Provisional application No. 62/062,614, filed on Oct. 10, 2014.

(51) Int. Cl.

| | | |
|---|---|---|
| *B32B 3/12* | (2006.01) | |
| *B32B 3/28* | (2006.01) | |
| *B32B 13/02* | (2006.01) | |
| *C04B 16/02* | (2006.01) | |
| *C04B 16/12* | (2006.01) | |
| *B32B 13/04* | (2006.01) | |
| *C04B 28/14* | (2006.01) | |
| *C04B 111/00* | (2006.01) | |

(52) U.S. Cl.
CPC ............. *C04B 16/02* (2013.01); *B32B 3/12* (2013.01); *B32B 3/28* (2013.01); *B32B 13/02* (2013.01); *B32B 13/04* (2013.01); *C04B 16/12* (2013.01); *C04B 28/14* (2013.01); *B32B 2262/062* (2013.01); *B32B 2307/54* (2013.01); *B32B 2307/546* (2013.01); *B32B 2307/718* (2013.01); *B32B 2307/72* (2013.01); *B32B 2607/00* (2013.01); *C04B 2111/0062* (2013.01); *Y02W 30/97* (2015.05)

(58) Field of Classification Search
None
See application file for complete search history.

(56) References Cited

U.S. PATENT DOCUMENTS

| | | | |
|---|---|---|---|
| 3,201,926 A | 8/1965 | Harrington | |
| 3,658,750 A | 4/1972 | Tsukui et al. | |
| 3,796,786 A | 3/1974 | Koch et al. | |
| 3,993,822 A | 11/1976 | Knauf et al. | |
| 4,148,781 A | 4/1979 | Narukawa et al. | |
| 4,238,546 A | 12/1980 | Phillips | |
| 4,255,480 A | 3/1981 | Scher et al. | |
| 4,459,272 A | 7/1984 | Krieg et al. | |
| 4,713,138 A | 12/1987 | Ungar et al. | |
| 5,001,005 A | 3/1991 | Blanpied | |
| 5,320,677 A | 6/1994 | Baig | |
| 5,466,511 A | 11/1995 | O'Dell et al. | |
| 5,643,510 A | 7/1997 | Sucech | |
| 5,672,188 A | 9/1997 | Choi | |
| 5,714,067 A | 2/1998 | Sorrick | |
| 5,714,076 A | 2/1998 | Tanghe | |
| 5,785,725 A | 7/1998 | Cusick et al. | |
| 5,922,447 A | 7/1999 | Baig | |
| 5,948,344 A | 9/1999 | Cusick et al. | |
| 6,372,004 B1 | 4/2002 | Schultink et al. | |
| 6,555,489 B1 | 4/2003 | Pfeffer | |
| 6,743,273 B2 | 6/2004 | Chung et al. | |
| 6,872,311 B2 | 3/2005 | Koslow | |
| 6,924,028 B2 | 8/2005 | Chung et al. | |
| 7,179,317 B2 | 2/2007 | Chung et al. | |
| 7,318,852 B2 | 1/2008 | Chung et al. | |
| 7,582,132 B2 | 9/2009 | Jaffee | |
| 7,608,125 B2 | 10/2009 | Jaffee | |
| 7,731,794 B2 | 6/2010 | Yu et al. | |
| 7,989,370 B2 | 8/2011 | Currier et al. | |
| 7,993,427 B2 | 8/2011 | Hassmann et al. | |
| 8,034,203 B2 | 10/2011 | Xu et al. | |

(Continued)

FOREIGN PATENT DOCUMENTS

| | | |
|---|---|---|
| CA | 2367593 | 4/2002 |
| CA | 2799123 | 11/2011 |

(Continued)

OTHER PUBLICATIONS

Crotogino et al., "Paprican's New Pilot Paper Machine", Pulp & Paper Canada, vol. 101, No. 10, 2000, pp. 48-52.
English Abstract of USRE44070 (E1), "Composite light weight gypsum wallboard", published on Mar. 12, 2013.
T. Michelsen, "Building Materials (Survey)", Encyclopedia of Chemical Technology, (1992, 4th ed.), vol. 21, pp. 621-624.
Singh et al., "Calcium sulphate hemihydrate hydration leading to gypsum crystallization", Progress in Crystal Growth and Characterization of Minerals, 53 (2007) 57-77.
English Abstract of CN103396654(A), "Cellulose nano-fibril/epoxy resin composite film preparation method", published on Nov. 20, 2013.

(Continued)

*Primary Examiner* — David J Buttner
(74) *Attorney, Agent, or Firm* — Bereskin & Parr LLP/S.E.N.C.R.L., s.r.l.

(57) ABSTRACT

There are provided gypsum panels, sheets and multi-layer sheets as well as methods of preparation thereof. For example, there are provided cellulose filament-reinforced gypsum panels, sheets and multi-layer sheets and methods of preparation thereof. For example, in such gypsum panels, sheets and multi-layer sheets gypsum is bound with cellulose filaments to strengthen the gypsum panels, sheets and multi-layer sheets. The cellulose filament-reinforced gypsum panel can be, for example, a core comprising a honeycomb or corrugated structure. There are also provided aqueous suspensions comprising cellulose filaments and $CaSO_4 \cdot 2H_2O$.

5 Claims, 31 Drawing Sheets

(56) References Cited

U.S. PATENT DOCUMENTS

| | | |
|---|---|---|
| 8,118,901 B2 | 2/2012 | Chung et al. |
| 8,303,693 B2 | 11/2012 | Leung |
| 8,658,287 B2 | 2/2014 | Berglund et al. |
| 8,720,450 B2 | 5/2014 | Sebastian |
| 8,940,073 B2 | 1/2015 | Schmidt |
| 2002/0017222 A1 | 2/2002 | Luongo |
| 2003/0219580 A1 | 11/2003 | Tagge et al. |
| 2004/0168779 A1 | 9/2004 | Silenius et al. |
| 2008/0160294 A1 | 7/2008 | Baig et al. |
| 2008/0223258 A1 | 9/2008 | Bruce et al. |
| 2010/0065236 A1 | 3/2010 | Henriksson et al. |
| 2011/0132560 A1* | 6/2011 | Turkki .............. C01F 11/466 162/181.3 |
| 2011/0277947 A1 | 11/2011 | Hua et al. |
| 2012/0080156 A1* | 4/2012 | Laleg et al. .......... D21H 11/18 162/158 |
| 2012/0152859 A1 | 6/2012 | Battenfeld et al. |
| 2012/0204527 A1 | 8/2012 | Chung et al. |
| 2013/0008853 A1 | 1/2013 | Dallas et al. |
| 2013/0017394 A1 | 1/2013 | Hua et al. |
| 2013/0180167 A1 | 7/2013 | Benim et al. |
| 2013/0233789 A1 | 9/2013 | Parker |
| 2014/0272352 A1 | 9/2014 | Tilton |
| 2014/0288296 A1 | 9/2014 | Qi et al. |
| 2015/0033983 A1 | 2/2015 | Bilodeau et al. |
| 2015/0275433 A1 | 10/2015 | Dorris et al. |

FOREIGN PATENT DOCUMENTS

| | | | |
|---|---|---|---|
| JP | 61101438 | * | 5/1986 |
| JP | 06056498 | * | 3/1994 |
| WO | 0028809 | | 5/2000 |
| WO | 2011134939 | | 11/2011 |
| WO | 2011140643 | | 11/2011 |
| WO | 2012032514 | | 3/2012 |
| WO | 2012097446 | | 7/2012 |
| WO | 2014029917 | | 2/2014 |
| WO | 2014164127 | | 10/2014 |

OTHER PUBLICATIONS

English Abstract of EP2563966(A1), "Process for the manufacture of structured materials using nano-fibrillar cellulose gels", published on Mar. 6, 2013.

English Abstract of EP2569468(A1), "Cellulose nanofilaments and method to produce same", published on Mar. 20, 2013.

English Abstract of EP2613935(A1), "Cellulose-based composite materials", published on Jul. 17, 2013.

English Abstract of JP2004105146(A), "Filter for smoking", published on Apr. 8, 2004.

English Abstract of JP2010115574(A), "Functional filter", published on May 27, 2010.

English Abstract of JP2013076177(A), "Nonwoven fabric, method for producing the same and method for enhancing gas permeability of the same", published on Apr. 25, 2013.

English Abstract of RU2209864(C2), "Method for manufacture of filtering material", published on Aug. 10, 2003.

English Abstract of WO2012017953(A1), "Non-woven fabric comprising cellulose fibers, and separator for electrical storage element", published on Feb. 9, 2012.

Heli Kangas, "Guide to cellulose nanomaterials—English summary", published on Oct. 31, 2014.

Hsiao et al., "Highly Efficient Nanofibrous Membranes based on Hierarchical Nanofiber Structure", (Jan. 2010).

* cited by examiner

A

B

A

B

C

D

A

B

C

A

B

C

A

B

A

B

C

A

B

A

B

A

B

① ② ③

A

B

A

B

A

B

COMPOSITIONS, PANELS AND SHEETS COMPRISING MINERAL FILLERS AND METHODS TO PRODUCE THE SAME

The present application claims priority to U.S. provisional application 62/062,614, filed on Oct. 10, 2014, and which is hereby incorporated by reference in its entirety.

The present disclosure relates to gypsum panels, sheets and multi-layer sheets as well as methods of preparation thereof. For example, it relates to cellulose filament-reinforced gypsum panels, sheets and multi-layer sheets as well as methods of preparation thereof. For example, $CaSO_4.2H_2O$ (gypsum) crystals are bound with cellulose filaments to strengthen the gypsum panel, sheet or multi-layer sheet. For example, the concept of cellulose filament-reinforcing can be used for the skin and/or core of gypsum panels, for light-weight gypsum panels having a foamed core portion, or for honeycomb or corrugated structures used to manufacture novel types of panels. The present disclosure also relates to aqueous suspensions comprising cellulose filaments and $CaSO_4.2H_2O$.

In the construction industry, wallboard, also known, for example as plasterboard, drywall, gypsum board and/or sold under the trademarks of SHEETROCK®, GYPROCK® plasterboard or GIB® board is typically formed of a gypsum core interleaved between two facing layers which may be called, for example surface paper, face/facing paper, paperless, skin, shell or envelope.

The constituents in conventional gypsum board are, for example, gypsum (8.326 kg/m$^2$; 1.705 lb/ft$^2$; 85 wt %), paper (0.981 kg/m$^2$; 0.201 lb/ft$^2$; 10 wt %), additives (0.294 kg/m$^2$; 0.060 lb/ft$^2$; 3 wt %) and starch (0.196 kg/m$^2$; 0.040 lb/ft$^2$; 2 wt %). Data for the production of each of these raw materials comes from both the U.S. LCI Database and SimaPro.

Drywall may be used, for example as a fire retardant panel for interior walls and/or ceilings in residential and/or commercial buildings, and has replaced the older wet plaster walls technology due, for example to its lower manufacturing and installation costs as well as ease to repair.

However, a known property of drywall which may, for example, be a shortcoming is its weight. For example, a standard 4'-by-8' sheet of ½" drywall may weigh more than about 50 pounds (23 kg) and a ⅝" sheet of drywall, which is used, for example, to achieve fire ratings, typically weighs over about 70 pounds (32 kg). Depending on their dimensions, special types of drywall including moisture resistant products are often even heavier. Another known potential disadvantage to drywall is that it is not as flexible as plaster, so that, for example, installation on curved surfaces may be challenging. Also, drywall being thinner and having joints whereas plaster does not is typically more prone to dents and holes than plaster.

Certain known methods for the production of gypsum wallboard generally are described, for example, by T. Michelsen, "Building Materials (Survey)", Encyclopedia of Chemical Technology, (1992, 4$^{th}$ ed.), vol. 21, pp. 621-24. The basic chemistry of calcium sulfate is introduced, for example, by A. Lancia et al., "Calcium Sulfate", Encyclopedia of Chemical Technology, (2004, 5$^{th}$ ed.), vol. 4, pp. 581-602, John Wiley & Sons, Hoboken, N.J.).

Known methods for producing gypsum wallboard comprise sandwiching a solid gypsum core made from an aqueous slurry prepared from calcium sulfate hemihydrate, (also referred to, for example, as calcined gypsum, stucco or plaster of Paris), between two sheets of a facing material, for example heavy papers. In certain known methods, gypsum wallboard is manufactured continuously at a high speed by continuously depositing the aqueous slurry prepared from calcined gypsum and other ingredients onto one of the two facing sheets and then bringing the second facing sheet into contact with the free surface of the gypsum slurry to form a sandwich-like structure. Generally, a wide variety of natural or synthetic calcined gypsum can be used for the preparation of a gypsum suspension which is inserted between the two skins.

A conventional process for manufacturing the core composition of gypsum wallboard initially includes the premixing of dry ingredients in a high-speed mixing apparatus. The dry ingredients can include calcium sulfate hemihydrate, an accelerator, and a binder (e.g., starch). The dry ingredients are then, for example mixed together with a portion of the aqueous core composition in a pin mixer apparatus. The wet portion can include a first component that includes, for example a mixture of water, paper pulp, and, optionally, a rheology modifier, and a set retarder. The paper pulp solution provides a major portion of the water that forms the gypsum slurry of the core composition. A second wet component can include, for example a mixture of foam and other conventional additives, if desired. Together, the dry and wet portions comprise an aqueous gypsum slurry that forms a core composition. After the core composition has set (i.e., reacted with water present in the aqueous suspension) and dried, the formed sheet is cut into standard sizes. The mechanical properties of the hardened mass after setting and drying depend, for example, in large part on growth and interlocking crystals of the hydrated hemihydrate in the form of needles and plates; crystal morphology can be altered via changes in hydration conditions and by the presence or absence of chemical additives in the core composition, as taught by Singh et al. (Progress in Crystal Growth and Characterization of Materials, 53, 57-77, 2007). Walls and ceilings made with gypsum wallboard panels typically are constructed by securing, e.g., with nails or screws, the wallboard panels to structural members, such as vertically- and horizontally-oriented pieces of steel or wood often referred to as "studs".

Cores of the gypsum sandwich assembly have been faced with a variety of different materials, including but not limited to paper and fiberglass mats. Most common wallboard is produced by inserting a core made of an aqueous slurry prepared from calcined gypsum and other components between two sheets of board cover paper. Cellulose-based paper processing and characteristics for use in gypsum wallboard are disclosed, for example in U.S. Pat. No. 4,459,272 to Long and U.S. Pat. No. 8,034,203 to Xu et al. These patents teach, for example, that various types of cover or face paper like Manila and recycled newspaper and/or old corrugated containers are suitable for particular applications. Paperless drywall is a newer type of drywall that uses glass fibers for the skin(s) and/or the core instead of wood pulp in order to decrease mold growth while making it more resistant to dings, nicks and dents. Examples of such drywalls include those disclosed in, for example U.S. Pat. No. 3,993,822 to Knauf et al. and U.S. Pat. No. 7,989,370 to Currier. However, as the density of silica is higher than that of wood constituents, such drywalls may, for example, become heavier and more difficult to install and finish than those with cellulose-based facings.

Conventional gypsum wallboard, at a nominal thickness of ½ inch, typically is prepared at a weight between about 1600 to about 1800 pounds per 1,000 square feet (MSF) of board (about 7,800 kg to about 8,300 kg per thousand square meters). This corresponds to a board density of about 38 to about 43 lbs. per cu. ft. (about 0.61 to about 0.69 g/cm$^3$).

Many prior attempts have been made to both strengthen and lighten traditional wallboard products via a change of composition of the skin and/or the core of the panel, but, for example, this is often at the expense of increased costs and/or decreased performance of the finished product.

Efforts have been made to prepare lightweight gypsum panels, for example, in order to hasten and facilitate drywall installation and handling and/or to reduce transportation costs. Strategies to prepare lightweight panels have reduced the density of the core by a variety of methods. However, it may, for example be at the expense of the core strength which weakens significantly.

Lightweight or low density gypsum wallboard has been produced, for example, by entraining air bubbles into gypsum board core slurry and adding foaming surfactants. However, a lower density is usually obtained by sacrificing, for example, strength. Glass fiber and/or organic polymers have been added to gypsum to improve or compensate for the strength loss of these low density gypsum boards. Unfortunately, these synthetic products may cause, for example substantial additional costs and/or pollution to the environment.

To reduce the density of the core and therefore the overall weight of gypsum wallboard, the most widely used known methods involve the introduction of pre-generated foam containing entrained air into the gypsum slurry. Examples of such wall boards include those disclosed, for example, in U.S. Pat. No. 5,643,510 to Sucech, and U.S. Pat. No. 7,731,794 and RE 44,070 to Yu et al. The degree to which the density (and thus the weight) of a gypsum wallboard can be decreased is often limited, for example by the performance of the wallboard in the nail pull test, i.e. the amount of force required for the board to be pulled over the head of a nail. The volumetric fraction of air in the gypsum is generally restricted, because the strength of the wallboard core is reduced when the amount of air is increased beyond a certain level. Likewise, the ability of the board to withstand a nail pull through the board tends to be adversely effected when the core density is lowered.

Other known measures to reduce panel weight involve the usage of expanded monocellular volcanic ash such as perlite in the core composition but such expanded minerals were not added in gypsum wallboard beyond 2 to 3 percent because strength tests were significantly reduced in both nail pull and flexural break tests. When heated, these minerals have the property of expanding to form hollow spheres which, upon mixing with gypsum, promote the formation of air pockets which reduce board density by up to 40% as disclosed in U.S. Pat. No. 4,238,546 to Phillips, but at the expense of panel strength. To regain board strength and nail pull resistance, Baig disclosed in U.S. Pat. No. 5,922,447, the addition to the core composition, of cellulosic fibers in the range of 0.5 to 5.6% and starch in the range of 0.25 to 6%. Luoguo disclosed in U.S. Patent Application Publication No. 2002/0017222 that a strengthened permanent bond was established between synthetic binders and expanded mineral.

Cellulosic filaments (CF) are long and thin filaments of cellulose extracted from wood which may be, for example a naturally abundant, recyclable, degradable and/or non-toxic biomaterial. Cellulose fibrils can be, for example, extracted from parent fibers using mechanical and/or chemical and/or enzymatic treatments. Depending on the intensity of treatments, the fibrils may or not be attached to parent fibers and can have size ranges spanning the macro-, micro- and nano-metric size scales. One recently disclosed family of fibrils comprises a length of at least 100 μm, and a width of about 30 to about 300 nm, wherein the fibrils are physically detached from each other, and are substantially free of the parent cellulose fiber ("Cellulose Nanofilaments and Method to Produce Same. CA 2,799,123 to Hua, X. et al.). Large scale manufacturing of such filbrils recently renamed Cellulose Filaments (CF), can be accomplished by refining wood or plant fibers without chemicals or enzymes at a high to very high level of specific energy using high consistency refiners. (High Aspect Ratio Cellulose Nanofilaments and Method for their Production. WO 2012/097446, 2012 to Hua, X., et al.). They have superior reinforcement ability over cellulose microfibrils or nanofibrils such as microfibrillated cellulose (MFC) or nanofibrillated cellulose (NFC) prepared using other methods for the mechanical fibrillation of wood pulp fibers, because of their longer lengths and higher aspect ratio (i.e. up to 1000) as a result of their unique production process which minimizes fiber cutting. The material is produced at solids content exceeding 20% and up to 60% and can be transported in this form using impervious bags or alternatively as dry rolls, or shredded films made after their manufacturing on fast paper machine (U.S. application Ser. No. 13/105,120). Precipitated calcium sulfate dihydrate (PCS) has been studied for use in the papermaking industry, for example as a filler or a coating pigment to provide, for example useful optical and/or printing properties and/or to reduce the furnish cost of the sheet. However, the use of PCS as fillers in papermaking was limited due to its significant solubility in water, 2.4 g/L which may cause, for example, the loss of solid filler due to dissolution in systems other than a closed mill system. Some approaches to address this issue have been studied. For example, Tolnai and Kerr in CA 2,367,593 disclosed chemical methods to further reduce the solubility of water-insoluble needle-shaped precipitated calcium sulfate dihydrate for usage as a filler in papermaking. Starch or synthetic polymer resins have, for example, been co-added to PCS during papermaking to improve its retention.

It would thus be desirable to be provided, for example, with gypsum panels, sheets and multi-layer sheets, as well as methods of preparation thereof, that would at least partially solve one of the problems mentioned or that would be an alternative to the known gypsum panels, sheets and multi-layer sheets as well as to the known methods of preparation thereof.

Therefore according to an aspect of the present disclosure, there is provided a gypsum panel comprising $CaSO_4.2H_2O$ and cellulose filaments, the gypsum panel having a flexural strength (or flexural stress) of at least about 1.5 MPa when measured according to ASTM D790.

The present disclosure also includes a gypsum panel comprising $CaSO_4.2H_2O$ and cellulose filaments, the gypsum panel comprising a core portion having a density of less than about 0.50 g/cm$^3$.

The present disclosure also includes a sheet comprising cellulose filaments and $CaSO_4.2H_2O$, the sheet comprising at least about 0.1% of cellulose filaments by weight, based on the total weight of the cellulose filaments and the $CaSO_4.2H_2O$.

The present disclosure also includes a sheet comprising cellulose filaments and $CaSO_4.2H_2O$, the sheet comprising at least about 0.5% of cellulose filaments by weight, based on the total weight of the cellulose filaments and the $CaSO_4.2H_2O$.

The present disclosure also includes a sheet comprising cellulose filaments and $CaSO_4.2H_2O$, the sheet comprising at least about 1% of cellulose filaments by weight, based on the total weight of the cellulose filaments and the $CaSO_4.2H_2O$.

The present disclosure also includes a use of at least one sheet comprising cellulose filaments and $CaSO_4.2H_2O$, the sheet comprising at least about 1% of cellulose filaments by weight, based on the total weight of the cellulose filaments and the $CaSO_4.2H_2O$ of the present disclosure, in the manufacture of a multi-layer sheet.

The present disclosure also includes a use of at least one sheet comprising cellulose filaments and $CaSO_4.2H_2O$, the sheet comprising at least about 0.1% of cellulose filaments by weight, based on the total weight of the cellulose filaments and the $CaSO_4.2H_2O$ of the present disclosure, in the manufacture of a multi-layer sheet.

The present disclosure also includes a use of at least one sheet comprising cellulose filaments and $CaSO_4.2H_2O$, the sheet comprising at least about 1% of cellulose filaments by weight, based on the total weight of the cellulose filaments and the $CaSO_4.2H_2O$ of the present disclosure, in the manufacture of a gypsum panel.

The present disclosure also includes a use of at least one sheet comprising cellulose filaments and $CaSO_4.2H_2O$, the sheet comprising at least about 0.1% of cellulose filaments by weight, based on the total weight of the cellulose filaments and the $CaSO_4.2H_2O$ of the present disclosure, in the manufacture of a gypsum panel.

The present disclosure also includes a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$.

The present disclosure also includes a multi-layer sheet comprising cellulose filaments and $CaSO_4.2H_2O$, the multi-layer sheet comprising at least about 0.1% of cellulose filaments by weight, based on the total weight of the cellulose filaments and the $CaSO_4.2H_2O$.

The present disclosure also includes a gypsum panel comprising a first multi-layer sheet, a second multi-layer sheet and a core comprising a honeycomb or corrugated structure sandwiched between the first multi-layer sheet and the second multi-layer sheet, the first multi-layer sheet, the second multi-layer sheet and the honeycomb or corrugated structure each comprising cellulose filaments and $CaSO_4.2H_2O$.

The present disclosure also includes a method for preparing a cellulose filament-reinforced (CF-reinforced) gypsum panel, the method comprising:
    filtering an aqueous suspension comprising cellulose filaments and $CaSO_4.2H_2O$ under conditions to obtain a wet pad; and
    drying the wet pad under conditions to obtain the CF-reinforced gypsum panel.

The present disclosure also includes a cellulose filament (CF)-reinforced gypsum panel prepared according to a method for preparing a cellulose filament-reinforced (CF-reinforced) gypsum panel of the present disclosure.

The present disclosure also includes a method for preparing a foamed cellulose filament-reinforced (CF-reinforced) gypsum panel, the method comprising:
    obtaining a foam composition comprising cellulose filaments, $CaSO_4.2H_2O$ and forming a wet foamed pad with the foam composition; and
    drying the wet foamed pad under conditions to obtain the foamed CF-reinforced gypsum panel.

The present disclosure also includes a foamed cellulose filament-reinforced (CF-reinforced) gypsum panel prepared according to a method for preparing a foamed cellulose filament-reinforced (CF-reinforced) gypsum panel of the present disclosure.

The present disclosure also includes a method for preparing a cellulose filament-reinforced (CF-reinforced) gypsum sheet, the method comprising:
    draining an aqueous suspension comprising cellulose filaments and $CaSO_4.2H_2O$ under conditions to obtain a wet fiber mat;
    pressing the wet fiber mat under conditions to remove water and obtain a pressed sheet; and
    drying the pressed sheet under conditions to obtain the CF-reinforced gypsum sheet.

The present disclosure also includes a cellulose filament (CF)-reinforced gypsum sheet prepared according to a method for preparing a cellulose filament-reinforced (CF-reinforced) gypsum sheet of the present disclosure.

The present disclosure also includes a method for preparing a cellulose filament-reinforced (CF-reinforced) gypsum multi-layer sheet, the method comprising:
    pressing a plurality of wet sheets comprising cellulose filaments and $CaSO_4.2H_2O$ together under conditions to obtain a wet multi-layer sheet; and
    drying the wet multi-layer sheet under conditions to obtain the CF-reinforced gypsum multi-layer sheet.

The present disclosure also includes a cellulose filament-reinforced (CF-reinforced) gypsum multi-layer sheet prepared by a method for preparing a cellulose filament-reinforced (CF-reinforced) gypsum multi-layer sheet of the present disclosure.

The present disclosure also includes a use of cellulose filaments for preparing a cellulose filament-reinforced (CF-reinforced) gypsum panel.

The present disclosure also includes a use of cellulose filaments for preparing a foamed cellulose filament-reinforced (CF-reinforced) gypsum panel.

The present disclosure also includes a use of cellulose filaments for preparing a cellulose filament-reinforced (CF-reinforced) gypsum sheet.

The present disclosure also includes a use of cellulose filaments for preparing a cellulose filament-reinforced (CF-reinforced) gypsum multi-layer sheet.

The present disclosure also includes an aqueous suspension comprising cellulose filaments and $CaSO_4.2H_2O$.

The present disclosure also includes, in a process for manufacturing a gypsum panel, the improvement wherein before entering a forming station and/or a boardline, $CaSO_4.2H_2O$ used for manufacturing the panel is mixed with cellulose filaments.

The present disclosure also includes, in a process for manufacturing a sheet comprising $CaSO_4.2H_2O$ in a paper machine, the improvement wherein before forming the sheet in the paper machine, $CaSO_4.2H_2O$ used for manufacturing the panel is mixed with cellulose filaments.

In the studies of the present disclosure, the core section of a gypsum board was reinforced with cellulose filaments (CF), a distribution of nano- and micro-fibrillated cellulose isolated from Kraft pulp, using conventional pulping techniques. A papermaking method was used to prepare a CF-reinforced gypsum pad which mimicked a conventional gypsum core. Thin CF/gypsum pads were also prepared which were strong enough for typical uses of gypsum core. These pads were thinner than conventional gypsum core, but as strong as conventional gypsum core and were prepared using a paper-making technology with/without facing paper on two sides and represent a new type of drywall.

The main ingredient of gypsum plaster, which forms the core of a gypsum panel, is $CaSO_4.2H_2O$. This mineral provides, for example, flame-retardant properties, stiffness and compression strength to the panel. Other additives in small quantities such as glass fibers and binders are also usually added to the core of panels to provide additional strength, fire resistance and any other desired properties specific to the board application. In the present disclosure, a gypsum core reinforced by CF, having no supplementary additives, was produced using a conventional papermaking laboratory technique to mimic the traditional gypsum board making process. The formation of a strong network of filaments and minerals can be advantageously exploited to manufacture new designs of strong and/or lightweight gypsum core that may, for example, be later sandwiched between two skins in the fabrication of drywall construction panels.

In the studies of the present disclosure it was demonstrated that by adding only cellulose filaments (CF), without any other additives other than water to the $CaSO_4.2H_2O$, a core can be produced that is stronger than that of a known gypsum panel offered on the market. The reinforcing performance of CF to other types of fibers such as Kraft and glass fibers was compared. CF was shown to be a superior reinforcing agent over these fibers. The contribution of the skins to strength was not taken into account in these comparisons.

In the studies of the present disclosure, an ultra-light foamed strengthened gypsum core that has a significantly lower density (up to about fifty percent lower) than a current conventional gypsum core was also produced using CF as reinforcing agent. The reinforcing performance of CF to other types of reinforcing binders such as starch, polyvinyl alcohol, etc. was compared.

In the studies of the present disclosure, the formation of a strong network of filaments and minerals was also used to manufacture light and strong sandwich drywall panels, using, for example, conventional papermaking and paper converting technologies. CF-reinforced gypsum handsheets and CF-reinforced paper rolls with gypsum contents of over 80% were prepared using only a minimal amount of retention aids, i.e., cationic polyacrylamide (CPAM) and bentonite, to provide a useful retention rate of gypsum and drainage time during the processes. A wet web was formed by fast filtration, pressing and drying of the base sheet made with very high levels of gypsum held together by cellulose filaments. Paper rolls of high basis weights having high levels of filler contents were produced. This product could be laminated using the self-bonding properties of re-wetted sheets to produce panel skins and/or panels of controllable thicknesses. A cost-competitive, lightweight panel of useful stiffness was produced, made up of two gypsum-rich, multi-layer paper skins separated by a honeycomb or corrugate of the same material which then formed the core of this new panel type.

Base sheets of variable grammages and having ultra-high levels of minerals, held together with CF were prepared. These CF/mineral paper sheets with over 80% and up to 95% mineral filler content may, for example, serve as the platform to manufacture various types of dry panels or composites. They can be manufactured in the form of rolls on a standard paper machine or as high grammage laps when these are manufactured on a pulp machine instead of a paper machine. The present disclosure discloses the preparation of such sheets at the laboratory scale using a handsheet machine and a series of pilot paper machine trials. In these examples, calcium sulfate was used, for example, because the targeted application for such paper was its use to prepare drywall panels. Self-bonded CF/gypsum laminates were prepared from these sheets that can be used, for example as skins for manufacturing dry panels or light weight sandwich panels. A process to design dense or lightweight materials using base sheets of CF/gypsum or laminates of these base sheets is also disclosed herein. An example is provided whereby CF/gypsum sheet laminates are used to manufacture the skins of a drywall panel, the dense drywall panel itself and the core made up of a honeycomb or corrugated structure of CF/gypsum sheets.

In the following drawings, which represent by way of example only, various embodiments of the disclosure:

Figure 6:
Figure 6:
Figure 6:
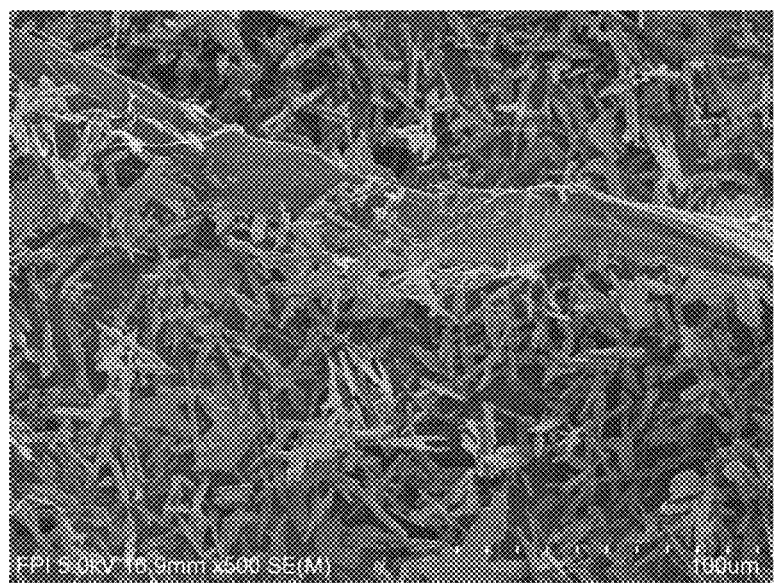
Figure 7:
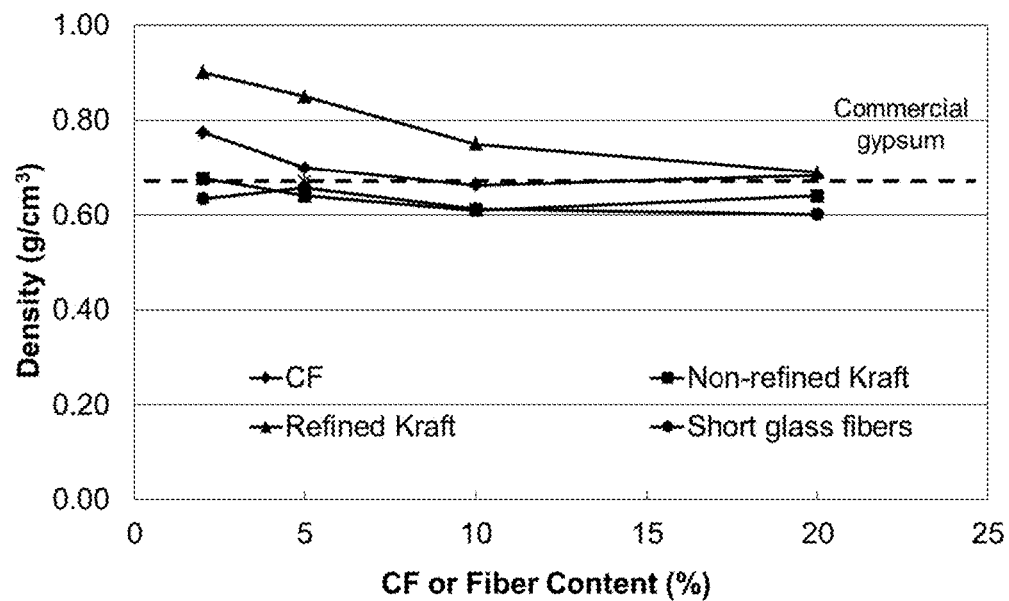
Figure 8:
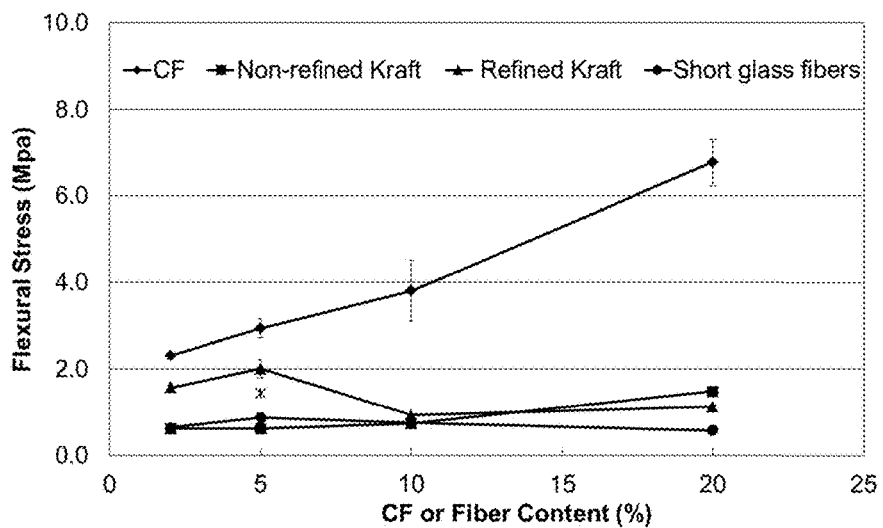
Figure 8:
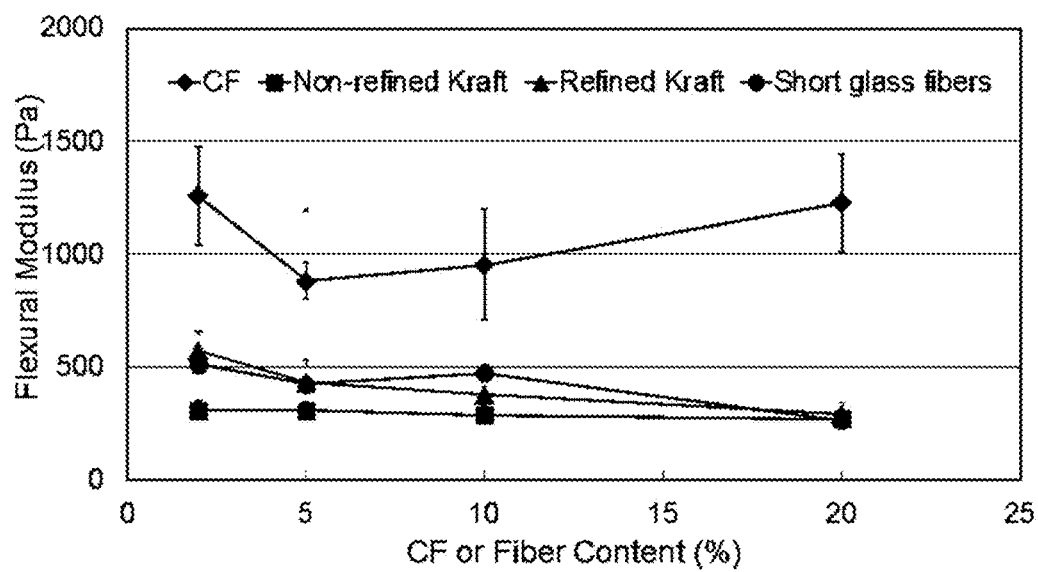
Figure 9:
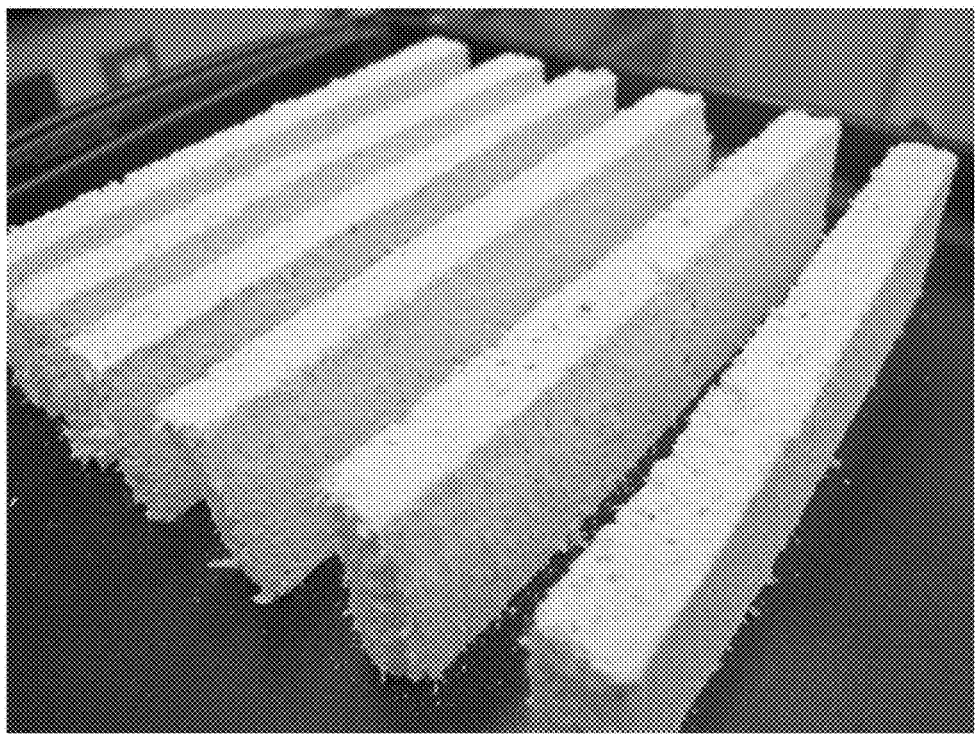
Figure 10:
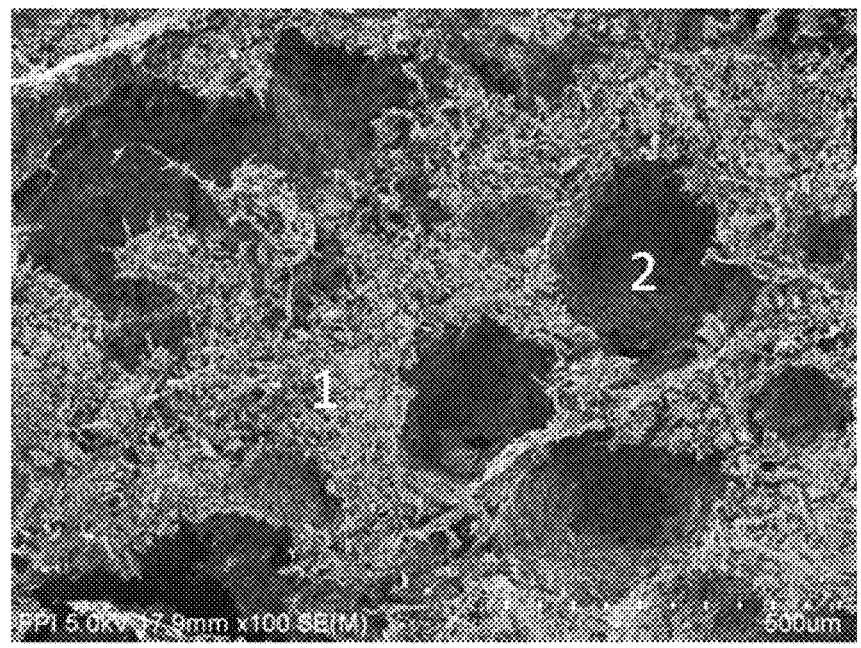
Figure 10:
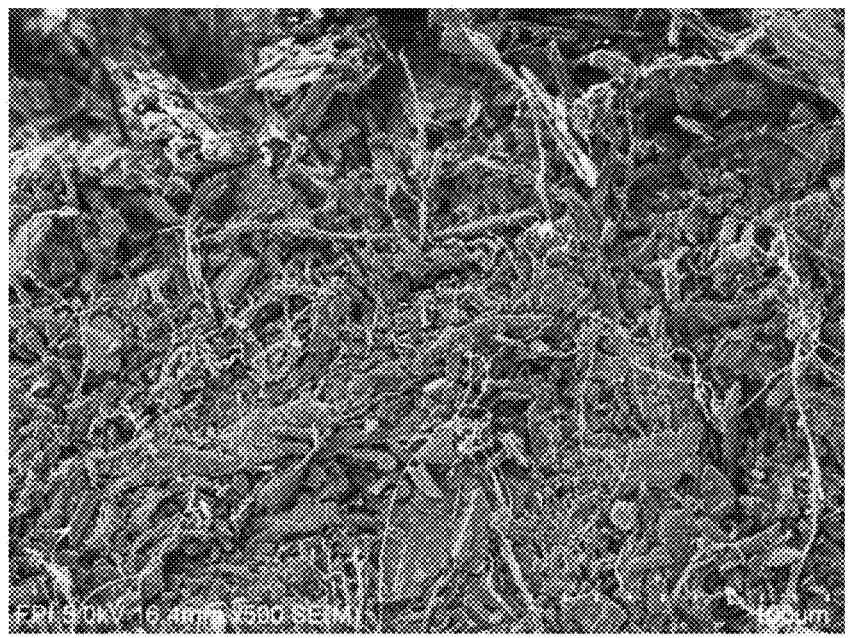
Figure 10:
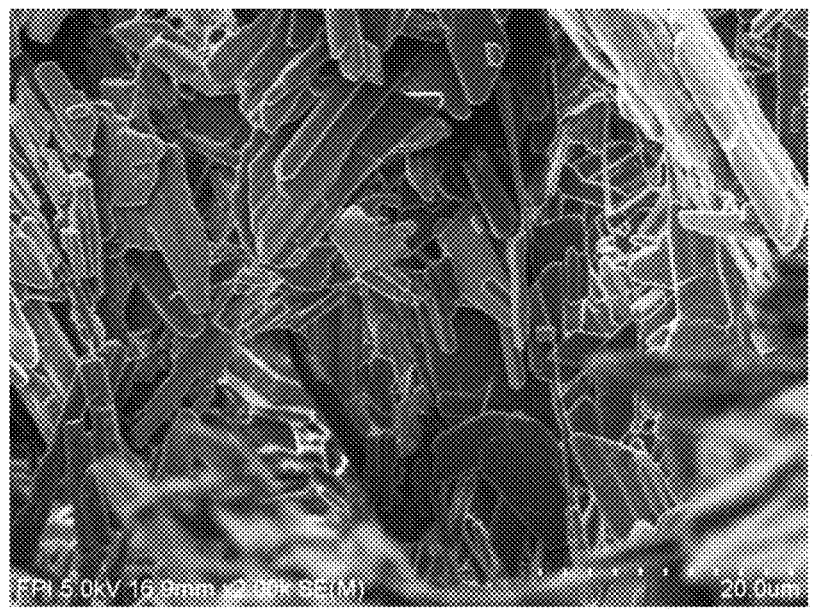
Figure 11A:
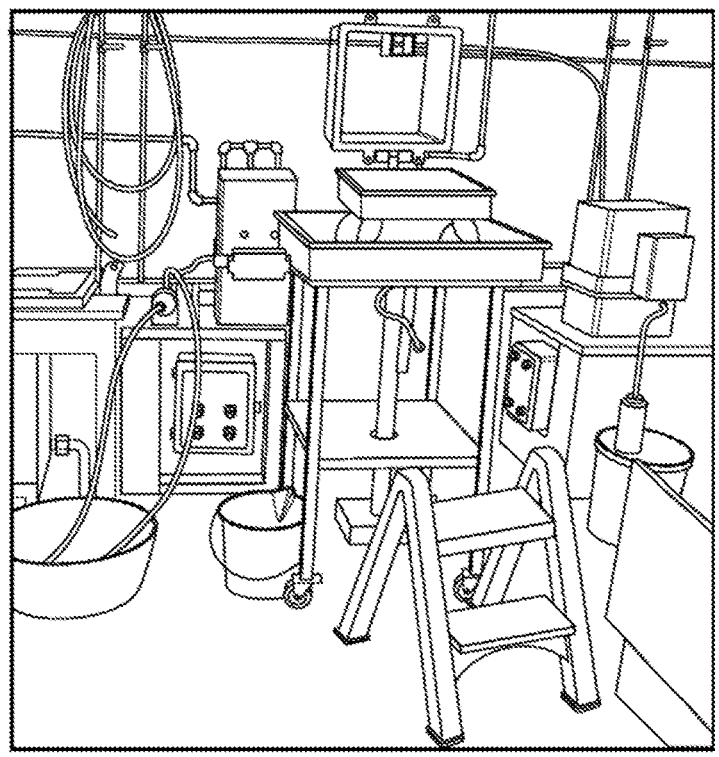
Figure 11B:
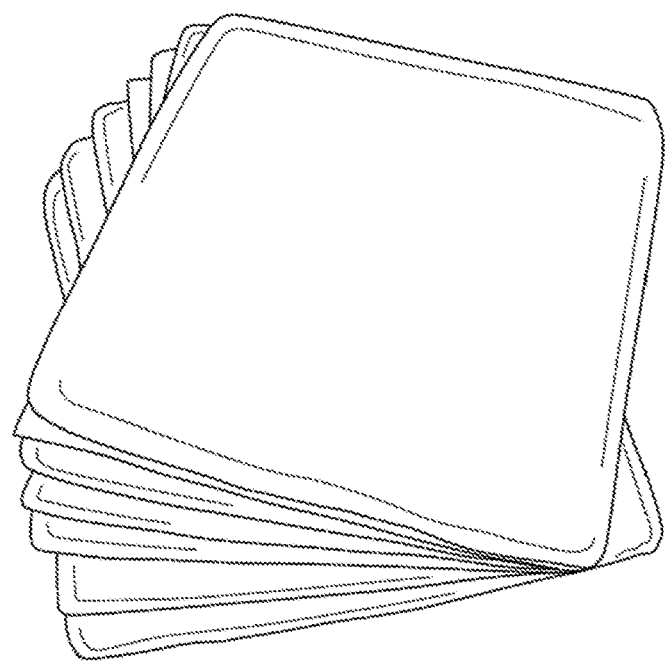
Figure 12:
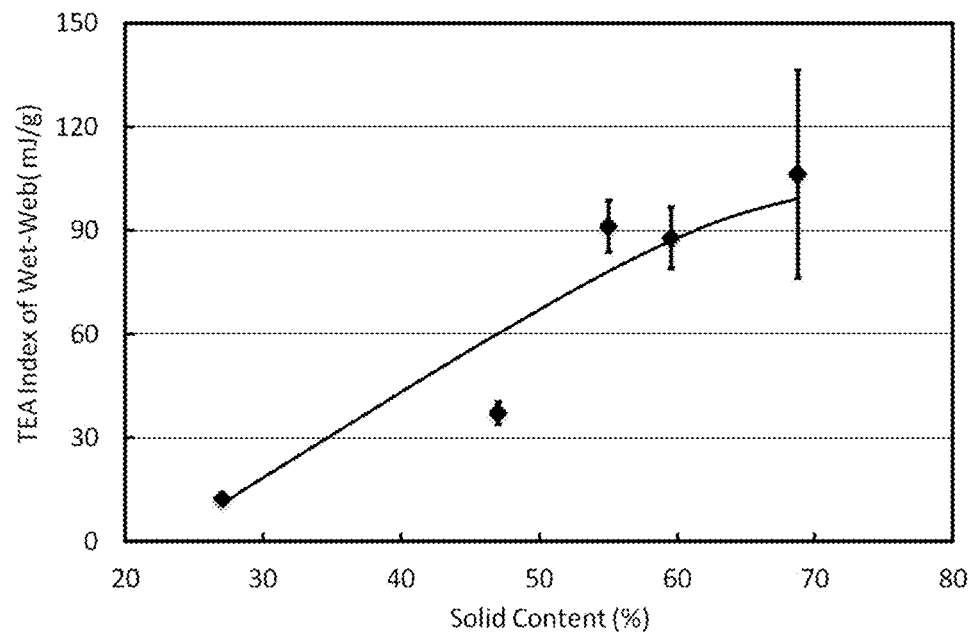
Figure 13:
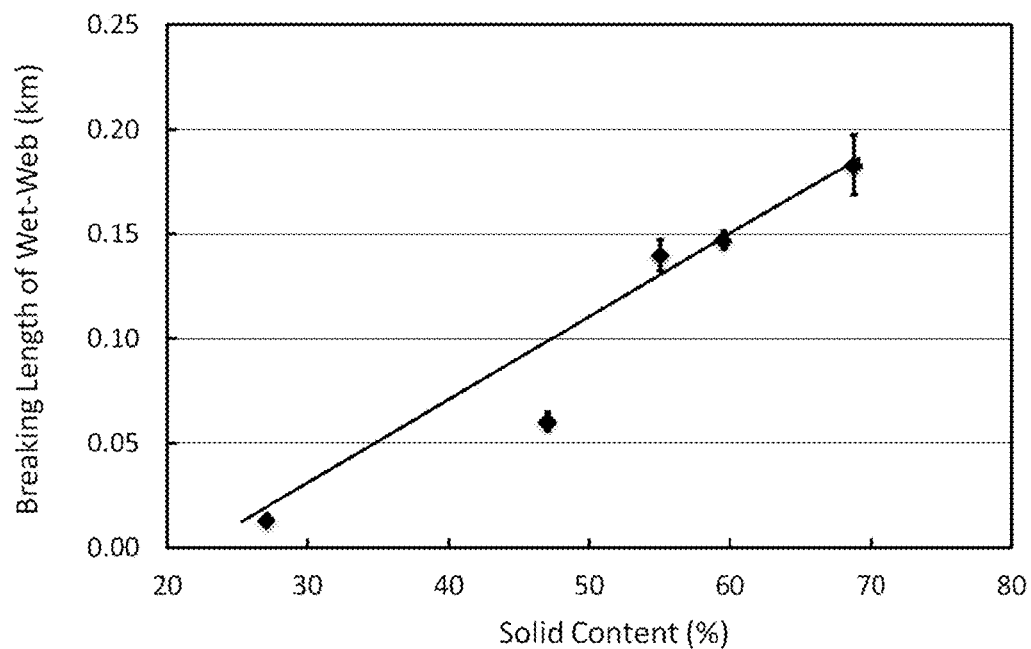
Figure 14:
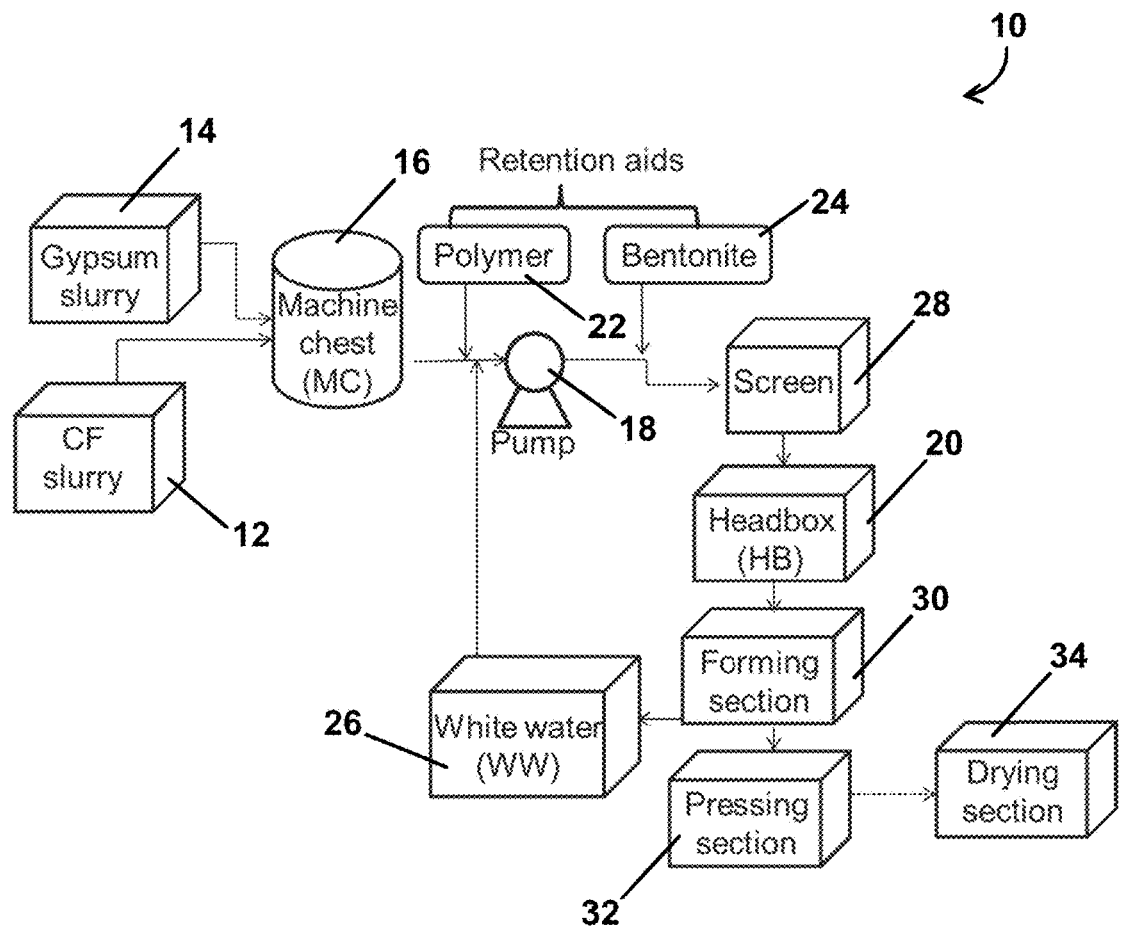
Figure 15:
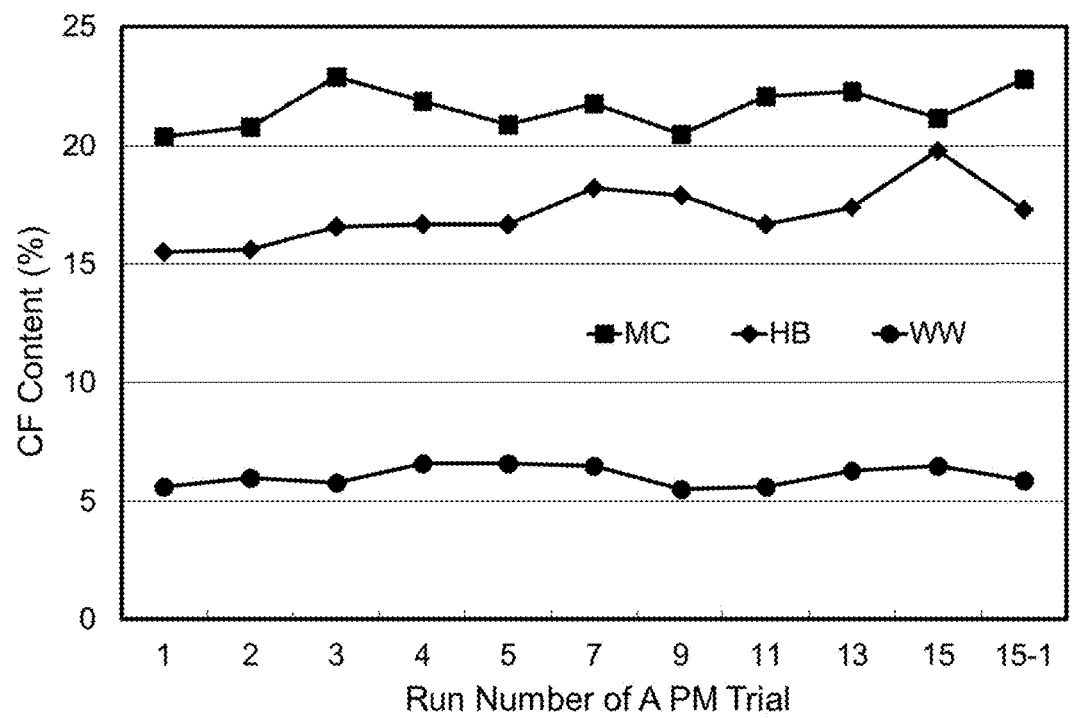
Figure 16:
Figure 16:
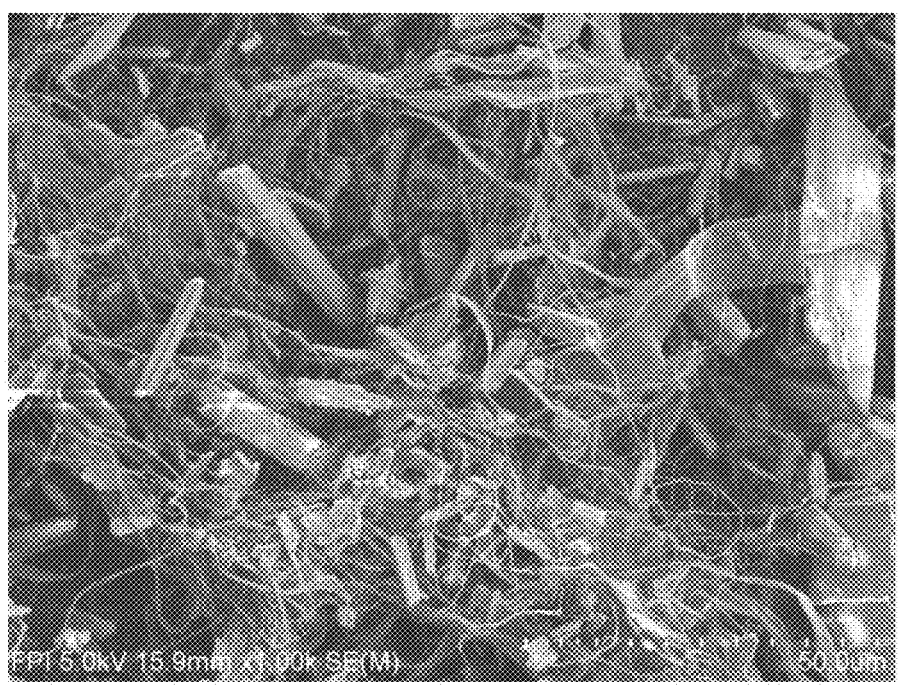
Figure 17:
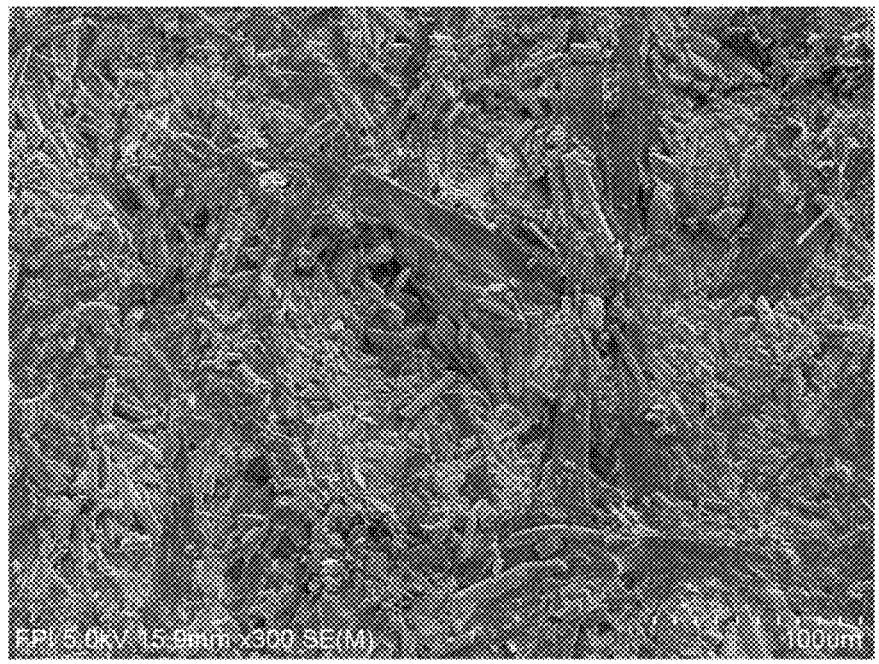
Figure 17:
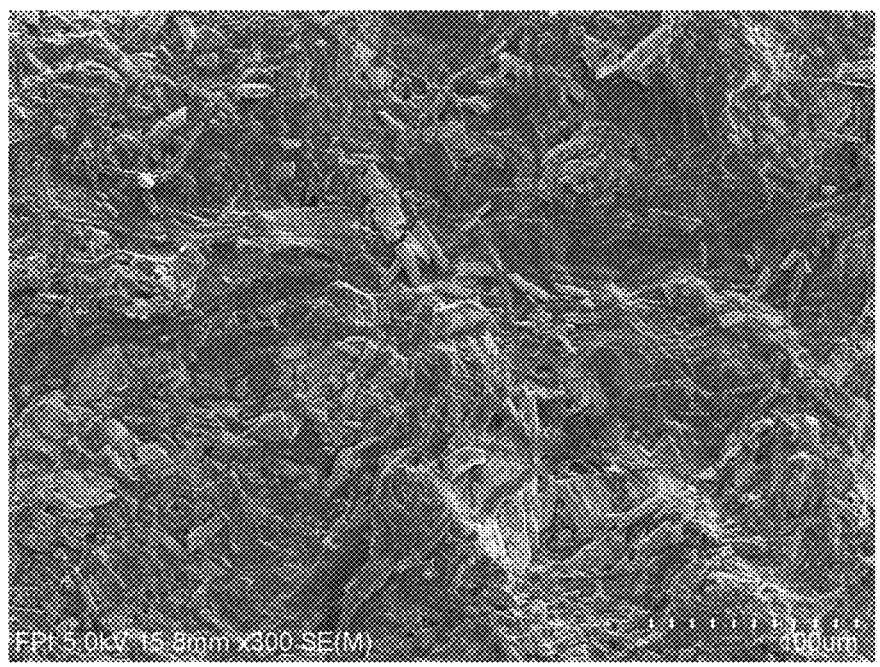
Figure 18:
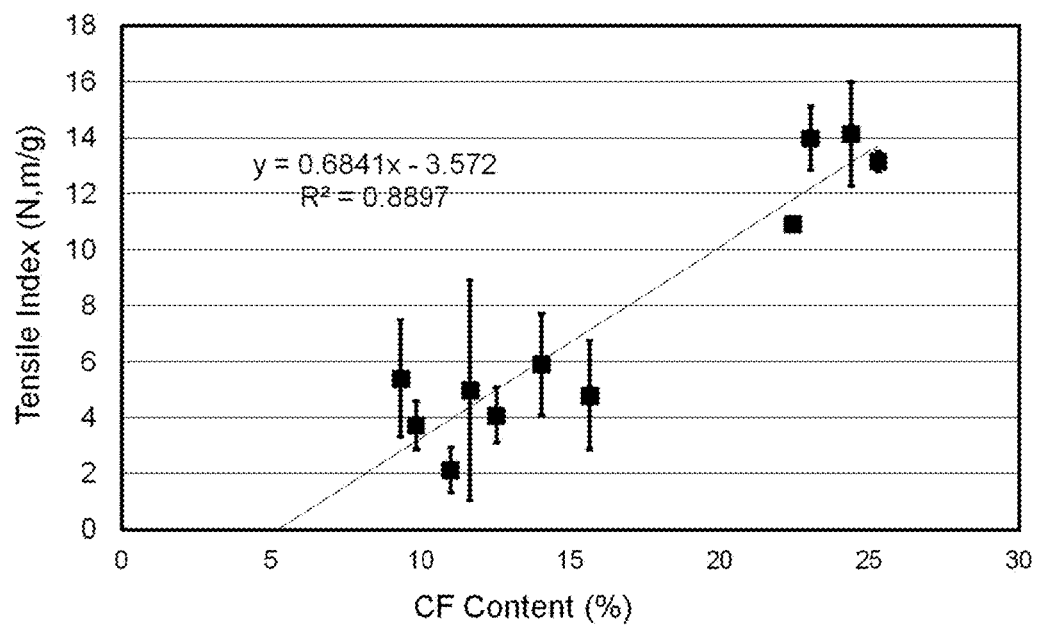
Figure 19:
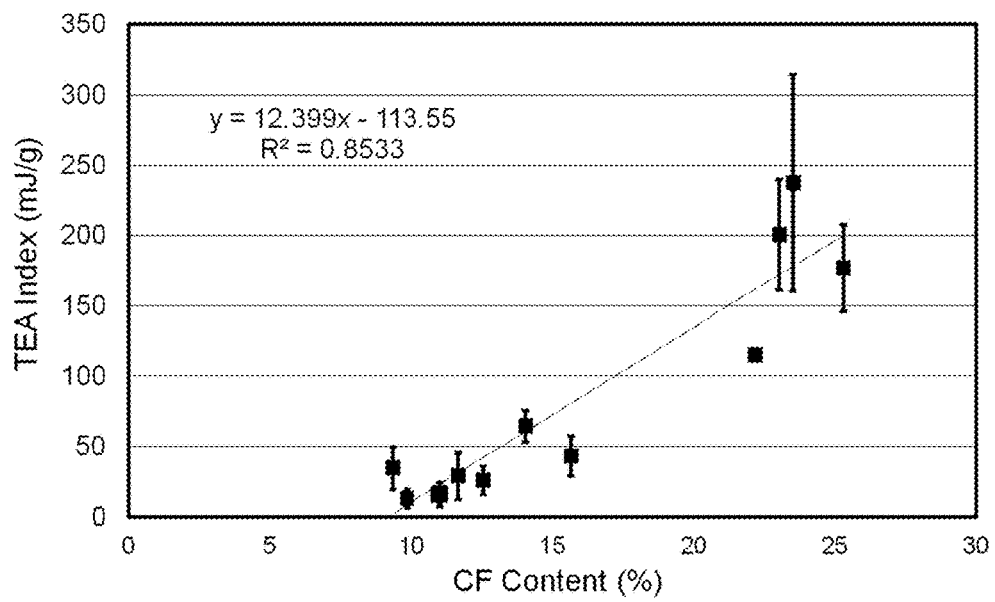
Figure 20:
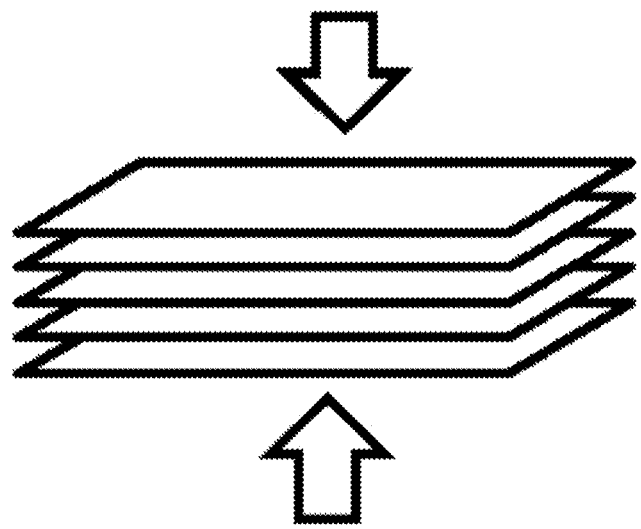
Figure 20:
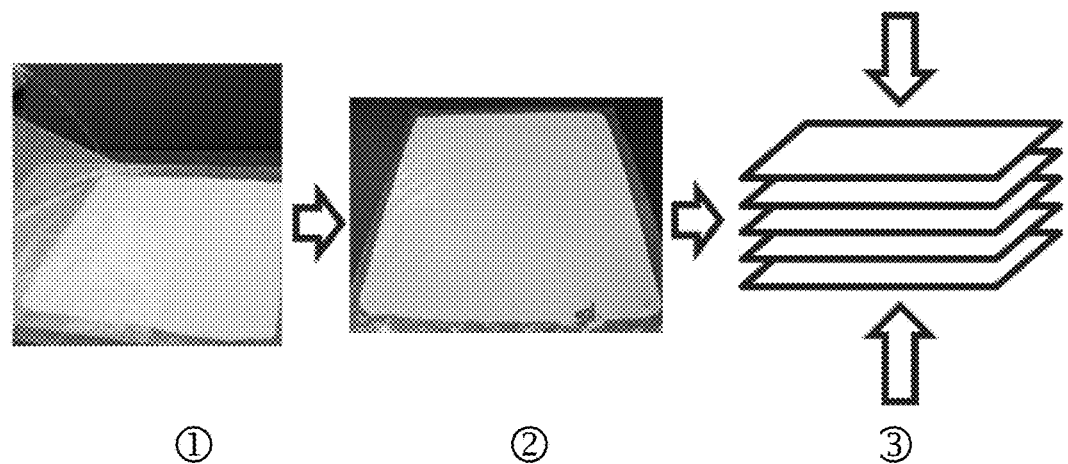
Figure 21:
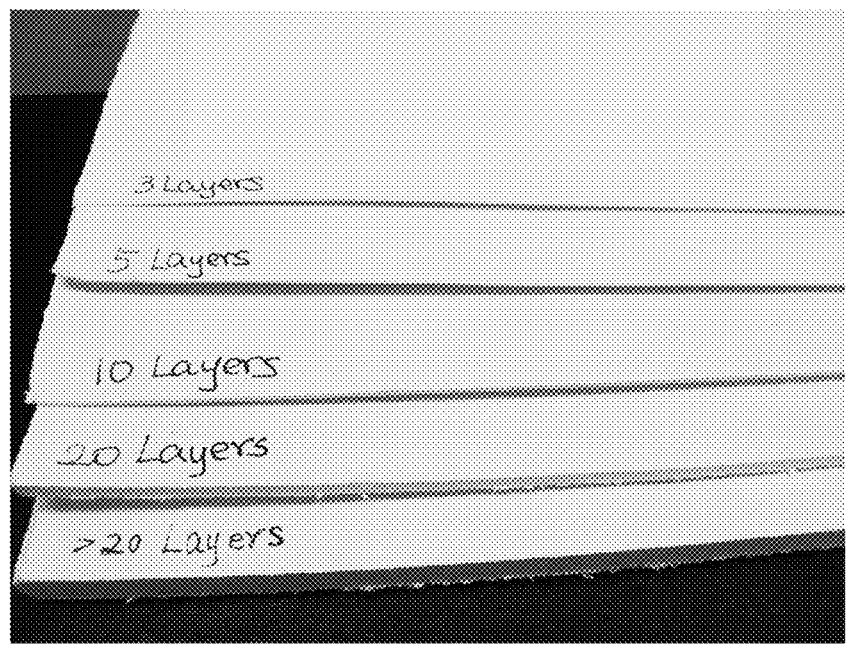
Figure 21:
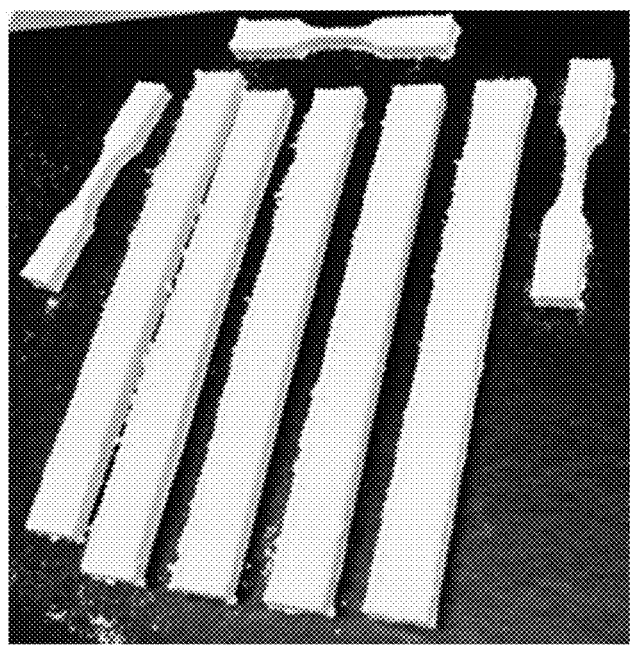
Figure 22:
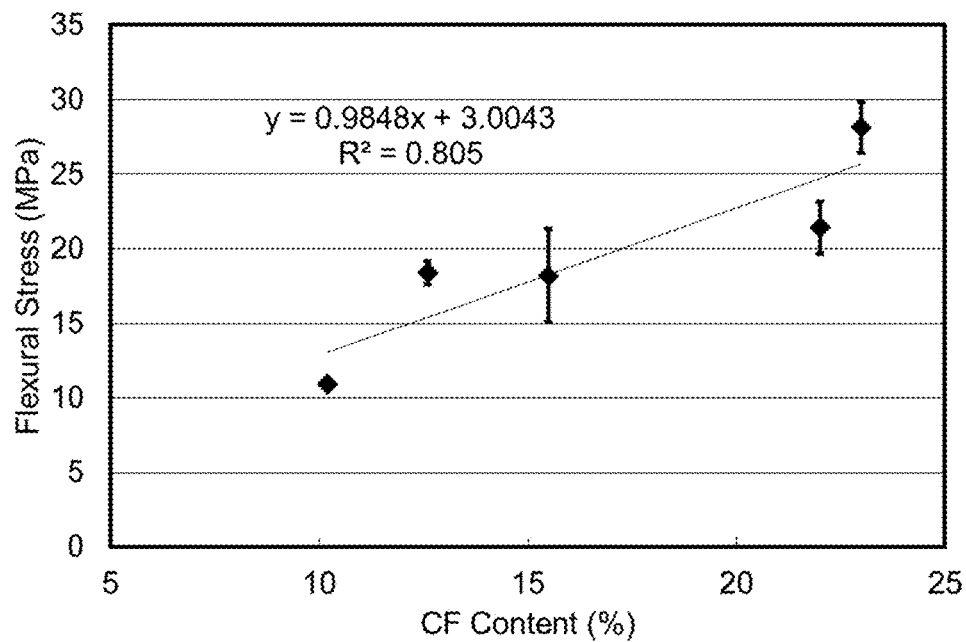
Figure 23:
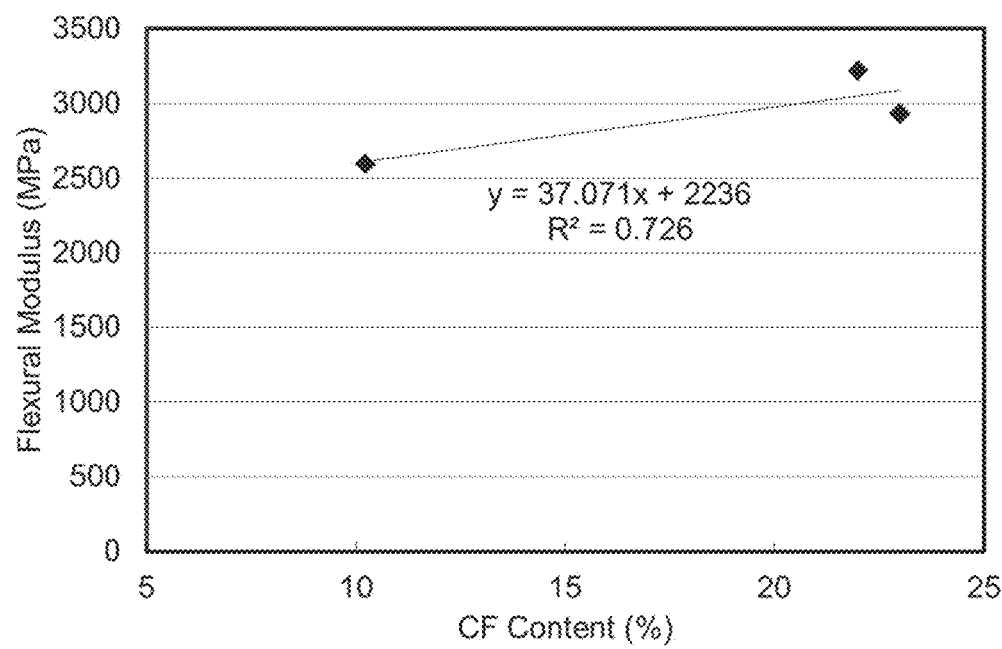
Figure 24:
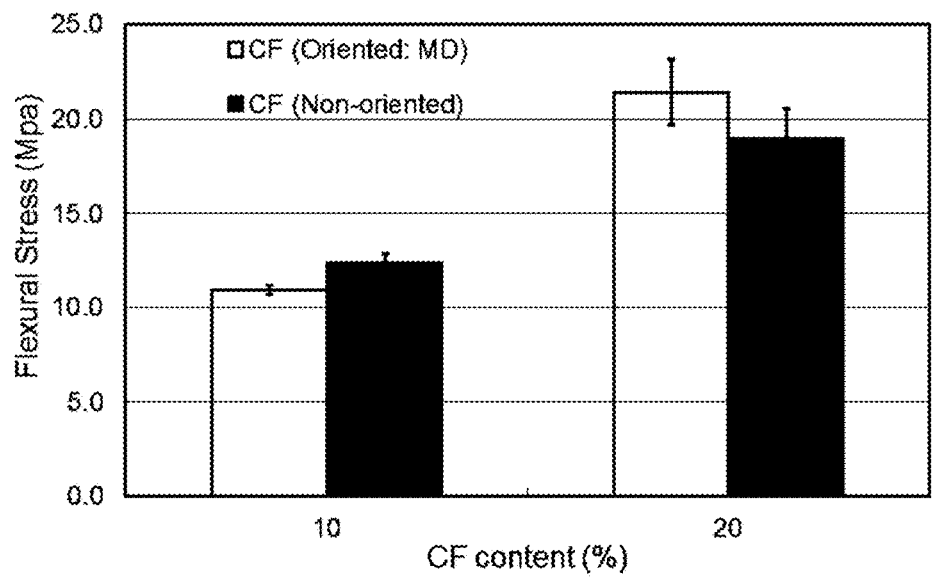
Figure 24:
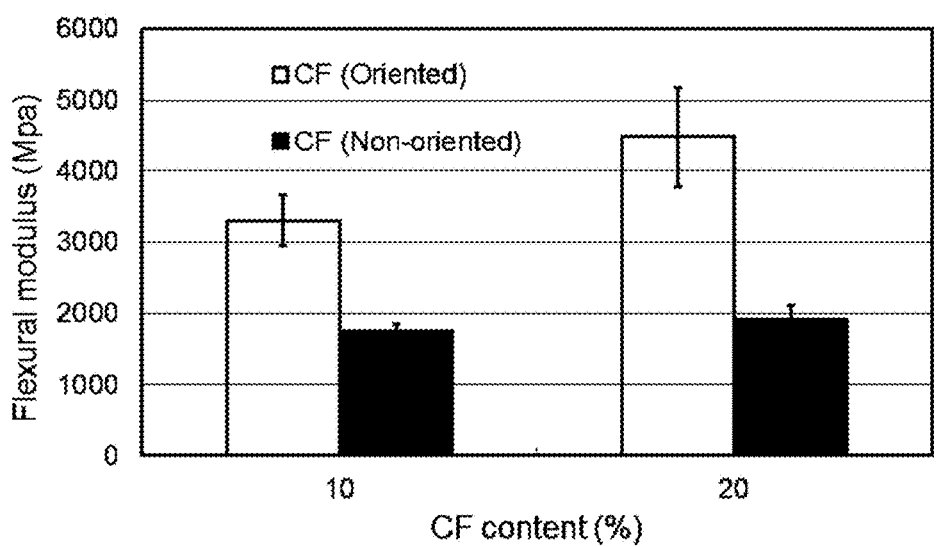
Figure 25:
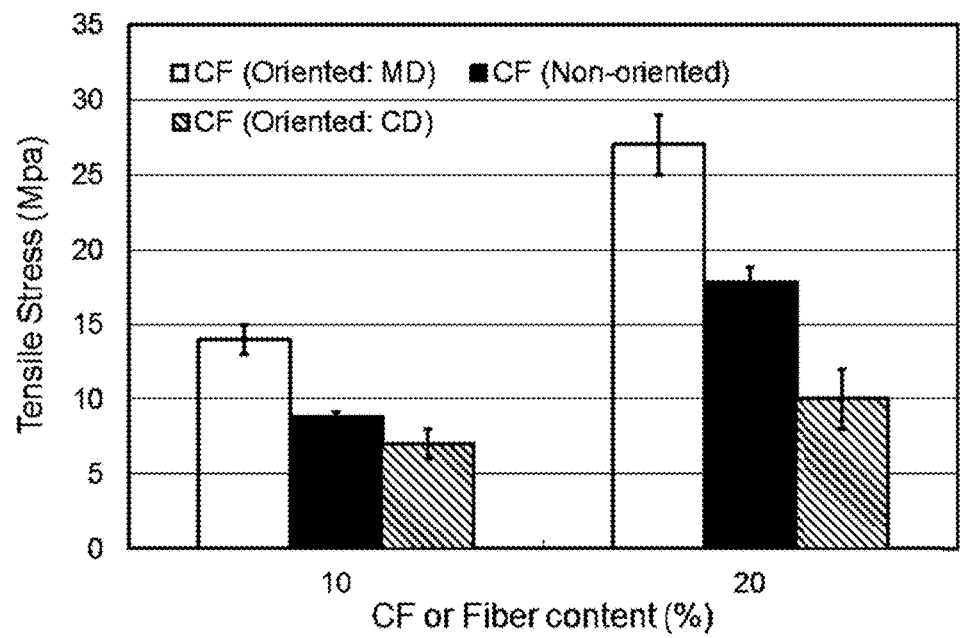
Figure 25:
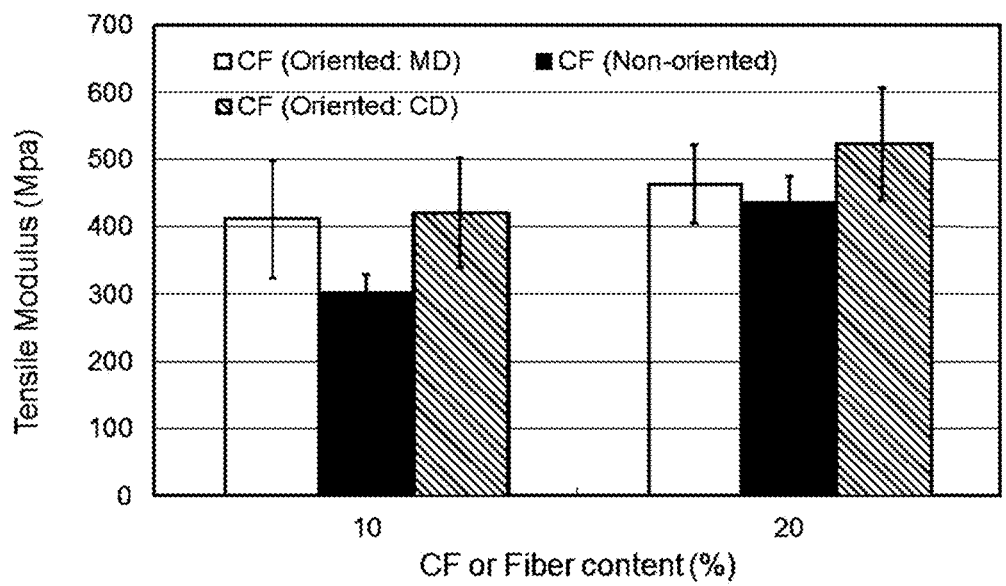
Figure 26:
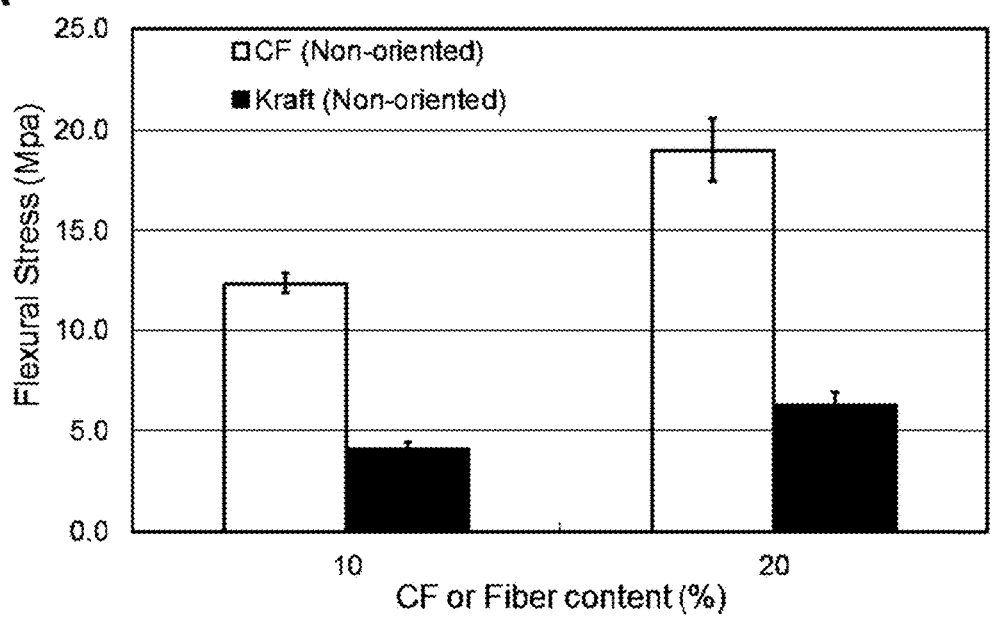
Figure 26:
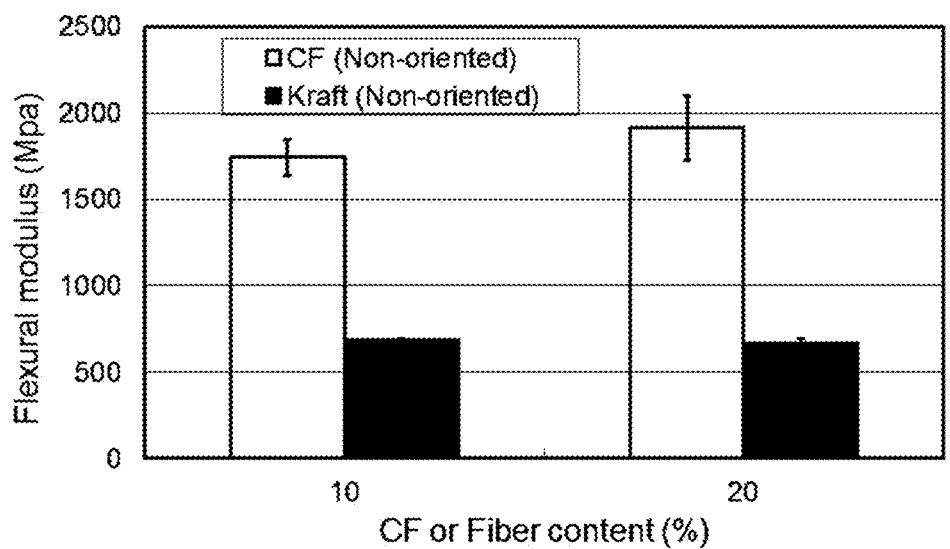
Figure 27:
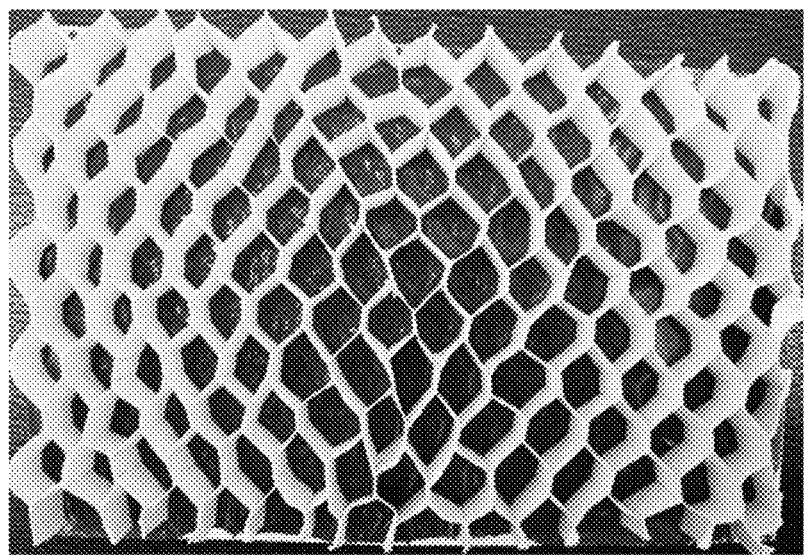
Figure 27:
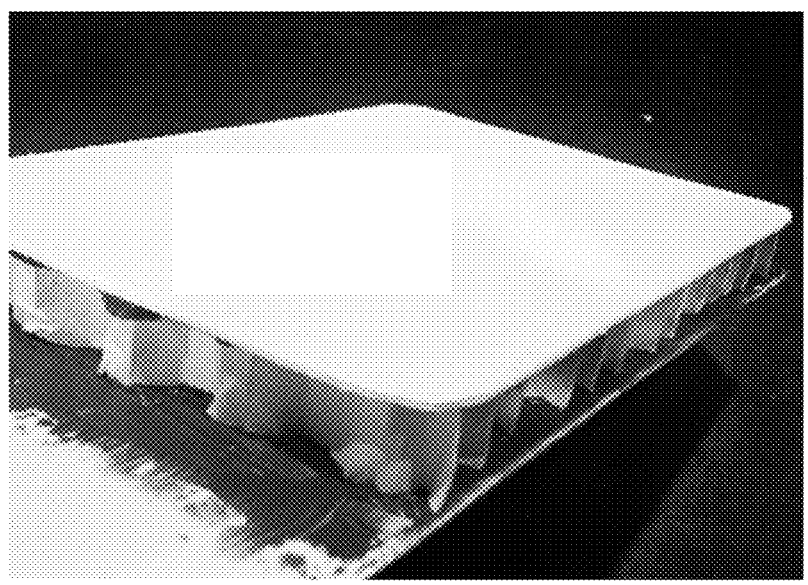

FIG. 6 shows exemplary SEM images of (A) a CF/gypsum slurry with 10% CF according to an example of the present disclosure; (B) non-refined Kraft fibers (KP)/gypsum with 10% non-refined KP; and (C) refined KP/gypsum with 10% refined KP;

FIG. 7 is a plot showing the densities of CF/gypsum pads according to an example of the present disclosure or fiber/gypsum pads as a function of CF or fiber content compared to a commercial gypsum core;

FIG. 8 shows plots showing (A) flexural stress of CF/gypsum pad samples according to an example of the present disclosure and fiber/gypsum pad samples having CF or fiber ratios of 2%, 5%, 10% and 20%; and B) flexural modulus of CF/gypsum pad samples according to an example of the present disclosure and fiber/gypsum pad samples having CF or fiber ratios of 2%, 5%, 10% and 20%;

FIG. 9 is an exemplary photograph showing samples of CF-reinforced cores for ultra-light foamed gypsum board according to an example of the present disclosure with a density of about 0.25 $g/cm^3$;

FIG. 10 shows exemplary photomicrographs of (A) a CF/gypsum foam according to an example of the present disclosure (100× magnification); (B) an enlargement of point 1 in FIG. 10A (500× magnification); and (C) an enlargement of point 2 in FIG. 10A (2000× magnification);

FIG. 11 shows exemplary photographs of (A) a William square handsheet machine used in the studies of the present disclosure; and (B) sheets prepared according to an embodiment of a method of the present disclosure;

FIG. 12 is a plot showing the tensile energy absorption (TEA) index (mJ/g) of CF/gypsum wet web prepared according to an embodiment of a method of the present disclosure as a function of solid content (%);

FIG. 13 is a plot showing the breaking length (km) of CF/gypsum wet web prepared according to an embodiment of a method of the present disclosure as a function of solid content (%);

FIG. 14 shows a schematic of a method of producing CF/gypsum sheets of the present disclosure;

FIG. 15 is a plot showing the real-time monitoring of CF content in suspensions collected at various locations of the paper machine (PM) shown in FIG. 14: MC (machine chest); HB (headbox); and WW (white water);

FIG. 16 shows exemplary micrographs of CF/gypsum slurry in the machine chest at CF levels of (A) about 10% and (B) about 20% according to an embodiment of a method of the present disclosure;

FIG. 17 shows exemplary micrographs showing the morphology of CF/gypsum sheet surfaces prepared according to an embodiment of a method of the present disclosure having (A) 10% CF and (B) 20% CF;

FIG. 18 is a plot showing the Tensile Index (N·m/g) of CF/gypsum sheets having various CF contents which were prepared according to an embodiment of a method of the present disclosure;

FIG. 19 is a plot showing the TEA index (mJ/g) of CF/gypsum sheets having various CF contents which were prepared according to an embodiment of a method of the present disclosure;

FIG. 20 shows schematics of two lamination methods according to embodiments of a method of the present disclosure: (A) an embodiment using wet sheets; and (B) an embodiment using rewetted sheets;

FIG. 21 shows exemplary photographs of (A) laminates with various number of layers (from bottom to top: >20, 20, 10, 5 and 3) prepared according to an embodiment of a method of the present disclosure; and (B) laminate samples prepared according to an embodiment of a method of the present disclosure for flexural (rectangles) and tensile (dogbones) testing;

FIG. 22 is a plot showing the flexural strength of CF/gypsum laminates having a thickness of 4 mm and densities that vary between 1.3 and 1.4 g/cm$^3$ which were prepared according to an embodiment of a method of the present disclosure as a function of CF content (%);

FIG. 23 is a plot showing the flexural modulus of CF/gypsum laminates having a thickness of 4 mm and densities that vary between 1.3 and 1.4 g/cm$^3$ which were prepared according to an embodiment of a method of the present disclosure as a function of CF content (%);

FIG. 24 shows plots for (A) flexural stress; and (B) flexural modulus of CF/gypsum laminates prepared according to an embodiment of a method of the present disclosure with and without CF/gypsum orientation (MD (machine direction) and CD (cross direction));

FIG. 25 shows plots for (A) tensile stress; and (B) tensile modulus of CF/gypsum laminates prepared according to an embodiment of a method of the present disclosure with and without CF/gypsum orientation in MD and CD;

FIG. 26 shows plots showing (A) flexural stress; and (B) flexural modulus of CF/gypsum laminates prepared according to an embodiment of a method of the present disclosure compared to Kraft fiber/gypsum laminates prepared according to a comparative example of the present disclosure; and FIG. 27 shows exemplary photographs of (A) a handmade honeycomb structure made of a CF/gypsum sheet prepared according to an embodiment of a method of the present disclosure (B) sandwiched between two CF/gypsum laminates prepared according to an embodiment of a method of the present disclosure.

Unless otherwise indicated, the definitions and embodiments described in this and other sections are intended to be applicable to all embodiments and aspects of the present disclosure herein described for which they are suitable as would be understood by a person skilled in the art.

As used in the present disclosure, the singular forms "a", "an" and "the" include plural references unless the content clearly dictates otherwise. For example, an embodiment including "a panel" should be understood to present certain aspects with one panel, or two or more additional panels.

In embodiments comprising an "additional" or "second" component, such as an additional or second panel, the second component as used herein is different from the other components or first component. A "third" component is different from the other, first, and second components, and further enumerated or "additional" components are similarly different.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The terms "cellulose filaments" or "CF" and the like as used herein refer to filaments obtained from cellulose fibers having a high aspect ratio, for example, an average aspect ratio of at least about 200, for example, an average aspect ratio of from about 200 to about 5000, an average width in the nanometer range, for example, an average width of from about 30 nm to about 500 nm and an average length in the micrometer range or above, for example, an average length above about 10 μm, for example an average length of from about 200 μm to about 2 mm. Such cellulose filaments can be obtained, for example, from a process which uses mechanical means only, for example, the methods disclosed in US Patent Application Publication No. 2013/0017394 filed on Jan. 19, 2012. For example, such method produces cellulose filaments that can be free of chemical additives and free of derivatization using, for example, a conventional high consistency refiner operated at solid concentrations (or consistencies) of at least about 20 wt %. These strong cellulose filaments are, for example, under proper mixing conditions, re-dispersible in water or aqueous slurries of minerals such as those used in preparing gypsum core. For example, the cellulose fibers from which the cellulose filaments are obtained can be but are not limited to Kraft fibers such as Northern Bleached Softwood Kraft (NBSK), but other kinds of suitable fiber are also applicable, the selection of which can be made by a person skilled in the art.

The expression "gypsum panel" has used herein refers to a panel that comprises $CaSO_4.2H_2O$. For example, the gypsum panel can be a gypsum board also known as a drywall board. However, the gypsum panel can have various uses such as structural purposes or decorative purposes.

The below presented examples are non-limitative and are used to better exemplify the processes of the present disclosure.

According to an aspect of the present disclosure, there is provided a gypsum panel comprising $CaSO_4.2H_2O$ and cellulose filaments, the gypsum panel having a flexural strength of at least about 1.5 MPa when measured according to ASTM D790.

For example, the gypsum panel can have a flexural strength of at least about 2.0 MPa when measured according to ASTM D790.

For example, the gypsum panel can have a flexural strength of at least about 2.5 MPa when measured according to ASTM D790.

For example, the gypsum panel can have a flexural strength of at least about 3.0 MPa when measured according to ASTM D790.

For example, the gypsum panel can have a flexural strength of at least about 3.5 MPa when measured according to ASTM D790.

For example, the gypsum panel can have a flexural strength of at least about 4.0 MPa when measured according to ASTM D790.

For example, the gypsum panel can have a flexural strength of at least about 4.5 MPa when measured according to ASTM D790.

For example, the gypsum panel can have a flexural strength of at least about 5.0 MPa when measured according to ASTM D790.

For example, the gypsum panel can have a flexural strength of at least about 6.0 MPa when measured according to ASTM D790.

For example, the gypsum panel can have a flexural strength of at least about 7.0 MPa when measured according to ASTM D790.

For example, the gypsum panel can have a flexural strength of at least about 8.0 MPa when measured according to ASTM D790.

For example, the gypsum panel can have a flexural strength of about 1.5 MPa to about 10.0 MPa when measured according to ASTM D790.

For example, the gypsum panel can have a flexural strength of about 2.0 MPa to about 8.0 MPa when measured according to ASTM D790.

For example, the gypsum panel can have a flexural strength of about 2.0 MPa to about 7.0 MPa when measured according to ASTM D790.

For example, the gypsum panel can comprise at least about 1% of cellulose filaments by weight, based on the total weight of the cellulose filaments and the $CaSO_4.2H_2O$.

For example, the gypsum panel can comprise at least about 2% of cellulose filaments by weight, based on the total weight of the cellulose filaments and the $CaSO_4.2H_2O$.

For example, the gypsum panel can comprise at least about 3% of cellulose filaments by weight, based on the total weight of the cellulose filaments and the $CaSO_4.2H_2O$.

For example, the gypsum panel can comprise at least about 4% of cellulose filaments by weight, based on the total weight of the cellulose filaments and the $CaSO_4.2H_2O$.

For example, the gypsum panel can comprise at least about 5% of cellulose filaments by weight, based on the total weight of the cellulose filaments and the $CaSO_4.2H_2O$.

For example, the gypsum panel can comprise at least about 6% of cellulose filaments by weight, based on the total weight of the cellulose filaments and the $CaSO_4.2H_2O$.

For example, the gypsum panel can comprise at least about 7% of cellulose filaments by weight, based on the total weight of the cellulose filaments and the $CaSO_4.2H_2O$.

For example, the gypsum panel can comprise at least about 8% of cellulose filaments by weight, based on the total weight of the cellulose filaments and the $CaSO_4.2H_2O$.

For example, the gypsum panel can comprise at least about 9% of cellulose filaments by weight, based on the total weight of the cellulose filaments and the $CaSO_4.2H_2O$.

For example, the gypsum panel can comprise at least about 10% of cellulose filaments by weight, based on the total weight of the cellulose filaments and the $CaSO_4.2H_2O$.

For example, the gypsum panel can comprise at least about 15% of cellulose filaments by weight, based on the total weight of the cellulose filaments and the $CaSO_4.2H_2O$.

For example, the gypsum panel can comprise up to about or at least about 20% of cellulose filaments by weight, based on the total weight of the cellulose filaments and the $CaSO_4.2H_2O$.

For example, the gypsum panel can comprise up to about 50% of cellulose filaments by weight, based on the total weight of the cellulose filaments and the $CaSO_4.2H_2O$.

For example, the cellulose filaments can have an average length of from about 200 μM to about 2 mm.

For example, the cellulose filaments can have an average width of from about 30 nm to about 500 nm.

For example, the cellulose filaments can have an average aspect ratio of from about 200 to about 5000.

For example, the gypsum panel can have a core portion having a density of about 0.5 g/cm$^3$ to about 2.0 g/cm$^3$.

For example, the gypsum panel can have a core portion having a density of about 0.5 g/cm$^3$ to about 1.5 g/cm$^3$.

For example, the gypsum panel can have a core portion having a density of about 0.5 g/cm$^3$ to about 1.0 g/cm$^3$.

For example, the gypsum panel can have a core portion having a density of about 0.6 g/cm$^3$ to about 0.8 g/cm$^3$.

For example, the gypsum panel can have a thickness of about ¼ inch (about 6.4 mm).

For example, the gypsum panel can have a thickness of about ⅜ inch (about 9.5 mm).

For example, the gypsum panel can have a thickness of about ½ inch (about 12.7 mm).

For example, the gypsum panel can have a thickness of about ⅝ inch (about 15.9 mm).

For example, the gypsum panel can have a thickness of about 1 inch (about 25.4 mm).

For example, the gypsum panel can have a width of about 4 feet (about 122 cm).

For example, the gypsum panel can have a length of about 8 feet (about 244 cm).

For example, the gypsum panel can have a length of about 9 feet (about 274 cm).

For example, the gypsum panel can have a length of about 10 feet (about 305 cm).

For example, the gypsum panel can have a length of about 11 feet (about 335 cm).

For example, the gypsum panel can have a length of about 12 feet (about 366 cm).

For example, the gypsum panel can comprise a core portion sandwiched between two sheets of facing paper.

For example, the $CaSO_4.2H_2O$ and the cellulose filaments can be comprised within the core portion.

For example, the density of the gypsum panel can be less than about 0.45 $g/cm^3$.

For example, the density of the gypsum panel can be less than about 0.40 $g/cm^3$.

For example, the density of the gypsum panel can be less than about 0.35 $g/cm^3$.

For example, the density of the gypsum panel can be less than about 0.30 $g/cm^3$.

For example, the density of the gypsum panel can be less than about 0.25 $g/cm^3$.

For example, the density of the gypsum panel can be less than about 0.20 $g/cm^3$.

For example, the density of the gypsum panel can be about 0.20 $g/cm^3$ to about 0.25 $g/cm^3$.

For example, the gypsum panel can comprise at least about 1% of cellulose filaments by weight, based on the total weight of the cellulose filaments and the $CaSO_4.2H_2O$.

For example, the gypsum panel can comprise at least about 2% of cellulose filaments by weight, based on the total weight of the cellulose filaments and the $CaSO_4.2H_2O$.

For example, the gypsum panel can comprise at least about 3% of cellulose filaments by weight, based on the total weight of the cellulose filaments and the $CaSO_4.2H_2O$.

For example, the gypsum panel can comprise at least about 4% of cellulose filaments by weight, based on the total weight of the cellulose filaments and the $CaSO_4.2H_2O$.

For example, the gypsum panel can comprise at least about 5% of cellulose filaments by weight, based on the total weight of the cellulose filaments and the $CaSO_4.2H_2O$.

For example, the gypsum panel can comprise at least about 6% of cellulose filaments by weight, based on the total weight of the cellulose filaments and the $CaSO_4.2H_2O$.

For example, the gypsum panel can comprise at least about 7% of cellulose filaments by weight, based on the total weight of the cellulose filaments and the $CaSO_4.2H_2O$.

For example, the gypsum panel can comprise at least about 8% of cellulose filaments by weight, based on the total weight of the cellulose filaments and the $CaSO_4.2H_2O$.

For example, the gypsum panel can comprise at least about 9% of cellulose filaments by weight, based on the total weight of the cellulose filaments and the $CaSO_4.2H_2O$.

For example, the gypsum panel can comprise at least about 10% of cellulose filaments by weight, based on the total weight of the cellulose filaments and the $CaSO_4.2H_2O$.

For example, the gypsum panel can comprise at least about 15% of cellulose filaments by weight, based on the total weight of the cellulose filaments and the $CaSO_4.2H_2O$.

For example, the gypsum panel can comprise at least about 20% of cellulose filaments by weight, based on the total weight of the cellulose filaments and the $CaSO_4.2H_2O$.

For example, the gypsum panel can comprise about 1% to about 50% of cellulose filaments by weight, based on the total weight of the cellulose filaments and the $CaSO_4.2H_2O$.

For example, the gypsum panel can comprise about 1% to about 20% of cellulose filaments by weight, based on the total weight of the cellulose filaments and the $CaSO_4.2H_2O$.

For example, the gypsum panel can comprise about 2% to about 15% of cellulose filaments by weight, based on the total weight of the cellulose filaments and the $CaSO_4.2H_2O$.

For example, the cellulose filaments can have an average length of from about 200 µM to about 2 mm.

For example, the cellulose filaments can have an average width of from about 30 nm to about 500 nm.

For example, the cellulose filaments can have an average aspect ratio of from about 200 to about 5000.

For example, the gypsum panel can comprise a foamed core portion.

For example, the foamed core portion can further comprise an expandable mineral.

For example, the expandable mineral can comprise, consist essentially of or consist of expanded perlite. For example, the expandable mineral can comprise expanded perlite. For example, the expandable mineral can consist essentially of expanded perlite. For example, the expandable mineral can consist of expanded perlite.

For example, the gypsum panel can have a thickness of about ¼ inch (about 6.4 mm).

For example, the gypsum panel can have a thickness of about ⅜ inch (about 9.5 mm).

For example, the gypsum panel can have a thickness of about ½ inch (about 12.7 mm).

For example, the gypsum panel can have a thickness of about ⅝ inch (about 15.9 mm).

For example, the gypsum panel can have a thickness of about 1 inch (about 25.4 mm).

For example, the gypsum panel can have a width of about 4 feet (about 122 cm).

For example, the gypsum panel can have a length of about 8 feet (about 244 cm).

For example, the gypsum panel can have a length of about 9 feet (about 274 cm).

For example, the gypsum panel can have a length of about 10 feet (about 305 cm).

For example, the gypsum panel can have a length of about 11 feet (about 335 cm).

For example, the gypsum panel can have a length of about 12 feet (about 366 cm).

For example, the gypsum panel can comprise a core portion sandwiched between two sheets of facing paper.

For example, the $CaSO_4.2H_2O$ and the cellulose filaments can be comprised within the core portion.

For example, the sheet can comprise at least about 0.2% of cellulose filaments by weight, based on the total weight of the cellulose filaments and the $CaSO_4.2H_2O$.

For example, the sheet can comprise at least about 0.5% of cellulose filaments by weight, based on the total weight of the cellulose filaments and the $CaSO_4.2H_2O$.

For example, the sheet can comprise at least about 0.7% of cellulose filaments by weight, based on the total weight of the cellulose filaments and the $CaSO_4.2H_2O$.

For example, the sheet can comprise at least about 2% of cellulose filaments by weight, based on the total weight of the cellulose filaments and the $CaSO_4.2H_2O$.

For example, the sheet can comprise at least about 5% of cellulose filaments by weight, based on the total weight of the cellulose filaments and the $CaSO_4.2H_2O$.

For example, the sheet can comprise at least about 10% of cellulose filaments by weight, based on the total weight of the cellulose filaments and the $CaSO_4.2H_2O$.

For example, the sheet can comprise at least about 15% of cellulose filaments by weight, based on the total weight of the cellulose filaments and the $CaSO_4.2H_2O$.

For example, the sheet can comprise at least about 20% of cellulose filaments by weight, based on the total weight of the cellulose filaments and the $CaSO_4.2H_2O$.

For example, the sheet can comprise at least about 25% of cellulose filaments by weight, based on the total weight of the cellulose filaments and the $CaSO_4.2H_2O$.

For example, the sheet can comprise about 0.1% to about 50% of cellulose filaments by weight, based on the total weight of the cellulose filaments and the $CaSO_4.2H_2O$.

For example, the sheet can comprise about 1% to about 50% of cellulose filaments by weight, based on the total weight of the cellulose filaments and the $CaSO_4.2H_2O$.

For example, the sheet can comprise about 2% to about 35% of cellulose filaments by weight, based on the total weight of the cellulose filaments and the $CaSO_4.2H_2O$.

For example, the sheet can comprise about 5% to about 30% of cellulose filaments by weight, based on the total weight of the cellulose filaments and the $CaSO_4.2H_2O$.

For example, the sheet can comprise about 8% to about 25% of cellulose filaments by weight, based on the total weight of the cellulose filaments and the $CaSO_4.2H_2O$.

For example, the sheet can comprise at least about 50 wt % of $CaSO_4.2H_2O$, based on the total dry weight of the sheet.

For example, the sheet can comprise at least about 60 wt % of $CaSO_4.2H_2O$, based on the total dry weight of the sheet.

For example, the sheet can comprise at least about 70 wt % of $CaSO_4.2H_2O$, based on the total dry weight of the sheet.

For example, the sheet can comprise at least about 80 wt % of $CaSO_4.2H_2O$, based on the total dry weight of the sheet.

For example, the sheet can comprise at least about 90 wt % of $CaSO_4.2H_2O$, based on the total dry weight of the sheet.

For example, the sheet can comprise at least about 95 wt % of $CaSO_4.2H_2O$, based on the total dry weight of the sheet.

For example, the sheet can comprise about 50 wt % to about 95 wt % of $CaSO_4.2H_2O$, based on the total dry weight of the sheet.

For example, the sheet can comprise about 60 wt % to about 90 wt % of $CaSO_4.2H_2O$, based on the total dry weight of the sheet.

For example, the sheet can comprise about 70 wt % to about 85 wt % of $CaSO_4.2H_2O$, based on the total dry weight of the sheet.

For example, the sheet can have a basis weight of at least about 60 g/m$^2$.

For example, the sheet can have a basis weight of at least about 150 g/m$^2$.

For example, the sheet can have a basis weight of at least about 200 g/m$^2$.

For example, the sheet can have a basis weight of up to about 2000 g/m$^2$.

For example, the sheet can have a basis weight of up to about 2400 g/m$^2$.

For example, the sheet can have a basis weight of about 60 g/m$^2$ to about 2400 g/m$^2$.

For example, the sheet can have a basis weight of about 150 g/m$^2$ to about 300 g/m$^2$.

For example, the sheet can have a density of at least about 0.5 g/cm$^3$.

For example, the sheet can have a density of at least about 0.6 g/cm$^3$.

For example, the sheet can have a density of at least about 0.7 g/cm$^3$.

For example, the sheet can have a density of at least about 0.8 g/cm$^3$.

For example, the sheet can have a density of at least about 0.9 g/cm$^3$.

For example, the sheet can have a density of at least about 1 g/cm$^3$.

For example, the sheet can have a density of about 0.5 g/cm$^3$ to about 0.8 g/cm$^3$.

For example, the sheet can have a density of about 0.55 g/cm$^3$ to about 0.75 g/cm$^3$.

For example, the sheet can have a density of about 0.9 g/cm$^3$ to about 1.3 g/cm$^3$.

For example, the sheet can have a density of about 1.0 g/cm$^3$ to about 1.2 g/cm$^3$.

For example, the sheet can have a density of about 1.0 g/cm$^3$ to about 1.2 g/cm$^3$.

For example, the sheet can have a thickness of at least about 0.05 mm.

For example, the sheet can have a thickness of at least about 0.1 mm.

For example, the sheet can have a thickness of at least about 0.15 mm.

For example, the sheet can have a thickness of at least about 0.2 mm.

For example, the sheet can have a thickness of at least about 0.25 mm.

For example, the sheet can have a thickness of about 0.15 mm to about 0.40 mm.

For example, the sheet can have a thickness of about 0.20 mm to about 0.35 mm.

For example, the sheet can have a thickness of about 0.25 mm to about 0.35 mm.

For example, the sheet can have a thickness comprised between about 0.24 mm and about 0.36 mm.

For example, the sheet can have a tensile index of at least about 2 N·m/g when measured according to TAPPI T494 om—01.

For example, the sheet can have a tensile index of at least about 5 N·m/g when measured according to TAPPI T494 om—01.

For example, the sheet can have a tensile index of at least about 10 N·m/g when measured according to TAPPI T494 om—01.

For example, the sheet can have a tensile index of at least about 14 N·m/g when measured according to TAPPI T494 om—01.

For example, the sheet can have a tensile index of from about 1 N·m/g to about 20 N·m/g when measured according to TAPPI T494 om—01.

For example, the sheet can have a tensile index of from about 2 N·m/g to about 14 N·m/g when measured according to TAPPI T494 om—01.

For example, the sheet can have a tensile index of from about 5 N·m/g to about 14 N·m/g when measured according to TAPPI T494 om—01.

For example, the sheet can have a tensile index of from about 10 N·m/g to about 14 N·m/g when measured according to TAPPI T494 om—01.

For example, the sheet can have no orientation.

For example, the sheet can have a machine direction (MD) orientation or a cross direction (CD) orientation.

For example, the sheet can have a machine direction (MD) orientation.

For example, the sheet can have a cross direction (CD) orientation.

For example, the sheet can be in the form of a roll.

For example, the sheet can have been made on a paper machine.

For example, speed of the paper machine can have been set at about 100 m/minute to about 1000 m/minute.

For example, speed of the paper machine can have been set at about 300 m/minute to about 500 m/minute.

For example, speed of the paper machine can have been set at about 400 m/minute.

For example, the sheet can have been made on a hand-sheet machine.

For example, the cellulose filaments can have an average length of from about 200 μM to about 2 mm.

For example, the cellulose filaments can have an average width of from about 30 nm to about 500 nm.

For example, the cellulose filaments can have an average aspect ratio of from about 200 to about 5000.

The present disclosure also includes a use of at least one sheet in the manufacture of a multi-layer sheet, the sheet being a sheet of the present disclosure comprising cellulose filaments and $CaSO_4.2H_2O$, the sheet comprising at least about 1% of cellulose filaments by weight, based on the total weight of the cellulose filaments and the $CaSO_4.2H_2O$. It will be appreciated by a person skilled in the art that embodiments relating to such a sheet for use in the manufacture of a multi-layer sheet can be varied as discussed herein for the sheets comprising cellulose filaments and $CaSO_4.2H_2O$, the sheets comprising at least about 1% of cellulose filaments by weight, based on the total weight of the cellulose filaments and the $CaSO_4.2H_2O$ of the present disclosure.

The present disclosure also includes a use of at least one sheet in the manufacture of a gypsum panel, the sheet being a sheet of the present disclosure comprising cellulose filaments and $CaSO_4.2H_2O$, the sheet comprising at least about 1% of cellulose filaments by weight, based on the total weight of the cellulose filaments and the $CaSO_4.2H_2O$. It will be appreciated by a person skilled in the art that embodiments relating to such a sheet for use in the manufacture of a gypsum panel can be varied as discussed herein for the sheets comprising cellulose filaments and $CaSO_4.2H_2O$, the sheets comprising at least about 1% of cellulose filaments by weight, based on the total weight of the cellulose filaments and the $CaSO_4.2H_2O$ of the present disclosure.

For example, the multi-layer sheet can comprise at least about 1% of cellulose filaments by weight, based on the total weight of the cellulose filaments and the $CaSO_4.2H_2O$.

For example, the multi-layer sheet can comprise at least about 2% of cellulose filaments by weight, based on the total weight of the cellulose filaments and the $CaSO_4.2H_2O$.

For example, the multi-layer sheet can comprise at least about 5% of cellulose filaments by weight, based on the total weight of the cellulose filaments and the $CaSO_4.2H_2O$.

For example, the multi-layer sheet can comprise at least about 10% of cellulose filaments by weight, based on the total weight of the cellulose filaments and the $CaSO_4.2H_2O$.

For example, the multi-layer sheet can comprise at least about 15% of cellulose filaments by weight, based on the total weight of the cellulose filaments and the $CaSO_4.2H_2O$.

For example, the multi-layer sheet can comprise at least about 20% of cellulose filaments by weight, based on the total weight of the cellulose filaments and the $CaSO_4.2H_2O$.

For example, the multi-layer sheet can comprise about 1% to about 50% of cellulose filaments by weight, based on the total weight of the cellulose filaments and the $CaSO_4.2H_2O$.

For example, the multi-layer sheet can comprise about 5% to about 50% of cellulose filaments by weight, based on the total weight of the cellulose filaments and the $CaSO_4.2H_2O$.

For example, the multi-layer sheet can comprise about 5% to about 35% of cellulose filaments by weight, based on the total weight of the cellulose filaments and the $CaSO_4.2H_2O$.

For example, the multi-layer sheet can comprise about 8% to about 25% of cellulose filaments by weight, based on the total weight of the cellulose filaments and the $CaSO_4.2H_2O$.

For example, the multi-layer sheet can comprise about 2% to about 50% of cellulose filaments by weight, based on the total weight of the cellulose filaments and the $CaSO_4.2H_2O$.

For example, the multi-layer sheet can comprise at least about 50 wt % of $CaSO_4.2H_2O$, based on the total dry weight of the multi-layer sheet.

For example, the multi-layer sheet can comprise at least about 60 wt % of $CaSO_4.2H_2O$, based on the total dry weight of the multi-layer sheet.

For example, the multi-layer sheet can comprise at least about 70 wt % of $CaSO_4.2H_2O$, based on the total dry weight of the multi-layer sheet.

For example, the multi-layer sheet can comprise at least about 80 wt % of $CaSO_4.2H_2O$, based on the total dry weight of the multi-layer sheet.

For example, the multi-layer sheet can comprise at least about 90 wt % of $CaSO_4.2H_2O$, based on the total dry weight of the multi-layer sheet.

For example, the multi-layer sheet can comprise at least about 95 wt % of $CaSO_4.2H_2O$, based on the total dry weight of the multi-layer sheet.

For example, the multi-layer sheet can comprise about 50 wt % to about 95 wt % of $CaSO_4.2H_2O$, based on the total dry weight of the multi-layer sheet.

For example, the multi-layer sheet can comprise about 60 wt % to about 90 wt % of $CaSO_4.2H_2O$, based on the total dry weight of the multi-layer sheet.

For example, the multi-layer sheet can comprise about 70 wt % to about 85 wt % of $CaSO_4.2H_2O$, based on the total dry weight of the multi-layer sheet.

For example, the multi-layer sheet can have a basis weight of at least about 200 $g/m^2$.

For example, the multi-layer sheet can have a basis weight of at least about 300 $g/m^2$.

For example, the multi-layer sheet can have a basis weight of at least about 600 $g/m^2$.

For example, the multi-layer sheet can have a basis weight of at least about 1000 $g/m^2$.

For example, the multi-layer sheet can have a basis weight of at least about 2000 $g/m^2$.

For example, the multi-layer sheet can have a basis weight of at least about 2500 $g/m^2$.

For example, the multi-layer sheet can have a basis weight of at least about 5000 $g/m^2$.

For example, the multi-layer sheet can have a basis weight of at least about 25,000 $g/m^2$.

For example, the multi-layer sheet can have a basis weight of about 200 $g/m^2$ to about 25,000 $g/m^2$.

For example, the multi-layer sheet can have a basis weight of about 200 $g/m^2$ to about 10,000 $g/m^2$.

For example, the multi-layer sheet can have a basis weight of about 200 $g/m^2$ to about 6000 $g/m^2$.

For example, the multi-layer sheet can have a basis weight of about 300 $g/m^2$ to about 3000 $g/m^2$.

For example, the multi-layer sheet can have at least 2 layers.

For example, the multi-layer sheet can have at least 3 layers.

For example, the multi-layer sheet can have at least 5 layers.

For example, the multi-layer sheet can have at least 10 layers.

For example, the multi-layer sheet can have at least 20 layers.

For example, the multi-layer sheet can have at least 25 layers.

For example, the multi-layer sheet can have from 2 layers to 50 layers.

For example, the multi-layer sheet can have from 2 layers to 30 layers.

For example, the multi-layer sheet can have from 3 layers to 10 layers.

For example, the multi-layer sheet can have a density of at least about 1.0 g/cm$^3$.

For example, the multi-layer sheet can have a density of at least about 1.1 g/cm$^3$.

For example, the multi-layer sheet can have a density of at least about 1.2 g/cm$^3$.

For example, the multi-layer sheet can have a density of at least about 1.3 g/cm$^3$.

For example, the multi-layer sheet can have a density of at least about 1.4 g/cm$^3$.

For example, the multi-layer sheet can have a density of about 1.0 g/cm$^3$ to about 1.5 g/cm$^3$.

For example, the multi-layer sheet can have a density of about 1.1 g/cm$^3$ to about 1.4 g/cm$^3$.

For example, the multi-layer sheet can have a density of about 1.2 g/cm$^3$ to about 1.4 g/cm$^3$.

For example, the multi-layer sheet can have a density of about 1.3 g/cm$^3$ to about 1.4 g/cm$^3$.

For example, the multi-layer sheet can have a density of about 1.3 g/cm$^3$.

For example, the multi-layer sheet can have a thickness of at least about 0.2 mm.

For example, the multi-layer sheet can have a thickness of at least about 1.0 mm.

For example, the multi-layer sheet can have a thickness of at least about 2.0 mm.

For example, the multi-layer sheet can have a thickness of at least about 3.0 mm.

For example, the multi-layer sheet can have a thickness of at least about 4.0 mm.

For example, the multi-layer sheet can have a thickness of about 0.2 mm to about 10 mm.

For example, the multi-layer sheet can have a thickness of about 1.0 mm to about 5 mm.

For example, the multi-layer sheet can have a thickness of about 3.5 mm to about 4.5 mm.

For example, the multi-layer sheet can have a thickness comprised between about 3.4 and about 4.6 mm.

For example, the multi-layer sheet can have a thickness of about ¼ inch (about 6.4 mm).

For example, the multi-layer sheet can have a thickness of about ⅜ inch (about 9.5 mm).

For example, the multi-layer sheet can have a thickness of about ½ inch (about 12.7 mm).

For example, the multi-layer sheet can have a thickness of about ⅝ inch (about 15.9 mm).

For example, the multi-layer sheet can have a thickness of about 1 inch (about 25.4 mm).

For example, the multi-layer sheet can have no orientation.

For example, the multi-layer sheet can have a machine direction (MD) orientation or a cross direction (CD) orientation.

For example, the multi-layer sheet can have a machine direction (MD) orientation.

For example, the multi-layer sheet can have a cross direction (CD) orientation.

For example, the multi-layer sheet can have a flexural strength of at least about 5 MPa when measured according to ASTM D790.

For example, the multi-layer sheet can have a flexural strength of at least about 10 MPa when measured according to ASTM D790.

For example, the multi-layer sheet can have a flexural strength of at least about 15 MPa when measured according to ASTM D790.

For example, the multi-layer sheet can have a flexural strength of at least about 20 MPa when measured according to ASTM D790.

For example, the multi-layer sheet can have a flexural strength of at least about 25 MPa when measured according to ASTM D790.

For example, the multi-layer sheet can have a flexural strength of from about 5 MPa to about 35 MPa when measured according to ASTM D790.

For example, the multi-layer sheet can have a flexural strength of from about 15 MPa to about 30 MPa when measured according to ASTM D790.

For example, the multi-layer sheet can have a flexural strength of from about 25 MPa to about 30 MPa when measured according to ASTM D790.

For example, the multi-layer sheet can have a specific flexural strength of from about 10 MPa/gcm$^{-3}$ to about 15 MPa/gcm$^{-3}$.

For example, the multi-layer sheet can have a tensile strength of at least about 5 MPa when measured according to ASTM D638.

For example, the multi-layer sheet can have a tensile strength of at least about 8.8 MPa when measured according to ASTM D638.

For example, the multi-layer sheet can have a tensile strength of at least about 10 MPa when measured according to ASTM D638.

For example, the multi-layer sheet can have a tensile strength of at least about 15 MPa when measured according to ASTM D638.

For example, the multi-layer sheet can have a tensile strength of at least about 18 MPa when measured according to ASTM D638.

For example, the multi-layer sheet can have a tensile strength of from about 5 MPa to about 30 MPa when measured according to ASTM D638.

For example, the multi-layer sheet can have a tensile strength of from about 8.8 MPa to about 18 MPa when measured according to ASTM D638.

For example, the multi-layer sheet can have a tensile modulus of at least about 200 MPa when measured according to ASTM D638.

For example, the multi-layer sheet can have a tensile modulus of at least about 300 MPa when measured according to ASTM D638.

For example, the multi-layer sheet can have a tensile modulus of at least about 350 MPa when measured according to ASTM D638.

For example, the multi-layer sheet can have a tensile modulus of at least about 400 MPa when measured according to ASTM D638.

For example, the multi-layer sheet can have a tensile modulus of at least about 1000 MPa when measured according to ASTM D638.

For example, the multi-layer sheet can have a tensile modulus of from about 200 MPa to about 600 MPa when measured according to ASTM D638.

For example, the multi-layer sheet can have a tensile modulus of from about 301 MPa to about 436 MPa when measured according to ASTM D638.

For example, the cellulose filaments can have an average length of from about 200 μM to about 2 mm.

For example, the cellulose filaments can have an average width of from about 30 nm to about 500 nm.

For example, the cellulose filaments can have an average aspect ratio of from about 200 to about 5000.

For example, the sheets in the multi-layer sheet can have been made on a paper machine.

For example, the sheets in the multi-layer sheet can have been made on a handsheet machine.

For example, the sheet can be a corrugated sheet.

For example, the first multi-layer sheet can comprise, consist essentially of or consist of a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$ of the present disclosure. For example, the first multi-layer sheet can comprise a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$ of the present disclosure. For example, the first multi-layer sheet can consist essentially of a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$ of the present disclosure. For example, the first multi-layer sheet can consist of a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$ of the present disclosure.

For example, the first multi-layer sheet can be a facing sheet. For example, the first multi-layer sheet can have from 2 to 10 layers.

For example, the first multi-layer sheet can be a facing sheet. For example, the first multi-layer sheet can have from 3 to 10 layers.

For example, the second multi-layer sheet can comprise, consist essentially of or consist of a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$ of the present disclosure. For example, the second multi-layer sheet can comprise a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$ of the present disclosure. For example, the second multi-layer sheet can consist essentially of a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$ of the present disclosure. For example, the second multi-layer sheet can consist of a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$ of the present disclosure.

For example, the second multi-layer sheet can be a backing sheet. For example the second multi-layer sheet can have from 2 to 5 layers.

For example, the honeycomb or corrugated core can comprise, consist essentially of or consist of a sheet comprising cellulose filaments and $CaSO_4.2H_2O$, the sheet comprising at least about 1% of cellulose filaments by weight, based on the total weight of the cellulose filaments and the $CaSO_4.2H_2O$ of the present disclosure. For example, the honeycomb or corrugated core can comprise a sheet comprising cellulose filaments and $CaSO_4.2H_2O$, the sheet comprising at least about 1% of cellulose filaments by weight, based on the total weight of the cellulose filaments and the $CaSO_4.2H_2O$ of the present disclosure. For example, the honeycomb or corrugated core can consist essentially of a sheet comprising cellulose filaments and $CaSO_4.2H_2O$, the sheet comprising at least about 1% of cellulose filaments by weight, based on the total weight of the cellulose filaments and the $CaSO_4.2H_2O$ of the present disclosure. For example, the honeycomb or corrugated core can consist of a sheet comprising cellulose filaments and $CaSO_4.2H_2O$, the sheet comprising at least about 1% of cellulose filaments by weight, based on the total weight of the cellulose filaments and the $CaSO_4.2H_2O$ of the present disclosure For example, the honeycomb or corrugated core can comprise, consist essentially of or consist of a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$. For example, the honeycomb or corrugated core can comprise a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$. For example, the honeycomb or corrugated core can consist essentially of a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$. For example, the honeycomb or corrugated core can consist of a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$.

For example, the multi-layer sheet can have 2 layers.

For example, the density of the gypsum panel can be less than about 0.45 $g/cm^3$.

For example, the density of the gypsum panel can be less than about 0.40 $g/cm^3$.

For example, the density of the gypsum panel can be less than about 0.35 $g/cm^3$.

For example, the density of the gypsum panel can be less than about 0.30 $g/cm^3$.

For example, the density of the gypsum panel can be less than about 0.25 $g/cm^3$.

For example, the density of the gypsum panel can be from about 0.20 $g/cm^3$ to about 0.30 $g/cm^3$.

For example, the density of the gypsum panel can be about 0.25 $g/cm^3$.

For example, the gypsum panel can further comprise an expandable mineral within the voids defined by the honeycomb or corrugated structure.

For example, the expandable mineral can comprise, consist essentially of consist of expanded perlite. For example, the expandable mineral can comprise expanded perlite. For example, the expandable mineral can consist essentially of expanded perlite. For example, the expandable mineral can consist of expanded perlite.

For example, the gypsum panel can further comprise a polymer within the voids defined by the honeycomb or corrugated structure.

For example, the polymer can comprise, consist essentially of or consist of a polybenzoxazole. For example, the polymer can comprise a polybenzoxazole. For example, the polymer can consist essentially of a polybenzoxazole. For example, the polymer can consist of a polybenzoxazole.

For example, the honeycomb or corrugated structure can be a honeycomb structure.

For example, the honeycomb or corrugated structure can be a corrugated structure.

For example, the gypsum panel can have a thickness of about 5 mm to about 10 mm.

For example, the gypsum panel can have a thickness of about 8 mm.

For example, the gypsum panel can have a thickness of about ¼ inch (about 6.4 mm).

For example, the gypsum panel can have a thickness of about ⅜ inch (about 9.5 mm).

For example, the gypsum panel can have a thickness of about ½ inch (about 12.7 mm).

For example, the gypsum panel can have a thickness of about ⅝ inch (about 15.9 mm).

For example, the gypsum panel can have a thickness of about 1 inch (about 25.4 mm).

For example, the gypsum panel can have a width of about 4 feet (about 122 cm).

For example, the gypsum panel can have a length of about 8 feet (about 244 cm).

For example, the gypsum panel can have a length of about 9 feet (about 274 cm).

For example, the gypsum panel can have a length of about 10 feet (about 305 cm).

For example, the gypsum panel can have a length of about 11 feet (about 335 cm).

For example, the gypsum panel can have a length of about 12 feet (about 366 cm).

For example, the aqueous suspension comprising cellulose filaments and $CaSO_4.2H_2O$ can be filtered through a screen.

For example, a filtration material can be deposited on the screen prior to filtering the aqueous suspension comprising cellulose filaments and $CaSO_4.2H_2O$ through the screen.

For example, the filtration material can comprise, consist essentially of or consist of filter paper, another fabric material or a combination thereof. For example, the filtration material can comprise filter paper, another fabric material or a combination thereof. For example, the filtration material can consist essentially of filter paper, another fabric material or a combination thereof. For example, the filtration material can consist of filter paper, another fabric material or a combination thereof.

For example, the filtration material can comprise, consist essentially of or consist of filter paper. For example, the filtration material can comprise filter paper. For example, the filtration material can consist essentially of filter paper. For example, the filtration material can consist of filter paper.

For example, the filtration material can comprise, consist essentially of or consist of another fabric material. For example, the filtration material can comprise another fabric material. For example, the filtration material can consist essentially of another fabric material. For example, the filtration material can consist of another fabric material.

For example, a retention aid can be added to the aqueous suspension comprising cellulose filaments and $CaSO_4.2H_2O$ prior to filtering the aqueous suspension comprising cellulose filaments and $CaSO_4.2H_2O$ through the screen.

For example, the retention aid can comprise, consist essentially of or consist of a cationic polyacrylamide, bentonite or a mixture thereof. For example, the retention aid can comprise a cationic polyacrylamide, bentonite or a mixture thereof. For example, the retention aid can consist essentially of a cationic polyacrylamide, bentonite or a mixture thereof. For example, the retention aid can consist of a cationic polyacrylamide, bentonite or a mixture thereof.

For example, the retention aid can comprise, consist essentially of or consist of a cationic polyacrylamide (CPAM). For example, the retention aid can comprise a cationic polyacrylamide (CPAM). For example, the retention aid can consist essentially of a cationic polyacrylamide (CPAM). For example, the retention aid can consist of a cationic polyacrylamide (CPAM).

For example, the retention aid can comprise, consist essentially of or consist of bentonite. For example, the retention aid can comprise bentonite. For example, the retention aid can consist essentially of bentonite. For example, the retention aid can consist of bentonite.

For example, the retention aid can comprise, consist essentially of or consist of a cationic polyacrylamide and bentonite. For example, the retention aid can comprise a cationic polyacrylamide and bentonite. For example, the retention aid can consist essentially of a cationic polyacrylamide and bentonite. For example, the retention aid can consist of a cationic polyacrylamide and bentonite.

For example, the drying can comprise drying the wet pad in a drying chamber.

For example, the aqueous suspension comprising cellulose filaments and $CaSO_4.2H_2O$ can be obtained by mixing a first suspension comprising $CaSO_4.2H_2O$ with a second suspension comprising cellulose filaments under conditions to obtain the aqueous suspension comprising cellulose filaments and $CaSO_4.2H_2O$.

For example, the first suspension can be obtained by mixing $CaSO_4.1/2H_2O$ and water.

For example, a pulper, blender, high speed mixer or other mixing equipment can be used to mix the $CaSO_4.1/2H_2O$ and the water.

For example, a pulper, blender or high speed mixer can be used to mix the $CaSO_4.1/2H_2O$ and the water.

For example, the second suspension can be obtained by mixing cellulose filaments and water under conditions to obtain substantially fully dispersed cellulose filaments. For example, for mixing, a pulper, blender, high speed mixer or other mixing equipment can be used.

For example, a disintegrator, pulper, blender or high speed mixer can be used to mix the cellulose filaments and the water.

For example, a pulper can be used to mix the cellulose filaments and the water.

For example, the first suspension can have a consistency of up to about 30 wt %.

For example, the second suspension can have a consistency of up to about 20 wt %.

For example, the second suspension can have a consistency of about 6.3 wt %.

For example, the ratio of the cellulose filaments to the $CaSO_4.2H_2O$ in the aqueous suspension comprising cellulose filaments and $CaSO_4.2H_2O$ can be from about 0.1:99.9 to about 50:50.

For example, the ratio of the cellulose filaments to the $CaSO_4.2H_2O$ in the aqueous suspension comprising cellulose filaments and $CaSO_4.2H_2O$ can be from about 1:99 to about 50:50.

For example, the ratio of the cellulose filaments to the $CaSO_4.2H_2O$ in the aqueous suspension comprising cellulose filaments and $CaSO_4.2H_2O$ can be from about 1:99 to about 25:75.

For example, the ratio of the cellulose filaments to the $CaSO_4.2H_2O$ in the aqueous suspension comprising cellulose filaments and $CaSO_4.2H_2O$ can be from about 2:98 to about 20:80.

For example, the ratio of the cellulose filaments to the $CaSO_4.2H_2O$ in the aqueous suspension comprising cellulose filaments and $CaSO_4.2H_2O$ can be from about 2:98 to about 10:90.

For example, the ratio of the cellulose filaments to the $CaSO_4.2H_2O$ in the aqueous suspension comprising cellulose filaments and $CaSO_4.2H_2O$ can be from about 2:98 to about 5:95.

For example, the ratio of the cellulose filaments to the $CaSO_4.2H_2O$ in the aqueous suspension comprising cellulose filaments and $CaSO_4.2H_2O$ can be from about 1:99 to about 3:97.

For example, the ratio of the cellulose filaments to the $CaSO_4.2H_2O$ in the aqueous suspension comprising cellulose filaments and $CaSO_4.2H_2O$ can be about 2:98.

For example, the aqueous suspension comprising cellulose filaments and $CaSO_4.2H_2O$ can have a total solid content of from about 1 wt % to about 30 wt %.

For example, the aqueous suspension comprising cellulose filaments and $CaSO_4.2H_2O$ can have a total solid content of from about 1 wt % to about 10 wt %.

For example, the aqueous suspension comprising cellulose filaments and $CaSO_4.2H_2O$ can have a total solid content of about 2.4 wt %.

For example, the method can be a method for preparing a papered CF-reinforced gypsum panel and the method can further comprise sandwiching the wet pad between two sheets of facing paper prior to drying.

For example, the facing paper can comprise, consist essentially of or consist of manila paper. For example, the facing paper can comprise manila paper. For example, the facing paper can consist essentially of manila paper. For example, the facing paper can consist of manila paper.

For example, the facing paper can comprise, consist essentially of or consist of Kraft paper. For example, the facing paper can comprise Kraft paper. For example, the facing paper can consist essentially of Kraft paper. For example, the facing paper can consist of Kraft paper.

For example, the facing paper can comprise, consist essentially of or consist of a sheet comprising cellulose filaments and $CaSO_4.2H_2O$, the sheet comprising at least about 1% of cellulose filaments by weight, based on the total weight of the cellulose filaments and the $CaSO_4.2H_2O$ of the present disclosure. For example, the facing paper can comprise a sheet comprising cellulose filaments and $CaSO_4.2H_2O$, the sheet comprising at least about 1% of cellulose filaments by weight, based on the total weight of the cellulose filaments and the $CaSO_4.2H_2O$ of the present disclosure. For example, the facing paper can consist essentially of a sheet comprising cellulose filaments and $CaSO_4.2H_2O$, the sheet comprising at least about 1% of cellulose filaments by weight, based on the total weight of the cellulose filaments and the $CaSO_4.2H_2O$ of the present disclosure. For example, the facing paper can consist of a sheet comprising cellulose filaments and $CaSO_4.2H_2O$, the sheet comprising at least about 1% of cellulose filaments by weight, based on the total weight of the cellulose filaments and the $CaSO_4.2H_2O$ of the present disclosure.

For example, the facing paper can comprise, consist essentially of or consist of a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$ of the present disclosure. For example, the facing paper can comprise a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$ of the present disclosure. For example, the facing paper can consist essentially of a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$ of the present disclosure. For example, the facing paper can consist of a multi-layer sheet comprising cellulose filaments and $CaSO_4.2H_2O$, the multi-layer sheet comprising at least about 1% of cellulose filaments by weight, based on the total weight of the cellulose filaments and the $CaSO_4.2H_2O$ of the present disclosure.

For example, the cellulose filaments can have an average length of from about 200 µM to about 2 mm.

For example, the cellulose filaments can have an average width of from about 30 nm to about 500 nm.

For example, the cellulose filaments can have an average aspect ratio of from about 200 to about 5000.

The present disclosure also includes a cellulose filament (CF)-reinforced gypsum panel prepared according to a method for preparing a cellulose filament-reinforced (CF-reinforced) gypsum panel of the present disclosure. It will be appreciated by a person skilled in the art that embodiments relating to such cellulose filament (CF)-reinforced gypsum panels of the present disclosure can be varied as discussed herein for the methods for preparing a cellulose filament-reinforced (CF-reinforced) gypsum panel of the present disclosure.

Further, for example, the density of the CF-reinforced gypsum panel can be from about 0.5 $g/cm^3$ to about 2.0 $g/cm^3$.

For example, the density of the CF-reinforced gypsum panel can be from about 0.5 $g/cm^3$ to about 1.5 $g/cm^3$.

For example, the density of the CF-reinforced gypsum panel can be from about 0.5 $g/cm^3$ to about 1.0 $g/cm^3$.

For example, the density of the CF-reinforced gypsum panel can be from about 0.6 $g/cm^3$ to about 0.8 $g/cm^3$.

For example, the flexural strength of the CF-reinforced gypsum panel can be at least about 1.5 MPa when measured according to ASTM D790.

For example, the flexural strength of the CF-reinforced gypsum panel can be at least about 2.0 MPa when measured according to ASTM D790.

For example, the flexural strength of the CF-reinforced gypsum panel can be at least about 2.5 MPa when measured according to ASTM D790.

For example, the flexural strength of the CF-reinforced gypsum panel can be at least about 3.0 MPa when measured according to ASTM D790.

For example, the flexural strength of the CF-reinforced gypsum panel can be at least about 3.5 MPa when measured according to ASTM D790.

For example, the flexural strength of the CF-reinforced gypsum panel can be at least about 4.0 MPa when measured according to ASTM D790.

For example, the flexural strength of the CF-reinforced gypsum panel can be at least about 4.5 MPa when measured according to ASTM D790.

For example, the flexural strength of the CF-reinforced gypsum panel can be at least about 5.0 MPa when measured according to ASTM D790.

For example, the flexural strength of the CF-reinforced gypsum panel can be at least about 6.0 MPa when measured according to ASTM D790.

For example, the flexural strength of the CF-reinforced gypsum panel can be at least about 7.0 MPa when measured according to ASTM D790.

For example, the flexural strength of the CF-reinforced gypsum panel can be at least about 8.0 MPa when measured according to ASTM D790.

For example, the flexural stress of the CF-reinforced gypsum panel can be from about 1.5 MPa to about 10.0 MPa when measured according to ASTM D790.

For example, the flexural stress of the CF-reinforced gypsum panel can be from about 2.0 MPa to about 8.0 MPa when measured according to ASTM D790.

For example, the flexural stress of the CF-reinforced gypsum panel can be from about 2.0 MPa to about 7.0 MPa when measured according to ASTM D790.

For example, the CF-reinforced gypsum panel can have a thickness of about ¼ inch (about 6.4 mm).

For example, the CF-reinforced gypsum panel can have a thickness of about ⅜ inch (about 9.5 mm).

For example, the CF-reinforced gypsum panel can have a thickness of about ½ inch (about 12.7 mm).

For example, the CF-reinforced gypsum panel can have a thickness of about ⅝ inch (about 15.9 mm).

For example, the CF-reinforced gypsum panel can have a thickness of about 1 inch (about 25.4 mm).

For example, the CF-reinforced gypsum panel can have a width of about 4 feet (about 122 cm).

For example, the CF-reinforced gypsum panel can have a length of about 8 feet (about 244 cm).

For example, the CF-reinforced gypsum panel can have a length of about 9 feet (about 274 cm).

For example, the CF-reinforced gypsum panel can have a length of about 10 feet (about 305 cm).

For example, the CF-reinforced gypsum panel can have a length of about 11 feet (about 335 cm).

For example, the CF-reinforced gypsum panel can have a length of about 12 feet (about 366 cm).

For example, the foam composition can be obtained by incorporating air into a composition comprising the cellulose filaments, $CaSO_4.2H_2O$, and a foaming agent.

For example, the foaming agent can comprise, consist essentially of or consist of an anionic surfactant, a cationic surfactant, an inorganic surfactant or a combination thereof. For example, the foaming agent can comprise an anionic surfactant, a cationic surfactant, an inorganic surfactant or a combination thereof. For example, the foaming agent can consist essentially of an anionic surfactant, a cationic surfactant, an inorganic surfactant or a combination thereof. For example, the foaming agent can consist of an anionic surfactant, a cationic surfactant, an inorganic surfactant or a combination thereof.

For example, the foaming agent can comprise, consist essentially of or consist of a propylene oxide methanol adduct. For example, the foaming agent can comprise a propylene oxide methanol adduct. For example, the foaming agent can consist essentially of a propylene oxide methanol adduct. For example, the foaming agent can consist of a propylene oxide methanol adduct.

For example, the foaming agent can be present in an amount of from about 0.5 wt % to about 10 wt %, based on the total weight of the composition comprising the cellulose filaments, $CaSO_4.2H_2O$, and the foaming agent.

For example, the foaming agent can be present in an amount of from about 1 wt % to about 5 wt %, based on the total weight of the composition comprising the cellulose filaments, $CaSO_4.2H_2O$, and the foaming agent.

For example, the foaming agent can be present in an amount of from about 1.5 wt % to about 3 wt %, based on the total weight of the composition comprising the cellulose filaments, $CaSO_4.2H_2O$, and the foaming agent.

For example, the composition can comprise the cellulose filaments, $CaSO_4.2H_2O$, and at least one other ingredient chosen from a foaming agent, a settling accelerator, a synthetic binder or adhesive, a hardener, and a retardant.

For example, the composition can comprise the cellulose filaments, $CaSO_4.2H_2O$, and at least two other ingredients chosen from a foaming agent, a settling accelerator, a synthetic binder or adhesive, and a retardant.

For example, the composition can comprise the cellulose filaments, $CaSO_4.2H_2O$, and at least three other ingredients chosen from a foaming agent, a settling accelerator, a synthetic binder or adhesive, and a retardant.

For example, the composition can comprise the cellulose filaments, $CaSO_4.2H_2O$, and at least four other ingredients chosen from a foaming agent, a settling accelerator, a synthetic binder or adhesive, and a retardant.

For example, the composition can comprise the cellulose filaments, $CaSO_4.2H_2O$, and at least five other ingredients chosen from a foaming agent, a settling accelerator, a synthetic binder or adhesive, and a retardant.

For example, the composition comprising the cellulose filaments, $CaSO_4.2H_2O$, and the foaming agent can further comprise a settling accelerator.

For example, the settling accelerator can comprise, consist essentially of or consist of a sulphate salt of a weak alkali. For example, the settling accelerator can comprise a sulphate salt of a weak alkali. For example, the settling accelerator can consist essentially of a sulphate salt of a weak alkali. For example, the settling accelerator can consist of a sulphate salt of a weak alkali.

For example, the sulphate salt of a weak alkali can comprise, consist essentially of or consist of potassium aluminium sulphate, aluminium sulphate, zinc sulphate, copper sulphate or mixtures thereof. For example, the sulphate salt of a weak alkali can comprise potassium aluminium sulphate, aluminium sulphate, zinc sulphate, copper sulphate or mixtures thereof. For example, the sulphate salt of a weak alkali can consist essentially of potassium aluminium sulphate, aluminium sulphate, zinc sulphate, copper sulphate or mixtures thereof. For example, the sulphate salt of a weak alkali can consist of potassium aluminium sulphate, aluminium sulphate, zinc sulphate, copper sulphate or mixtures thereof.

For example, the composition comprising the cellulose filaments, $CaSO_4.2H_2O$, and the foaming agent can further comprise a synthetic binder or adhesive.

For example, the synthetic binder or adhesive can comprise, consist essentially of or consist of polyvinyl alcohol (PVA), polyvinyl acetate (PVAc), melamine formaldehyde (MF) or mixtures thereof. For example, the synthetic binder or adhesive can comprise polyvinyl alcohol (PVA), polyvinyl acetate (PVAc), melamine formaldehyde (MF) or mixtures thereof. For example, the synthetic binder or adhesive can consist essentially of polyvinyl alcohol (PVA), polyvinyl acetate (PVAc), melamine formaldehyde (MF) or mixtures thereof. For example, the synthetic binder or adhesive can consist of polyvinyl alcohol (PVA), polyvinyl acetate (PVAc), melamine formaldehyde (MF) or mixtures thereof.

For example, the synthetic binder or adhesive can comprise, consist essentially of or consist of polyvinyl acetate (PVAc). For example, the synthetic binder or adhesive can comprise polyvinyl acetate (PVAc). For example, the synthetic binder or adhesive can consist essentially of polyvinyl acetate (PVAc). For example, the synthetic binder or adhesive can consist of polyvinyl acetate (PVAc).

For example, the synthetic binder or adhesive can be present in an amount of from about 0.5 wt % to about 10 wt %, based on the total weight of the composition comprising the cellulose filaments, $CaSO_4.2H_2O$, and the foaming agent.

For example, the synthetic binder or adhesive can be present in an amount of from about 2 wt % to about 6 wt %, based on the total weight of the composition comprising the cellulose filaments, $CaSO_4.2H_2O$, and the foaming agent.

For example, the synthetic binder or adhesive can be present in an amount of from about 3 wt % to about 5 wt %, based on the total weight of the composition comprising the cellulose filaments, $CaSO_4.2H_2O$, and the foaming agent.

For example, the synthetic binder or adhesive can be present in an amount of about 4 wt %, based on the total weight of the composition comprising the cellulose filaments, $CaSO_4.2H_2O$, and the foaming agent.

For example, the composition comprising the cellulose filaments, $CaSO_4.2H_2O$, and the foaming agent can further comprise a hardener for the synthetic binder or adhesive.

For example, the synthetic binder or adhesive can comprise, consist essentially of or consist of polyvinyl acetate (PVAc) and the hardener for the PVAc can comprise, consist essentially of or consist of p-toluenesufonic acid monohydrate. For example, the synthetic binder or adhesive can comprise, consist essentially of or consist of polyvinyl acetate (PVAc) and the hardener for the PVAc can comprise p-toluenesufonic acid monohydrate. For example, the synthetic binder or adhesive can comprise, consist essentially of or consist of polyvinyl acetate (PVAc) and the hardener for the PVAc can consist essentially of p-toluenesufonic acid monohydrate. For example, the synthetic binder or adhesive can comprise, consist essentially of or consist of polyvinyl acetate (PVAc) and the hardener for the PVAc can consist of p-toluenesufonic acid monohydrate.

For example, the hardener for the synthetic binder or adhesive can be present in an amount of from about 0.1 wt % to about 3 wt %, based on the total weight of the composition comprising the cellulose filaments, $CaSO_4.2H_2O$, and the foaming agent.

For example, the hardener for the synthetic binder or adhesive can be present in an amount of from about 0.25 wt % to about 2 wt %, based on the total weight of the composition comprising the cellulose filaments, $CaSO_4.2H_2O$, and the foaming agent.

For example, the hardener for the synthetic binder or adhesive can be present in an amount of from about 0.4 wt % to about 1.2 wt %, based on the total weight of the composition comprising the cellulose filaments, $CaSO_4.2H_2O$, and the foaming agent.

For example, the composition comprising the cellulose filaments, $CaSO_4.2H_2O$, and a foaming agent can further comprise starch.

For example, the starch can be present in an amount of from about 0.1 wt % to about 3 wt %, based on the total weight of the composition comprising the cellulose filaments, $CaSO_4.2H_2O$, and the foaming agent.

For example, the starch can be present in an amount of from about 0.25 wt % to about 2 wt %, based on the total weight of the composition comprising the cellulose filaments, $CaSO_4.2H_2O$, and the foaming agent.

For example, the starch can be present in an amount of from about 0.5 wt % to about 1 wt %, based on the total weight of the composition comprising the cellulose filaments, $CaSO_4.2H_2O$, and the foaming agent.

For example, the composition comprising said cellulose filaments, $CaSO_4.2H_2O$, and a foaming agent can further comprise a retardant.

For example, the retardant can comprise, consist essentially of or consist of a solid soluble acid retarder. For example, the retardant can comprise a solid soluble acid retarder. For example, the retardant can consist essentially of a solid soluble acid retarder. For example, the retardant can consist of a solid soluble acid retarder.

For example, the solid soluble acid retarder can comprise, consist essentially of or consist of citric acid, tartaric acid, oxalic acid or mixtures thereof. For example, the solid soluble acid retarder can comprise citric acid, tartaric acid, oxalic acid or mixtures thereof. For example, the solid soluble acid retarder can consist essentially of citric acid, tartaric acid, oxalic acid or mixtures thereof. For example, the solid soluble acid retarder can consist of citric acid, tartaric acid, oxalic acid or mixtures thereof.

For example, the composition comprising the cellulose filaments, $CaSO_4.2H_2O$, and the foaming agent can have a solid content of from about 10% to about 30%.

For example, the composition comprising the cellulose filaments, $CaSO_4.2H_2O$, and the foaming agent can have a solid content of from about 16% to about 24.5%.

For example, the composition comprising the cellulose filaments, $CaSO_4.2H_2O$, and the foaming agent can have a solid content of from about 12% to about 20%.

For example, the composition comprising the cellulose filaments, $CaSO_4.2H_2O$, and the foaming agent can have a solid content of about 16%.

For example, air can be incorporated into the composition comprising the cellulose filaments, $CaSO_4.2H_2O$, and the foaming agent by injecting air into the composition comprising the cellulose filaments, $CaSO_4.2H_2O$, and the foaming agent by means of at least one air jet.

For example, air can be incorporated into the composition comprising the cellulose filaments, $CaSO_4.2H_2O$, and the foaming agent by stirring and/or agitating the composition comprising the cellulose filaments, $CaSO_4.2H_2O$, and the foaming agent.

For example, the stirring and/or agitating can be for a time of from about 30 seconds to about 10 minutes.

For example, the stirring and/or agitating can be for a time of from about 1 minute to about 8 minutes.

For example, the stirring and/or agitating can be for a time of from about 2 minutes to about 4 minutes.

For example, the air incorporation can be made under conditions to obtain a distribution of air bubbles into the foam composition.

For example, the drying the wet foamed pad can comprise draining the wet foamed pad.

For example, the drying the wet foamed pad can comprise draining the wet foamed pad by means of a filter or a screen.

For example, the drying the wet foamed pad can comprise heating the wet foamed pad.

For example, the drying the wet foamed pad can comprise heating the wet foamed pad by means of an infrared heater.

Further, for example, the density of the foamed CF-reinforced gypsum panel can be less than about 0.50 g/cm$^3$.

For example, the density of the foamed CF-reinforced gypsum panel can be less than about 0.45 g/cm$^3$.

For example, the density of the foamed CF-reinforced gypsum panel can be less than about 0.40 g/cm$^3$.

For example, the density of the foamed CF-reinforced gypsum panel can be less than about 0.35 g/cm$^3$.

For example, the density of the foamed CF-reinforced gypsum panel can be less than about 0.30 g/cm$^3$.

For example, the density of the foamed CF-reinforced gypsum panel can be less than about 0.25 g/cm$^3$.

For example, the density of the foamed CF-reinforced gypsum panel can be less than about 0.20 g/cm$^3$.

For example, the density of the foamed CF-reinforced gypsum panel can be from about 0.20 g/cm$^3$ to about 0.25 cm$^3$.

For example, the foamed CF-reinforced gypsum panel can have a thickness of about ¼ inch (about 6.4 mm).

For example, the foamed CF-reinforced gypsum panel can have a thickness of about ⅜ inch (about 9.5 mm).

For example, the foamed CF-reinforced gypsum panel can have a thickness of about ½ inch (about 12.7 mm).

For example, the foamed CF-reinforced gypsum panel can have a thickness of about ⅝ inch (about 15.9 mm).

For example, the foamed CF-reinforced gypsum panel can have a thickness of about 1 inch (about 25.4 mm).

For example, the foamed CF-reinforced gypsum panel can have a width of about 4 feet (about 122 cm).

For example, the foamed CF-reinforced gypsum panel can have a length of about 8 feet (about 244 cm).

For example, the foamed CF-reinforced gypsum panel can have a length of about 9 feet (about 274 cm).

For example, the foamed CF-reinforced gypsum panel can have a length of about 10 feet (about 305 cm).

For example, the foamed CF-reinforced gypsum panel can have a length of about 11 feet (about 335 cm).

For example, the foamed CF-reinforced gypsum panel can have a length of about 12 feet (about 366 cm).

For example, the method for preparing a cellulose filament-reinforced (CF-reinforced) gypsum sheet can be a method for preparing a CF-reinforced gypsum handsheet, and the method can comprise:

adding an aqueous suspension comprising cellulose filaments and CaSO$_4$.2H$_2$O to a deckle under conditions to obtain the wet fiber mat;

pressing the wet fiber mat with a manual roll under conditions to remove water and obtain a pressed sheet;

optionally repeating the pressing; and drying the pressed sheet using a dryer under conditions to obtain the CF-reinforced gypsum sheet.

For example, the drying can be carried out in a drum dryer.

For example, the drying can be carried out at a temperature of from about 30° C. to about 140° C.

For example, the drying can be carried out at a temperature of from about 30° C. to about 70° C.

For example, the drying can be carried out at a temperature of from about 40° C. to about 60° C.

For example, the drying can be carried out at a temperature of about 50° C.

For example, the method can further comprise couching the wet fiber mat prior to pressing.

For example, the aqueous suspension comprising cellulose filaments and CaSO$_4$.2H$_2$O can further comprise a retention aid.

For example, the retention aid can comprise, consist essentially of or consist of a cationic polyacrylamide, bentonite or a mixture thereof. For example, the retention aid can comprise a cationic polyacrylamide, bentonite or a mixture thereof. For example, the retention aid can consist essentially of a cationic polyacrylamide, bentonite or a mixture thereof. For example, the retention aid can consist of a cationic polyacrylamide, bentonite or a mixture thereof.

For example, the retention aid can comprise, consist essentially of or consist of a cationic polyacrylamide and bentonite. For example, the retention aid can comprise a cationic polyacrylamide and bentonite. For example, the retention aid can consist essentially of a cationic polyacrylamide and bentonite. For example, the retention aid can consist of a cationic polyacrylamide and bentonite.

For example, the cellulose filaments can have an average length of from about 200 μM to about 2 mm.

For example, the cellulose filaments can have an average width of from about 30 nm to about 500 nm.

For example, the cellulose filaments can have an average aspect ratio of from about 200 to about 5000.

For example, the method for preparing a cellulose filament-reinforced (CF-reinforced) gypsum sheet can comprise using a paper machine, and the method can comprise:

adding an aqueous suspension comprising cellulose filaments and CaSO$_4$.2H$_2$O to a forming section of the paper machine under conditions to obtain a wet fiber web;

pressing the wet fiber web with a press section of the paper machine under conditions to obtain a pressed web; and drying the pressed web under conditions to obtain the CF-reinforced gypsum sheet.

For example, the method can further comprise adding the aqueous suspension comprising cellulose filaments and CaSO$_4$.2H$_2$O to a headbox of the paper machine, and dispensing the aqueous suspension comprising cellulose filaments and CaSO$_4$.2H$_2$O from the headbox to the forming section of the paper machine.

For example, the method can further comprise passing the aqueous suspension comprising cellulose filaments and CaSO$_4$.2H$_2$O through a screen prior to adding the aqueous suspension comprising cellulose filaments and CaSO$_4$.2H$_2$O to the headbox.

Suitable forming sections and configurations thereof for paper machines can be selected by a person skilled in the art. For example, the forming section of the paper machine can comprise a twin-wire roll forming section.

Suitable press sections and configurations thereof for paper machines can be selected by a person skilled in the art. For example, the press section of the paper machine can comprise a four-roll, three-nip press section.

For example, the pressed web can have a solid content of from about 50% to about 80%.

For example, the pressed web can have a solid content of from about 60% to about 70%.

For example, the speed of the paper machine can be set at about 100 m/minute to about 1000 m/minute or about 300 m/minute to about 500 m/minute.

For example, the speed of the paper machine can be set at about 400 m/minute.

For example, the drying can comprise drying the pressed web using a drying section of the paper machine under conditions to obtain the CF-reinforced gypsum sheet. Suitable drying sections and configurations thereof for paper machines can be selected by a person skilled in the art. For example, the drying section of the paper machine can comprise two Yankee dryers.

For example, the drying can comprise drying the pressed web off-line of the paper machine. Suitable means for drying pressed web off-line of paper machines can be selected by a person skilled in the art.

For example, the method can further comprise rolling the pressed web under conditions to obtain a wet roll and drying the pressed web using a post-drier under conditions to obtain the CF-reinforced gypsum sheet.

For example, the pressed web can be dried at a temperature of about 100° C. to about 140° C.

For example, the pressed web can be dried at a temperature of about 120° C.

For example, the pressed web can be dried at a speed of from about 10 m/minute to about 100 m/minute.

For example, the pressed web can be dried at a speed of from about 30 m/minute to about 70 m/minute.

For example, the pressed web can be dried to at least about 85% dryness.

For example, the pressed web can be dried to at least about 90% dryness.

For example, the pressed web can be dried to at least about 95% dryness.

For example, the pressed web can be dried to from about 90% dryness to about 95% dryness.

For example, the method can further comprise cutting the CF-reinforced gypsum sheet to a desired length.

For example, the aqueous suspension comprising cellulose filaments and $CaSO_4.2H_2O$ can be obtained by mixing, in a machine chest of the paper machine, an aqueous suspension comprising cellulose filaments and an aqueous suspension comprising $CaSO_4.2H_2O$ under conditions to obtain the aqueous suspension comprising cellulose filaments and $CaSO_4.2H_2O$.

For example, the aqueous suspension comprising cellulose filaments can have a consistency of about 1% to about 20%.

For example, the aqueous suspension comprising cellulose filaments can have a consistency of about 1% to about 10%.

For example, the aqueous suspension comprising cellulose filaments can have a consistency of about 4%.

For example, the aqueous suspension comprising $CaSO_4.2H_2O$ can have a consistency of about 1% to about 30%.

For example, the aqueous suspension comprising $CaSO_4.2H_2O$ can have a consistency of about 5% to about 15%.

For example, the aqueous suspension comprising $CaSO_4.2H_2O$ can have a consistency of about 10%.

For example, the method can further comprise diluting the aqueous suspension comprising cellulose filaments and $CaSO_4.2H_2O$ for example, with process whitewater to obtain a desired solid content prior to adding the aqueous suspension comprising cellulose filaments and $CaSO_4.2H_2O$ to the forming section of the paper machine.

For example, the aqueous suspension comprising cellulose filaments and $CaSO_4.2H_2O$ added to the forming section of the paper machine can have a solid content of about 10 wt %.

For example, the aqueous suspension comprising cellulose filaments and $CaSO_4.2H_2O$ can further comprise a retention aid.

For example, the retention aid can comprise, consist essentially of or consist of a cationic polyacrylamide, bentonite or a mixture thereof. For example, the retention aid can comprise a cationic polyacrylamide, bentonite or a mixture thereof. For example, the retention aid can consist essentially of a cationic polyacrylamide, bentonite or a mixture thereof. For example, the retention aid can consist of a cationic polyacrylamide, bentonite or a mixture thereof.

For example, the retention aid can comprise, consist essentially of or consist of a cationic polyacrylamide and bentonite. For example, the retention aid can comprise a cationic polyacrylamide and bentonite. For example, the retention aid can consist essentially of a cationic polyacrylamide and bentonite. For example, the retention aid can consist of a cationic polyacrylamide and bentonite.

For example, the cellulose filaments can have an average length of from about 200 µm to about 2 mm.

For example, the cellulose filaments can have an average width of from about 30 nm to about 500 nm.

For example, the cellulose filaments can have an average aspect ratio of from about 200 to about 5000.

The present disclosure also includes a cellulose filament (CF)-reinforced gypsum sheet prepared according to a method for preparing a cellulose filament-reinforced (CF-reinforced) gypsum sheet of the present disclosure. It will be appreciated by a person skilled in the art that embodiments relating to such cellulose filament (CF)-reinforced gypsum sheets of the present disclosure can be varied as discussed herein for the methods for preparing a cellulose filament-reinforced (CF-reinforced) gypsum sheet of the present disclosure.

For example, the plurality of wet sheets can comprise a plurality of wet handsheets obtained from a handsheet mold.

For example, the wet sheet can be obtained by a method comprising re-wetting a dry sheet comprising cellulose filaments and $CaSO_4.2H_2O$ under conditions to obtain a wet sheet.

For example, the re-wetting can comprise adding water to the dry sheet and conditioning for a time of from zero to about 48 hours.

For example, the re-wetting can comprise adding water to the dry sheet and conditioning for a time of from zero to about 24 hours.

For example, the re-wetting can comprise adding water to the dry sheet and conditioning for a time of from zero to about 1 hour.

For example, the plurality of wet sheets can comprise a plurality of wet webs on a paper machine, the paper machine comprising rollers configured to press the wet webs together to obtain the wet multi-layer sheet.

For example, the pressing of the plurality of wet sheets can comprise laminating together at least two sheets.

For example, the wet sheet can have a solid content of up to about 80%.

For example, the wet sheet can have a solid content of up to about 55%.

For example, the wet sheet can have a solid content of up to about 50%.

For example, the wet sheet can have a solid content of from about 40% to about 60%.

For example, the wet sheet can have a solid content of from about 50% to about 60%.

For example, the wet sheet can have a solid content of from about 55% to about 80%.

For example, the wet sheet can have a solid content of about 60%.

For example, the wet multi-layer sheet can have a basis weight of about 50 $g/m^2$ to about 25,000 $g/m^2$.

For example, the wet sheet can have a basis weight of about 50 $g/m^2$ to about 25,000 $g/m^2$.

For example, the wet sheet can have a basis weight of about 150 $g/m^2$ to about 250 $g/m^2$.

For example, the wet sheet can have a basis weight of about 150 $g/m^2$ to about 500 $g/m^2$.

For example, the wet sheet can have a basis weight of about 200 $g/m^2$.

For example, the wet multi-layer sheet can be dried at a temperature of less than about 70° C.

For example, the wet multi-layer sheet can be dried at a temperature of less than about 60° C.

For example, the wet multi-layer sheet can be dried at a temperature of less than about 50° C.

For example, the wet multi-layer sheet can be dried at a temperature of from about 25° C. to about 70° C.

For example, the wet multi-layer sheet can be dried at a temperature of from about 30° C. to about 70° C.

For example, the wet multi-layer sheet can be dried at a temperature of from about 40° C. to about 60° C.

For example, the wet multi-layer sheet can be dried at a temperature of about 50° C.

For example, the drying can comprise the use of a speed-dryer.

For example, the plurality of wet sheets can be pressed at a pressure of about 200 psi to about 1000 psi.

For example, the plurality of wet sheets can be pressed at a pressure of about 300 psi to about 500 psi.

For example, the plurality of wet sheets can be pressed at a pressure of about 350 psi to about 400 psi or about 375 psi.

For example, the plurality of wet sheets can be pressed at a pressure of about 375 psi.

The present disclosure also includes a cellulose filament-reinforced (CF-reinforced) gypsum multi-layer sheet prepared by a method for preparing a cellulose filament-reinforced (CF-reinforced) gypsum multi-layer sheet of the present disclosure. It will be appreciated by a person skilled in the art that embodiments relating to such cellulose filament-reinforced (CF-reinforced) gypsum multi-layer sheets of the present disclosure can be varied as discussed herein for the methods for preparing a cellulose filament-reinforced (CF-reinforced) gypsum multi-layer sheet of the present disclosure.

The present disclosure also includes a use of cellulose filaments for preparing a cellulose filament-reinforced (CF-reinforced) gypsum panel. It will be appreciated by a person skilled in the art that embodiments relating to such uses can be varied, for example, as discussed herein for the methods for preparing a CF-reinforced gypsum panel of the present disclosure.

The present disclosure also includes a use of cellulose filaments for preparing a foamed cellulose filament-reinforced (CF-reinforced) gypsum panel. It will be appreciated by a person skilled in the art that embodiments relating to such uses can be varied, for example, as discussed herein for the methods for preparing a foamed cellulose filament-reinforced (CF-reinforced) gypsum panel of the present disclosure.

The present disclosure also includes a use of cellulose filaments for preparing a cellulose filament-reinforced (CF-reinforced) gypsum sheet. It will be appreciated by a person skilled in the art that embodiments relating to such uses can be varied, for example, as discussed herein for the methods for preparing a cellulose filament-reinforced (CF-reinforced) gypsum sheet of the present disclosure.

The present disclosure also includes a use of cellulose filaments for preparing a cellulose filament-reinforced (CF-reinforced) gypsum multi-layer sheet. It will be appreciated by a person skilled in the art that embodiments relating to such uses can be varied, for example, as discussed herein for the methods for preparing a cellulose filament-reinforced (CF-reinforced) gypsum multi-layer sheet of the present disclosure.

For example, the ratio by weight of the cellulose filaments to the $CaSO_4.2H_2O$ can be from about 1:99 to about 50:50.

For example, the ratio by weight of the cellulose filaments to the $CaSO_4.2H_2O$ can be from about 1:99 to about 30:80.

For example, the ratio by weight of the cellulose filaments to the $CaSO_4.2H_2O$ can be from about 2:98 to about 20:80.

For example, the ratio by weight of the cellulose filaments to the $CaSO_4.2H_2O$ can be from about 10:90 to about 20:80.

For example, the ratio by weight of the cellulose filaments to the $CaSO_4.2H_2O$ can be about 2:98.

For example, the ratio by weight of the cellulose filaments to the $CaSO_4.2H_2O$ can be about 5:95.

For example, the ratio by weight of the cellulose filaments to the $CaSO_4.2H_2O$ can be about 10:90.

For example, the ratio by weight of the cellulose filaments to the $CaSO_4.2H_2O$ can be about 15:85.

For example, the ratio by weight of the cellulose filaments to the $CaSO_4.2H_2O$ can be about 20:80.

For example, the aqueous suspension can have a consistency of from about 1 wt % to about 20 wt %.

For example, the aqueous suspension can have a consistency of from about 1 wt % to about 10 wt %.

For example, the aqueous suspension can have a consistency of from about 2 wt % to about 6 wt %.

For example, the aqueous suspension can have a consistency of about 4.0 wt %.

For example, the aqueous suspension can have a consistency of about 2.8 wt %.

For example, the aqueous suspension can have a consistency of about 2.4 wt %.

For example, the aqueous suspension can have a consistency of about 10 wt %.

For example, the aqueous suspension can have a consistency of about 20 wt %.

For example, the aqueous suspension can have a consistency of about 30 wt %.

For example, the aqueous suspension can have a consistency of about 50 wt %.

For example, the aqueous suspension can have a consistency of about 20 wt % to about 50 wt %.

For example, the aqueous suspension can have a consistency of about 10 wt % to about 50 wt %.

For example, in a process for manufacturing a gypsum panel, the improvement wherein before entering a forming station and/or a boardline, $CaSO_4.2H_2O$ used for manufacturing the panel is mixed with cellulose filaments.

For example, the cellulose filaments can have an average length of from about 200 μM to about 2 mm.

For example, the cellulose filaments can have an average width of from about 30 nm to about 500 nm.

For example, the cellulose filaments can have an average aspect ratio of from about 200 to about 5000.

For example, in a process for manufacturing a sheet comprising $CaSO_4.2H_2O$ in a paper machine, the improvement wherein before forming the sheet in the paper machine, $CaSO_4.2H_2O$ used for manufacturing the panel is mixed with cellulose filaments.

For example, the cellulose filaments can have an average length of from about 200 μM to about 2 mm.

For example, the cellulose filaments can have an average width of from about 30 nm to about 500 nm.

For example, the cellulose filaments can have an average aspect ratio of from about 200 to about 5000.

EXAMPLES

Introduction for Examples 1 and 2

Conventional gypsum panel is usually made of gypsum crystals pressed between two thick sheets of paper. The gypsum plaster core primarily comprises fully hydrated calcium sulfate which provides high strength in compression, while the face papers effectively act as composite reinforcement to the core and may, for example, be a useful part of the panel's ultimate strength and performance. Preparing a lighter weight gypsum panel may, for example accelerate and facilitate drywall installation and handling and/or reduce transportation costs. To date, the most widespread strategy to prepare lightweight panels is to reduce the density of the core by methods which include the introduction of air to the core or the addition of expandable minerals like perlite. However, known methods prepare panels with significantly weakened structure. Panel strength is a useful aspect in panel design as panels withstand, for example, various forces and loads and/or resist nail pull through.

An object of the present studies was to prepare gypsum panels which had higher strength and/or reduced density at the same strength as conventional gypsum panels. Another object of the present studies was to develop an ultra-light weight gypsum core which may, for example, be stronger than known gypsum foam cores which are presently on the market.

CF/gypsum pads were prepared using a laboratory papermaking method. The strength of these novel CF/gypsum pads was evaluated and compared to a commercial gypsum core offered on the market. The reinforcing performance of CF in the CF/gypsum pad was compared with that of other fibers currently used in conventional gypsum board, such as Kraft and glass fibers.

General Experimental Details for Examples 1 and 2

I. Preparation of CF/Gypsum Pad
(a) Materials
Cellulose filaments (CF) produced from Kraft fibers at a conventional refining intensity and a specific refining energy of about 5000 kwh/t used in wet (about 30% solids) or in dried form.
Calcium sulfate hemihydrate $CaSO_4.1/2H_2O$
(b) Preparation of CF/Gypsum Suspensions in Water
Suspension 1. $CaSO_4.2H_2O$ (gypsum) suspensions of up to about 30% consistency were prepared by vigorously mixing $CaSO_4.1/2H_2O$ in water in mixing equipment, such as a pulper, blender, high speed mixer, etc. Optical microscopy and conductivity were used to confirm the conversion of $CaSO_4.1/2H_2O$ into $CaSO_4.2H_2O$ which exhibits a characteristic rod-like structure.
Suspension 2. CF suspensions of up to about 10% consistency were prepared in mixing equipment, such as a disintegrator, pulper, blender, high speed mixer, etc. in hot water until the CF was fully dispersed. For example, a dispersion was prepared at a consistency of 6.3 wt % using a helical pulper (a Kadant Lamort Pulper). Other mixing equipment could also be used for this step.

Mixture 1. Suspensions 1 and 2 were combined together by stirring with an overhead stirrer for 10 minutes, to prepare mixtures having the following different ratios of CF/gypsum: 0/100, 2/98, 5/95, 10/90 and 20/80. The CF/gypsum suspensions had a total solid content of 2.4 wt % (i.e. 48 g O.D. in 2 L). As used herein, the solid content is equal to the ratio of the dried total weight of CF and gypsum to the wet total weight of the CF/gypsum slurry.
(c) Preparation of a High Basis Weight CF/Gypsum Pad (about 2400 Gsm)
Mixture 1 was filtered through a vacuum assisted laboratory circular handsheet former of 16 cm in diameter (FIG. 1) to produce a high basis weight pad of about 2400 grams per square meter (gsm). A filter paper or another type of filtration material was deposited on the screen prior to filtration to prevent CF/gypsum loss. In the case where filtration materials could not be used, retention aids, such as a cationic-polyacrylamide (CPAM), bentonite, etc. could be added to the mixture to assist in CF/gypsum retention.

Figure 2:
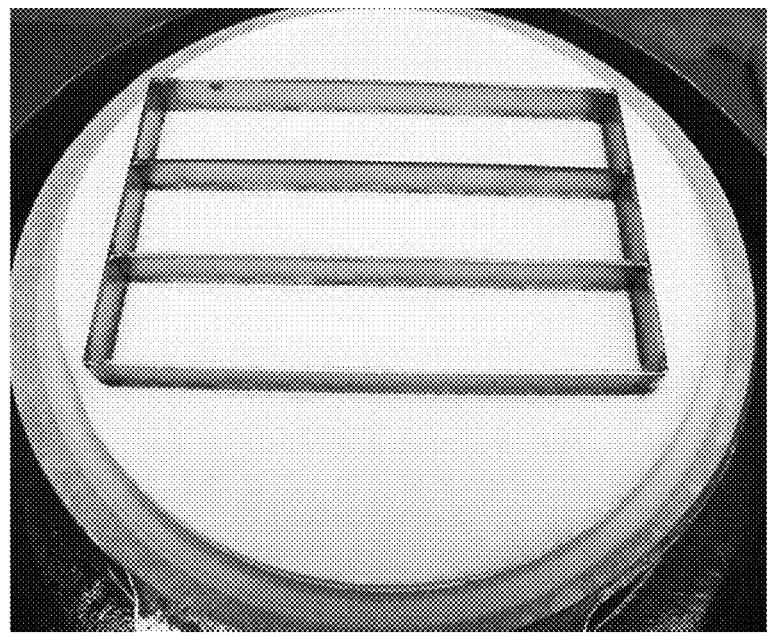
FIG. 2 shows exemplary photographs of the preparation of a cellulose filament (CF)/gypsum pad using a laboratory papermaking method in the studies of the present disclosure: (A) a rectangular-shaped die cutter deposited on a wet CF/gypsum pad, which was pressed and (B) removed.
Figure 2:
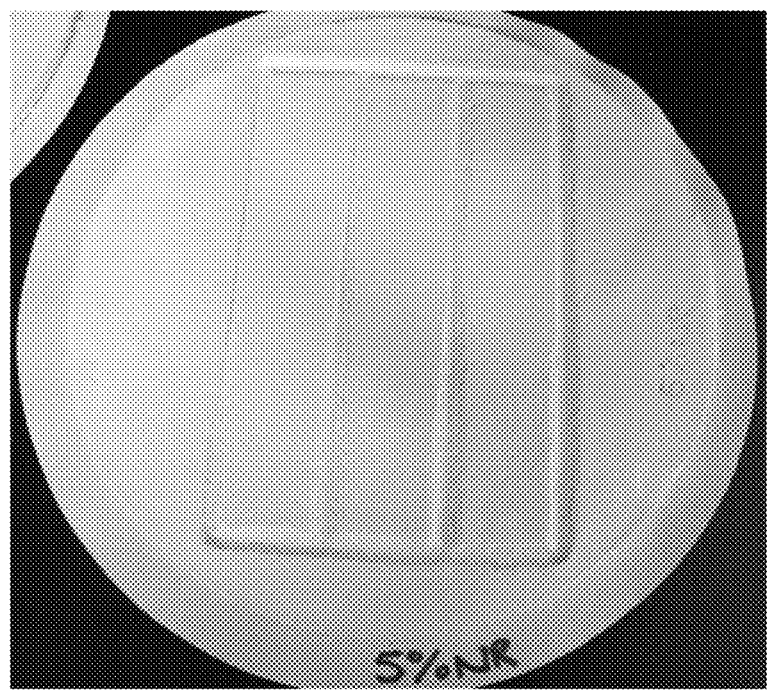

A rectangular-shaped die cutter was then deposited, pressed and removed from the wet pad to ease sample cutting once dry (FIG. 2). The pad was then only slightly couched; no pressing step was applied. Drying was performed on a speed dryer at 70° C. for 2 hours and left to dry at 50° C. until dried to avoid crystal water loss during drying at a higher temperature.

The so-obtained pads had a density of 0.6-0.7 $g/cm^3$.

II. Preparation of Ultra-light Foamed CF Gypsum Cores
(a) Materials
Cellulose filaments (CF) produced from Kraft fibers at a conventional refining intensity and a specific refining energy of about 5000 kwh/t used in wet (about 30% solids) or in dried form.
Calcium Sulfate Hemihydrate $CaSO_4.1/2H_2O$
Surfactants such as foaming agents, settling accelerators, retardants, binders, expandable minerals (for example, propylene oxide methanol adduct, polyvinyl acetate, p-toluene-sufonic acid monohydrate, starch, perlite, etc.).

III. Preparation of Comparative Examples
(a) Materials
Kraft fibers (non-refined (freeness about 600 CSF) suspension of 2 wt %) and refined (freeness about 400 CSF) suspension of 2 wt %); short glass fibers (2-3 mm in length, 4 μm in diameter); and commercial gypsum panel (SHEETROCK® Fire Code CGC made by USG) sold by Home Depot.
(b) Preparation of Fiber/Gypsum Suspensions in Water
Mixture 2. Suspension 1 (see section 1(b)) and the non-refined Kraft suspension were combined together by stirring with an overhead stirrer for 10 minutes, to prepare mixtures having the following different ratios of fiber/gypsum: 0/100, 2/98, 5/95, 10/90 and 20/80. The suspensions had a total solid content of 2.4 wt % (i.e. 48 g O.D. in 2 L).

Mixture 3. Suspension 1 and the refined Kraft suspension were combined together by stirring with an overhead stirrer for 10 minutes, to prepare mixtures having the following different ratios of fiber/gypsum: 0/100, 2/98, 5/95, 10/90 and 20/80. The suspensions had a total solid content of 2.4 wt % (i.e. 48 g O.D. in 2 L).

Mixture 4. Suspension 1 and the glass fibers were combined together in a British disintegrator for 30 minutes to prepare mixtures having the following different ratios of fiber/gypsum: 0/100, 2/98, 5/95, 10/90 and 20/80. The suspensions had a total solid content of 2.4 wt % (i.e. 48 g O.D. in 2 L).

(c) Preparation of a High Basis Weight Fiber/Gypsum Pad

Pads of mixtures 2, 3 and 4 were filtered and prepared according to the protocol described in section I(c).

IV. Mechanical Testing

Figure 3:
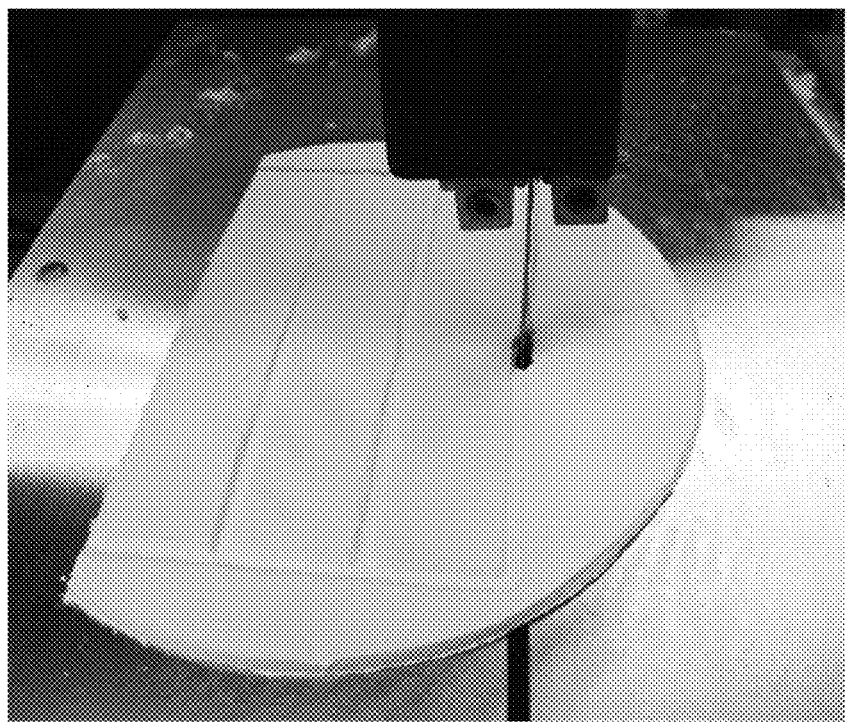
FIG. 3 shows exemplary photographs of samples cut for three-point bending tests in the studies of the present disclosure: (A) exemplary CF/gypsum pad cutting; (B) exemplary sample of CF/gypsum pad for flexural test; (C) exemplary commercial gypsum panel core cutting; and (D) exemplary sample of commercial gypsum panel core for flexural test.
Figure 3:
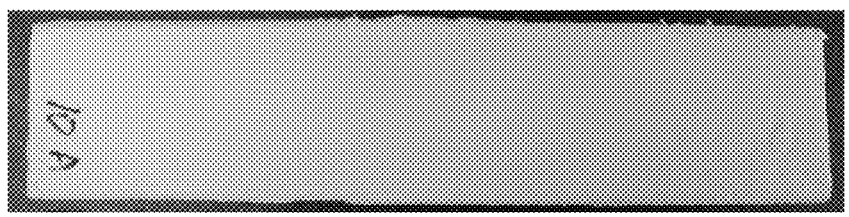
Figure 3:
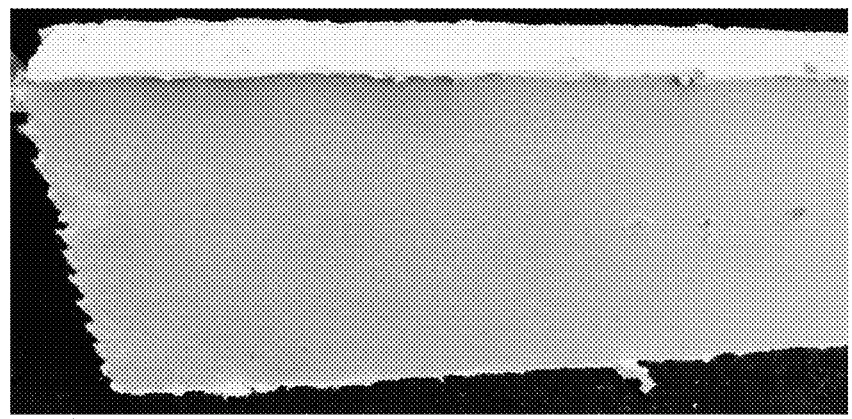
Figure 3:
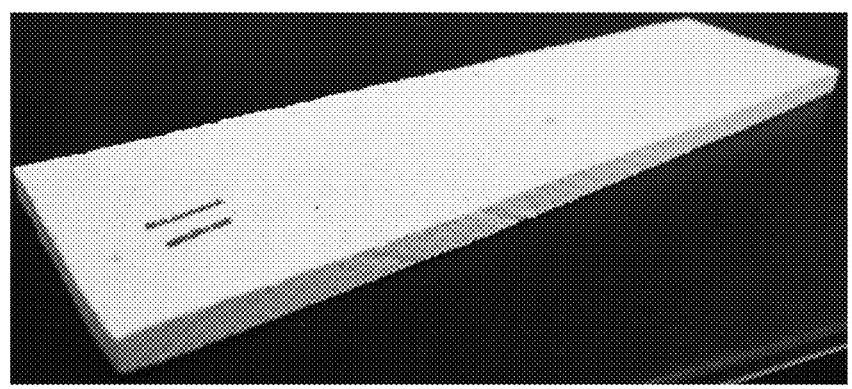

Samples were cut in rectangular shapes with dimensions of 2.7 cm in width, 12.3 cm in length, and 3.5 to 4.5 mm in thickness (FIG. 3). Samples were conditioned for at least 24 hours at 50% humidity and 23° C. Mechanical tests were performed using an Instron equipped with a three-point loading fixture and a 2 kN load cell. A span/thickness ratio of 16 was used for all tests (required by ASTM D790). The test speed was fixed to 1.5 mm/min.

Example 1

Cellulose Filament-reinforced Gypsum Pads

The present studies investigated the reinforcement of conventional gypsum core by CF. Such CF-reinforced gypsum pads may be prepared, for example using papermaking technology to mimic the conventional gypsum core. The conventional drywall manufacturing process may also be used to prepare CF-reinforced gypsum cores. CF-reinforced gypsum cores having a similar density to conventional drywall core can be prepared which may have, for example, a higher strength and/or higher nail pull resistance than conventional cores. CF-reinforced thinner gypsum pad/board can also be prepared with/without facing paper.

(a) Comparison of CF/Gypsum Cores with a Commercial Gypsum Core

I. Photomicrographs

Figure 4:
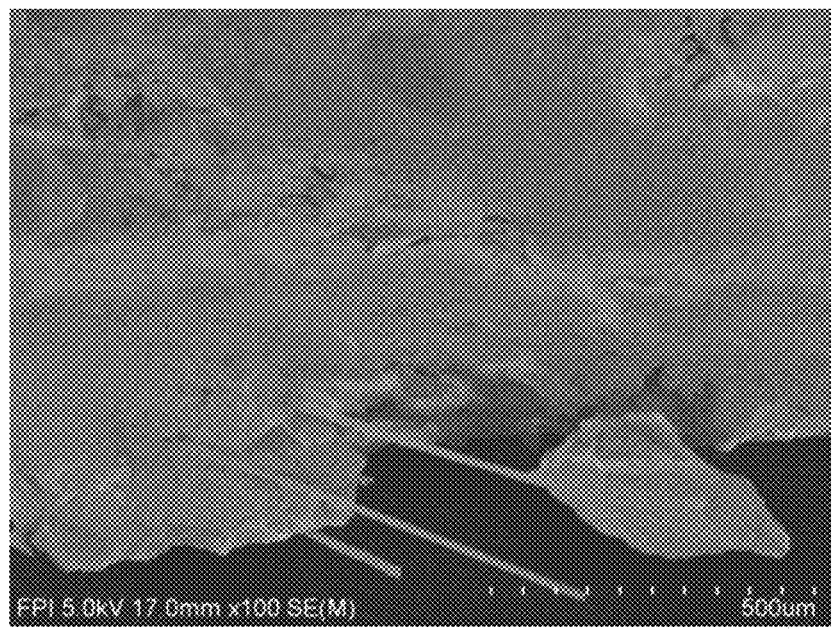
FIG. 4 shows exemplary scanning electron microscopy (SEM) images of (A) a conventional commercial gypsum core; (B) a CF/gypsum pad with 2% CF according to an example of the present disclosure; and (C) a high resolution image of the rectangular area of the CF/gypsum pad indicated in (B)
Figure 4:
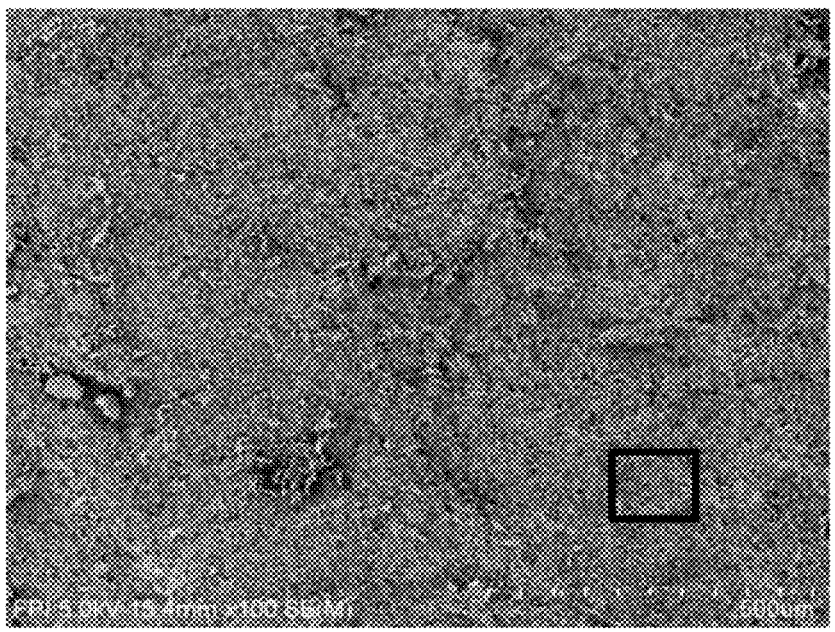
Figure 4:
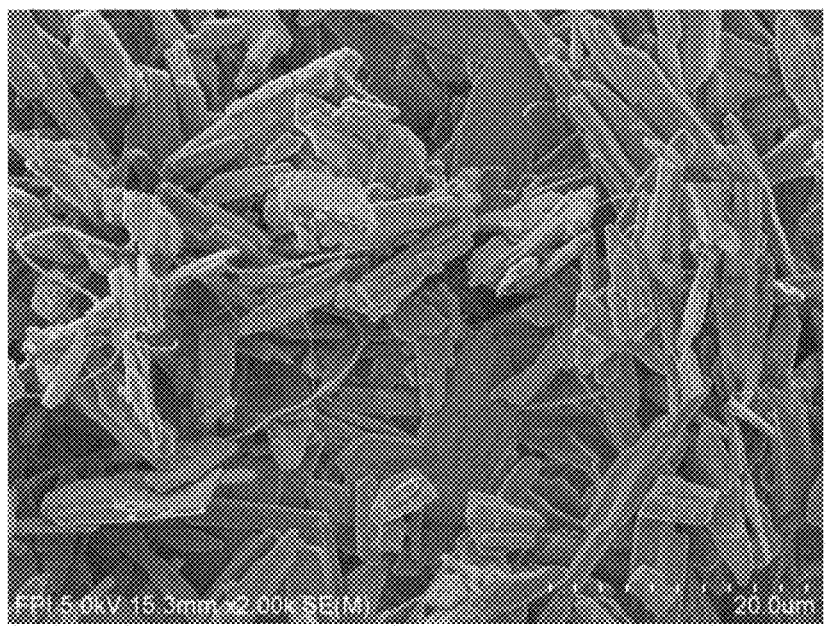

The conventional gypsum core and CF/gypsum pad were both examined using Scanning Electron Microscopy (SEM) (Hitachi FE-SEM SU-70, using an acceleration voltage of 15 kV). Samples were coated with platinum at 8 Kv, and 308/206 µAmps. FIG. 4 shows the morphologies of the commercial gypsum core (A) and the CF/gypsum pad (B, C) as viewed by SEM.

II. Flexural Properties

The CF/gypsum pads prepared as described herein in the general experimental details section I(c) have densities in the range of 0.66-0.77 g/cm³. Therefore they can be compared to the gypsum core of a commercial gypsum panel, such as SHEETROCK® fire code CGC which has a density of about 0.67 g/cm³.

Figure 5:
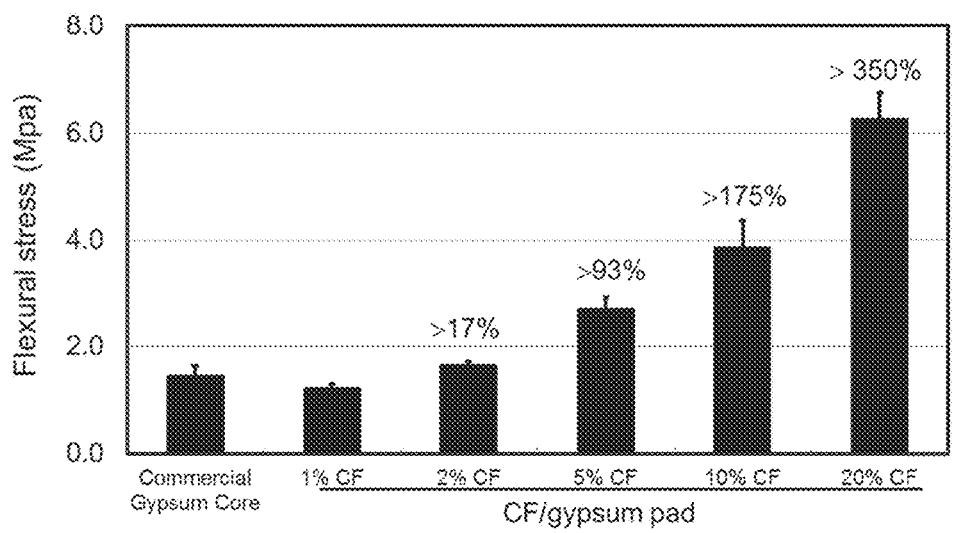
FIG. 5 shows plots of (A) flexural stress of commercial gypsum core and CF/gypsum pad samples with CF ratios of 1%, 2%, 5%, 10% and 20% according to an example of the present disclosure; and (B) flexural modulus of commercial gypsum core and CF/gypsum pad samples with CF ratios of 1%, 2%, 5%, 10% and 20% according to an example of the present disclosure.
Figure 5:
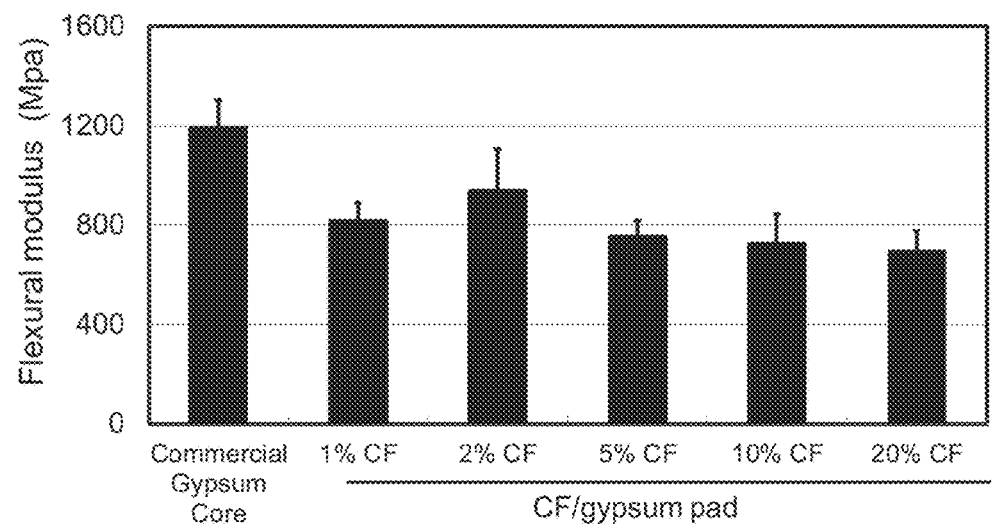

The flexural properties of the commercial gypsum core and the high basis weight CF/gypsum pads prepared in the present studies having various CF to gypsum ratios are presented in FIG. 5.

The flexure test method applied to the samples measures the behavior of materials when they are subjected to a simple beam loading.

The flexural strength of the samples, which refers to their ability to resist deformation under load and corresponds to the maximum amount of bending stress that can be applied before rupture or failure of the material occurs is presented in FIG. 5A. As can be observed in FIG. 5A, the CF/gypsum samples clearly demonstrate their greater strength compared to the gypsum core of a commercial product even at very low CF concentrations.

These results suggest that by adding 2% of CF to gypsum, an increase in strength of over 17% can be attained. A greater strengthening effect is reached by adding higher quantities of CF as shown by the significant increase in flexural stress of samples containing increasing ratios of CF to gypsum (e.g. addition of 20% CF results in an increase in strength of over 350% in comparison to a commercial gypsum core. The flexural modulus of the samples, which provides an indication of stiffness, is presented in FIG. 5B.

(b) CF/Gypsum Slurry Compared to Other Fiber/Gypsum Slurries

I. Photomicrographs

FIG. 6 shows photomicrographs of gypsum mixtures having 10% CF (A), 10% non-refined Kraft fibers (B) and 10% refined Kraft fibers (C). The CF/gypsum image shown in FIG. 6A reveals a more extended CF network entanglement as compared to both non-refined (FIG. 6B) and refined (FIG. 6C) Kraft fiber/gypsum mixtures. While not wishing to be limited by theory, this enhanced interfacial adhesion between fibers and gypsum crystal is at the origin of the improved stress of the CF/gypsum mixtures. The size of the gypsum crystals appears larger in the CF/gypsum mixture image, but this is solely due to the composition of the calcium sulfate suspensions which crystal dimensions may have been promoted by the presence of large crystal seeds.

II. Density

FIG. 7 is a plot comparing the densities of various CF/fiber contents of CF/gypsum pads, non-refined Kraft fiber/gypsum pads and refined Kraft fiber/gypsum pads to that of a commercial gypsum panel core. As shown in FIG. 7, except for the refined Kraft pad between 2 and 10 wt %, all pad densities were observed to be similar to that of the commercial gypsum panel core.

III. Flexural Properties

The flexural properties of CF or fiber/gypsum pads made in the present studies having CF or various types of fibers (non-refined Kraft, refined Kraft or short glass fibers) with different CF or fiber to gypsum ratios are presented in FIG. 8. It is clear from FIG. 8A that CF provides better reinforcement to gypsum as compared to all of the other fibers tested and this is true at all fiber to gypsum ratios. The superior reinforcement ability of CF is even more marked at increasing CF ratio and shows a reinforcement of larger than 250% at 20% CF content. In FIG. 8B, it can be seen that CF also produces the highest modulus at all fiber to gypsum ratios as compared to the other fibers. The samples with CF had significantly greater stiffness compared to all other tested fibers.

(c) Summary

A novel CF-reinforced gypsum core was produced. At the same density, the CF/gypsum cores were found to be much stronger than the gypsum core in a commercial gypsum board. The strength increased with CF content. Compared to other fibers tested for reinforcing gypsum board, CF was more effective in increasing flexural stress and stiffness. It was observed in photomicrographs that CF is fully entangled with gypsum crystals.

Since the CF/Gypsum cores are much stronger than conventional gypsum cores, while not wishing to be limited by theory, a thinner CF/gypsum core/board can be made with similar strength to a conventional gypsum core/board, as a new type of drywall. For example, such a panel can be made by using wet-lad technology or by adapting papermaking technology (for example stacked sheets). Such a panel can also be made by using the conventional technique for manufacturing gypsum boards.

Example 2

Ultra-light Foamed CF Gypsum Cores

Conventional gypsum construction boards are heavy, which may, for example, cause quick fatigue to installers and/or high transportation costs. An objective of the present study was to develop an ultra-light weight CF/gypsum core by a foaming process to reduce its weight without affecting its strength. The ultra-light weight CF/gypsum construction board could possess, for example properties of fast and easy panel installation, high flexibility and/or good sound absorption. Such ultra-light weight foamed CF/gypsum core may also, for example, have an ultra-low density, a high strength and/or higher nail pull resistance than conventional cores.

(a) Preparation of an Ultra-light Weight CF/Gypsum Core

The CF slurry was diluted and put into mixing equipment, then mixed with the gypsum slurry. The desired amounts of foaming agents, settling accelerators, retardants, and binders were added into the system, continuing mixing for the desired time. The foamed mixtures were then placed into a mold with a screen to drain water. To accelerate setting, an infrared dryer and a high powered light were employed.

The foaming agent is useful for generating foam that imparts a plurality of bubbles in the slurry during formation of the reaction product. The foaming agent may be any type of foaming agent, including, but not limited to, an anionic surfactant, cationic surfactants, inorganic surfactant, etc., or a combination thereof. In the present studies, the foaming agent was Dowfroth™ 250.

The settling accelerator can be, for example, sulphate salts of a weak alkali, such as potassium aluminium sulphate, aluminium sulphate additives, zinc sulphate, and copper sulphate and is used, for example, for reducing the time for hardening or accelerating the solidifying of foamed gypsum.

The retardant does not affect the size of the bubbles inside, but it retards the setting of the gypsum, for example in warm weather. A solid soluble acid retarder, such as citric, tartaric or oxalic acid, forms an insoluble compound with calcium hydrate. For example, if the setting is too rapid, it will not be possible to spread or lay and level of the gypsum slurry to a proper shape.

Synthetic binders or adhesives, such as but not limited to polyvinyl alcohol (PVA), polyvinyl acetate (PVAc) and melamine formaldehyde (MF) can be used, for example, to establish a strengthened permanent bond in the final dry state. In the present studies polyvinyl acetate was used.

The hardener of PVAc used in the present studies, p-toluenesufonic acid monohydrate, can provide, for example an increased curing rate, a useful viscosity, better adhesion and/or greater tolerance towards substrate type.

The experimental parameters tested were:
Consistency: 16%, 20%, 24%
Ratio of CF to gypsum: 20/80, 10/90, 5/95, 2/98, 0/100
Frother (DOWFROTH 250 FLOTATION FROTHER (99% propylene oxide methanol adduct and 1% potassium hydroxide)): 0, 1.5%, 3%
Polyvinyl acetate (PVAc): 2%, 4%, 6%
Hardener to PVAc (p-toluenesufonic acid monohydrate): 0, 10%, 20%, 30%
Starch: 0, 0.5%, 1%
Mixing time: 2 min, 4 min, 8 min
Infrared drying time: 30 min (b) Characterization of Ultra-Light Weight CF/Gypsum Cores I. Density Table 1 provides an overview of the densities obtained for samples prepared using different parameters.

TABLE 1

| | Sample ID | Solid Cont., % | CF/ Gypsum | Dosage of Dow frother, % | Dosage of starch, % | Dosage of PVAc, % | Dosage of hardener, % | Mixing time, min | Density, g/cm³ |
|---|---|---|---|---|---|---|---|---|---|
| Solid content | 1 | 16 | 5/95 | 1.5 | 0 | 4 | 0.8 | 4 | 0.26 |
| | 2 | 20 | 5/95 | 1.5 | 0 | 4 | 0.8 | 4 | 0.41 |
| | 3 | 24.5 | 5/95 | 1.5 | 0 | 4 | 0.8 | 4 | 0.6 |
| Frother | 4 | 16 | 5/95 | 0 | 0 | 4 | 0.8 | 4 | 0.41 |
| | 5 | 16 | 5/95 | 1.5 | 0 | 4 | 0.8 | 4 | 0.22 |
| | 6 | 16 | 5/95 | 3 | 0 | 4 | 0.8 | 4 | 0.23 |
| PVAc | 7 | 16 | 5/95 | 1.5 | 0 | 0 | 0.8 | 4 | 0.59 |
| | 8 | 16 | 5/95 | 1.5 | 0 | 2 | 0.8 | 4 | 0.30 |
| | 9 | 16 | 5/95 | 1.5 | 0 | 4 | 0.8 | 4 | 0.22 |
| | 10 | 16 | 5/95 | 1.5 | 0 | 6 | 0.8 | 4 | 0.27 |
| Hardener | 11 | 16 | 5/95 | 1.5 | 0 | 4 | 0 | 4 | 0.2 |
| | 12 | 16 | 5/95 | 1.5 | 0 | 4 | 0.4 | 4 | 0.23 |
| | 13 | 16 | 5/95 | 1.5 | 0 | 4 | 0.8 | 4 | 0.22 |
| | 14 | 16 | 5/95 | 1.5 | 0 | 4 | 1.2 | 4 | 0.23 |
| Mixing time | 15 | 16 | 5/95 | 1.5 | 0 | 4 | 0.4 | 2 | 0.24 |
| | 16 | 16 | 5/95 | 1.5 | 0 | 4 | 0.4 | 4 | 0.23 |
| | 17 | 16 | 5/95 | 1.5 | 0 | 4 | 0.4 | 8 | 0.32 |
| Starch | 18 | 16 | 5/95 | 1.5 | 0 | 4 | 0.4 | 2 | 0.24 |
| | 19 | 16 | 5/95 | 1.5 | 0.5 | 4 | 0.4 | 2 | 0.24 |
| | 20 | 16 | 5/95 | 1.5 | 1.0 | 4 | 0.4 | 2 | 0.27 |

II. Morphology

FIG. 9 shows samples of CF-reinforced core for an ultra-light foamed gypsum board having a density of about 0.2 g/cm³. FIG. 10 shows photomicrographs of an exemplary CF/gypsum foam (FIG. 10A) as well as enlargements of point 1 (FIG. 10B) and 2 (FIG. 10C). The sample was prepared following the recipe listed in Sample ID 16 of Table 1.

Example 3

Production of CF/Gypsum Handsheets/Paper Rolls with Very High Gypsum Contents (>80%)

Ultra-highly filled sheets of calcium sulfate held together by a network of cellulose filaments and minimal quantities of common retention aids were prepared in the present studies. Work at the laboratory scale using a papermaking method was first done to study the feasibility of the concept and to investigate whether upscaling the production on a paper machine was possible.

Ultra-highly filled CF/gypsum sheets were then successfully produced at a semi-industrial level on a pilot paper machine using a conventional configuration and without making significant changes to the process. A CF loading as low as 8% was useful, for example, to provide enough strength to the CF/gypsum wet web to allow it to be run at 400 m/min on the paper machine and to produce strong, self-sustaining paper structures. Several CF/gypsum paper rolls were produced at a basis weight ranging between 150 and 300 gsm and with CF contents varying between 8 and 25%. Sheet thicknesses varied between 0.2 and 0.3 mm and densities between 1.05 and 1.1 g/cm$^3$.

I. Preparation of a Highly Filled CF/Gypsum Handsheet at the Laboratory Scale (a) Materials CF made from NBSK at a conventional refining intensity and at a specific energy of about 5000 kwh/t used in either wet form (about 30% solids) or in the form of a dry roll.

Calcium sulfate hemihydrate $CaSO_4.5H_2O$ (No. 1 molding) was purchased in powder form from USG. The retention aids (Percol™ 175 and bentonite) were obtained from BASF.

(b) Preparation of a CF/Gypsum Suspension in Water

Suspension 1. A 15 wt % $CaSO_4.2H_2O$ gypsum suspension was prepared by mixing vigorously $CaSO_4.0.5H_2O$ with deionized water at room temperature for 20 minutes in mixing equipment comprising a pulper, blender, high speed mixer, etc. Optical microscopy and conductivity were used to confirm the conversion of $CaSO_4.0.5H_2O$ into $CaSO_4.2H_2O$ which exhibits a characteristic rod-like structure. The conductivity of the converted $CaSO_4.2H_2O$ was also measured and was expected to be between 2 and 3 mS/cm. After complete conversion to calcium sulphate dihydrate, the filler was stored as prepared and re-dispersed when needed by gentle stirring. Suspension 1 was used for producing saturated water for handsheet preparation.

Suspension 2. The preparation of the CF/gypsum suspension was performed in mixing equipment, comprising a pulper, blender and high speed mixer, with high speed mixing. First, the shredded CF film was disintegrated in 50° C. warm water at 4.0%(w/w) for 15 minutes. Second, the chosen amount of calcium hemihydrate powder ($CaSO_4.0.5H_2O$) was added with water and mixed for another 15 minutes to obtain a suspension of CF/gypsum with a consistency of 4.0%(w/w). The ratios of CF/gypsum were 10/90 and 20/80.

(c) Preparation of CF/Gypsum Sheet with Basis Weight of 200 Gsm

The CF/gypsum handsheets were made in a square shape (12×12 inch$^2$). Before adding into the deckle, the CF/gypsum slurry was diluted with saturated gypsum solution to 2.8% (w/w) and stirred at 600 rpm for one minute, then the CPAM aqueous solution (Percol™ 175) with a consistency of 0.3 wt % was added into the system and stirred for 15 seconds, followed by adding bentonite solution with a consistency of 5.0 wt %, stirring for another 15 seconds. The consistency of the suspension in the deckle was 0.7%(w/w).

After forming, the sheets were couched, pressed twice with a manual roll, and dried using a drum dryer at 50° C. The target basis weight of handsheets was 200 gsm. All sheets were made using deionized water fully saturated with calcium sulphate dihydrate to avoid changes in the filler content of the resulting sheet due to dissolution of the PCS in water.

(d) Wet Web Strength Test of Wet CF/Gypsum Handsheet

To study whether CF/gypsum wet sheets were strong enough to be run on a paper machine, the wet web strength of sheets were tested. As can be seen in FIG. 12, the wet web strength increased with solid content. As can be seen from FIG. 13, the wet web breaking length also increased with solid content. As can be seen in FIGS. 12 and 13, when the solid content is over 50%, the tensile energy absorption (TEA) index is higher than 75 mJ/g and the breaking length is longer than 0.11 km. Those skilled in the art of papermaking would appreciate that these results indicate that the strength of the wet CF/gypsum sheet is strong enough for running on a high speed pulp or paper machine.

(e) Summary

Gypsum hemihydrate was easily converted to the dihydrate. CF/gypsum sheet was made using a William square handsheet machine. CF ratios of 10% and 20% were used. The wet web strength of the CF/gypsum sheets is strong enough for paper machine running.

II. Production of CF/Gypsum Paper Rolls with a Very High Gypsum Content (>80%) on a Pilot Scale Paper Machine (a) CF/Gypsum Stock Preparation and Paper Machine Operating Conditions It was proven to be possible to prepare CF/gypsum handsheets with very high gypsum content (as high as 95%) at the laboratory level. The concept was then up-scaled to a semi-industrial level on a pilot papermaking machine. FIG. 14 illustrates the stock preparation procedure 10 for a CF/gypsum sheet production trial. CF was first dispersed in a pilot-scale broke pulper (not shown) at 4% consistency and stored in a storage tank 12. Calcium sulfate hemihydrate ($CaSO_4.1/2H_2O$) was converted into calcium sulfate dihydrate ($CaSO_4.2H_2O$) in a pilot-scale broke pulper (not shown) under mixing conditions at 10% consistency and stored in another storage tank 14. The CF and gypsum suspensions were mixed in a machine chest (MC) 16 at a desired ratio, and the mixture thereby obtained was pumped 18 to a paper machine head box (HB) 20 after mixing with retention aids, such as CPAM 22 and bentonite 24, at the desired dosages, diluted to the desired solid content with process whitewater (WW) 26 and being passed through a screen 28.

The pilot paper machine used to prepare continuous rolls of CF/gypsum includes a twin-wire roll forming section 30 the width of which is 0.46 m, a four-roll, three-nip press section 32 and two Yankee dryers 34. A detailed description of the standard configurations of the machine for paper production have been presented (Crotogino, R., et al., "Paprican's New Pilot Paper Machine," *Pulp & Paper Canada*, Vol. 101, No. 10, 2000, pp. 48-52).

For the production of CF/gypsum sheet, the wet CF/gypsum sheet after the press section 32 at solid content of 60-70% was rolled up without passing through the drying section 34. The paper machine speed was set at 400 m/minute. Further water removal can be done on-line in the drying section 34 of the pilot paper machine or off-line. In this work, the wet rolls of CF/gypsum sheet with different CF content and basis weight were further dried to 90-95% dryness using a post-drier at a temperature of 120° C. and speeds of 10-70 m/min.

(b) Results and Discussion

Real-time monitoring of several parameters during trials was performed to allow adjustment of running conditions when useful. Consistencies of suspensions at different locations in the paper machine (machine chest (MC), white water (WW) and head box (HB)) were measured by gravimetric analysis, while CF to gypsum ratios were determined either by a standard ash test or thermo gravimetric analysis (TGA). As an example, FIG. 15 presents the CF content of suspensions collected at various locations in the paper machine during a paper machine trial. Low CF values recorded for WW indicate high retention of the fiber during the trial, which is useful in papermaking. FIG. 16 shows micrographs of CF/Gypsum slurry in the machine chest at CF levels of (A) about 10% and (B) 20%.

Table 2 summarizes the CF/Gypsum roll production

TABLE 2

| Number of Trials | Total Number of Rolls Produced | Orientation | Basis Weight (g/m²) | CF Content (wt %) | Density (g/cm³) |
|---|---|---|---|---|---|
| 3 | 29 | MD[1] and CD[2] | 150-300 | 8-25 | 1.05-1.1 |

[1]Machine direction.
[2]Cross direction.

CF/gypsum rolls with 80-90% of gypsum dihydrate were produced. To those practicing papermaking, this filler level has never been attained before. The surface morphology of CF/gypsum rolls was examined by scanning electron microscopy (SEM). Extended networks of entangled cellulose filaments and calcium sulfate crystals were observed on both 10% and 20% CF/gypsum sheet surfaces as seen in FIG. 17. The surface appears somewhat smoother for the 20% CF sample which, while not wishing to be limited by theory, suggests a better compaction of material due to the higher number of flexible CF.

The strength of CF/gypsum sheets having various CF to gypsum ratios were tested in traction. Tensile strength (TAPPI T494 om—01) was used. Tensile index results which are shown in FIG. 18 demonstrate that sheets having a higher CF content of 25% are 3 times stronger than sheets having a low CF content. In FIG. 19, the TEA index which provides an indication on the total amount of energy required to break a sheet also reveals that sheets with high CF contents have increased physical performance, with TEA index values that are 4-times higher than those of sheets with 10% CF.

(b) Summary

CF/gypsum sheets were prepared having 10-15% of CF with a basis weight of 200-300 g/m² and 20-30% of CF with a basis weight of 150-200 g/m². This range is not intended to limit the upper grammage of the sheets of the present disclosure. For example, the range attainable could be as high as 5000 g/m² on an industrial pulp or paper machine. The CF network could hold calcium sulfate together so that ultra-highly filled sheets could be prepared. CF and gypsum crystals are homogeneously dispersed in the CF/gypsum sheet. When the CF content was about 20-25%, the Tensile Index and the TEA Index of CF/gypsum sheets was observed to be much higher than that of sheets with lower CF content.

Example 4

Production of CF/Gypsum Laminates by Self-bonding Under Pressure

Objectives of this study included to evaluate if CF/gypsum sheet can be laminated by self-bonding under pressure at various CF contents (10-25 wt %); and to compare the CF/gypsum laminates to Kraft-fiber/gypsum sheet laminates. Multi-ply laminates of CF/gypsum sheets were produced by a wet lamination process which involved stacking a number of wet or rewetted sheets (up to 60% solid content) of CF/gypsum and pressing them together under low pressure (<400 psi). Self-bonding between layers occurred when the compressed stack of wet sheets dried at low temperature (25° C.-70° C.). Very high density and strong laminates were produced by such a process.

(a) Materials

CF/gypsum sheets from the paper machine trial of Example 3. Single sheet BW: 150 to 300 GSM (density: 1.05 to 1.1 g/cm³); CF content: 8 to 25 wt %; Fiber orientation: MD and CD; Retention aids: CPAM and bentonite.

Figure 1:
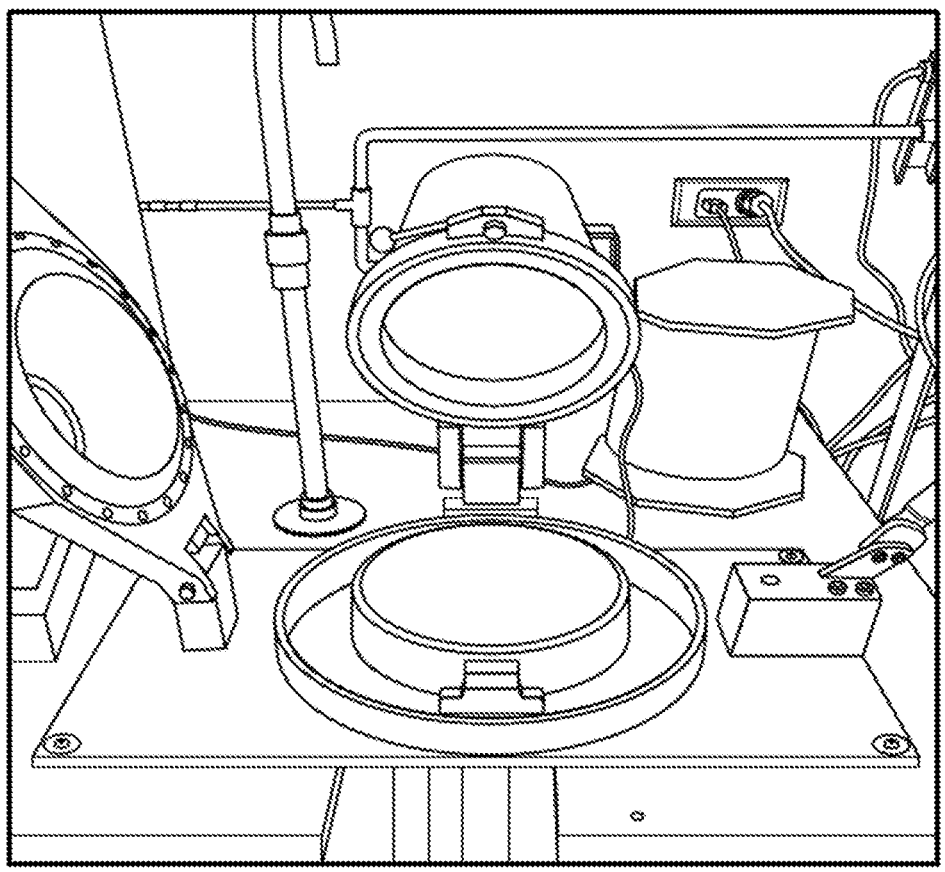
FIG. 1 shows an exemplary photograph of a handsheet former that was used in the studies of the present disclosure.

CF/gypsum sheets made in the laboratory with the handsheet former shown in FIG. 1. Single sheet BW: 200 gsm (density: 0.6-0.7 g/cm³); CF was made from NBSK at conventional refining intensity at a specific energy of about 5000 kwh/t and it was disintegrated at a consistency of 6.3 wt %; CF content: 10 wt % and 20 wt %; Randomly oriented (no orientation); Filter paper (Whatman #1) was used for the handsheet preparation and no retention aids were used.

Kraft/gypsum sheets made in the laboratory with the handsheet former shown in FIG. 1. Single sheet BW: 200 gsm (density: 0.6-0.7 g/cm³); randomly oriented (no orientation); Fiber type: refined Kraft pulp (400 CSF); Kraft content: 10 and 20 wt %; Filter paper (Whatman #1) was used for the handsheet preparation and no retention aids were used.

(b) Lamination of CF/Gypsum Sheets

FIG. 20 provides a schematic illustration of the two lamination methods that were compared in the present studies:

Method A: As shown in the schematic in FIG. 20A, wet sheets of CF/gypsum, taken directly at the papermaking machine outfeed rollers and having a solid content of 60%, were stacked together and pressed. At solid content of ~60%, two layers of CF/gypsum boards can self-bond under pressure.

Method B. As shown in the schematic in FIG. 20B, dried sheets of CF/gypsum, which had been dried on the paper machine post-dryer, were rewetted with water ① to reach a solid content of 60%, conditioned overnight ② to allow complete water reabsorption and pressed ③. When re-wet to solid content of about 60%, multilayers of CF/gypsum self-bond under pressure.

In both cases, a number of sheets were stacked together and pressed at room temperature at 375 psi for 10 minutes. Laminates were then dried on a speed-dryer at 50° C. until complete dryness for about 12 hours. It was possible to prepare laminates having various number of layers as shown in FIG. 21, however for mechanical testing a total basis weight of 5500 gsm which corresponds to approximately 25 sheets stacked together was used. The density of the sheets prepared was 1.3 to 1.4 g/cm³.

(b) Mechanical Testing

Flexural testing: A 3-D cutting machine (Roland, model (MDX-40A)) was used to cut samples with proper dimensions for testing. For flexural tests, samples were cut into a rectangular shape with dimensions of 0.5 inches width, 5 inches long and 3.5 to 4.5 mm thicknesses (FIG. 21B). Samples were either cut parallel or perpendicular to the paper machine direction. Samples were conditioned for at least 24 hours at 50% humidity and 23° C. Flexural tests were performed with an Instron equipped with a three-point loading fixture and a 2 kN load cell. A span/thickness ratio of 16 was used for all tests (required by ASTM D790). The test speed was fixed to 1.5 mm/minute.

Tensile testing: A 3-D cutting machine was used to cut dog bone type V samples with thicknesses that varied between 3.5 and 4.5 mm (required by ASTM D638). Samples were either cut parallel or perpendicular to the paper machine direction. Samples were conditioned for at least 24 hours at 50% humidity and 23° C. Tensile tests were performed with an Instron equipped with a traction fixture, serrated clamps and a 2 kN load cell. The test speed was fixed to 10 mm/min.

(c) Physical Properties of Laminates

Data obtained on the flexural strength of samples, which refers to their ability to resist deformation under load and corresponds to the maximum amount of bending stress that can be applied before rupture or failure of the material occurs is presented in FIG. 22. As can be observed from FIG. 22, the strength of CF/gypsum samples increased with CF concentration. From 10% to 25% CF the flexural strength increased by at least 150%.

Data obtained on the flexural modulus of samples, which provides an indication of stiffness, is presented in FIG. 23. At 10% CF, the modulus is around 2600 MPa, while at 25% it increases to 3200 MPa. This increase in stiffness is less significant than what was previously seen with strength and this can be due, while not wishing to be limited by theory, to the naturally high stiffness of calcium sulfate which is observed at low CF content.

(d) The Effect of CF/Gypsum Orientation on Flexural and Tensile Strength

The orientation of CF/gypsum was observed to have little effect on flexural stress but have much influence on the flexural modulus as seen in FIG. 24, where the modulus nearly doubles with CF/gypsum orientation. In the case of tensile results, the opposite trend is observed as CF/gypsum orientation has an effect on the stress but no impact on the modulus (FIG. 25). The stress almost doubles with CF/gypsum orientation. Therefore, the CF/gypsum orientation produced by the papermaking process provided increased reinforcement in the direction of orientation, which may, for example be an advantage over conventional processes which do not permit fiber/gypsum orientation.

(e) Comparison Between CF and Kraft Fibers as Reinforcing Agents in the Preparation of Fiber/Gypsum Laminates.

Laminates having 10% and 20% CF and refined Kraft fibers were prepared and compared. Laminates were made from non-oriented sheets prepared in the laboratory. It was not possible to prepare highly filled Kraft/gypsum sheets on the paper machine. FIG. 26A shows that the flexural stress of laminates made with CF is higher than those prepared with refined Kraft both at 10 and 20% fiber loadings. The stress is three times higher when CF is used instead of Kraft fibers. The modulus also doubles when CF fibers are used in comparison to Kraft fibers (FIG. 26B). These results clearly demonstrate the increased stress and modulus of laminates comprising CF fibers over laminates comprising a corresponding amount of refined Kraft fibers, which were known to be the best chemical wood pulps for reinforcement.

Tensile results demonstrate a similar trend between fibers, as the reinforcing potential of CF is greater than that of Kraft fibers (KF). For example, the results in Table 3 clearly show that both tensile strength and modulus of CF-gypsum laminates are much greater than those of Kraft-gypsum laminates having corresponding levels of fiber by several orders of magnitude.

TABLE 3

Specific flexural strength and modulus of a CF/gypsum laminate and a commercial gypsum core

| | Fiber (%) | Tensile stress (MPa) | S.D. | Tensile Modulus (MPa) | S.D. |
|---|---|---|---|---|---|
| CF (non-orientated) | 10 | 8.8 | 0.3 | 301 | 28 |
| | 20 | 18 | 1 | 436 | 39 |

TABLE 3-continued

Specific flexural strength and modulus of a CF/gypsum laminate and a commercial gypsum core

| | Fiber (%) | Tensile stress (MPa) | S.D. | Tensile Modulus (MPa) | S.D. |
|---|---|---|---|---|---|
| KF | 10 | 0.7 | 0.3 | 22 | 11 |
| | 20[1] | — | — | — | — |

[1]KF/gypsum laminate samples with 20% KF could not be prepared due to the weakness of 20% Kraft fiber.

Densities of CF/gypsum laminates which vary between 1.1 and 1.3 g/cm$^3$ are much denser than densities of conventional gypsum boards which range between 0.6 to 0.8 g/cm$^3$. As seen in Table 4, tensile strength and stiffness were normalized by density. Despite this, the mechanical performance of CF/gypsum laminates is still much higher than conventional gypsum core.

TABLE 4

Specific flexural strength and modulus of a CF/gypsum laminate and a commercial gypsum core

| | Density (g/cm$^3$) | Specific Flexural Strength (MPa/gcm$^{-3}$) | Specific Flexural Modulus (GPa/gcm$^{-3}$) |
|---|---|---|---|
| Commercial gypsum core | 0.67 | 2 | 1.8 |
| CF/Gypsum laminates (10-20%) | 1.3 | 10-15 | 1.5-2.3 |

(f) Summary

CF/gypsum sheets, once moist at their surface, can self-bond under pressure to form a coherent structure, thus allowing the design and fabrication of novel CF/gypsum laminated board of any thickness. CF reinforced the physical properties of such gypsum laminate panels. The flexural stress of CF/gypsum laminates was higher than KF/gypsum laminates. The flexural modulus of oriented CF laminates was higher than that of KF/gypsum laminates. The stiffness of board was not affected by fiber orientation but was affected by the type of fibers: boards reinforced with CF being stiffer than those reinforced with KF. CF/gypsum laminates were denser, stronger and stiffer than conventional core.

Example 5

Lightweight Gypsum Panels Using CF/Gypsum Laminates as Skins and a Honeycomb or Corrugate Structure of CF/Gypsum as Core Ultra-light weight CF/gypsum boards were produced by gluing one layer of CF/gypsum laminate on each side of a honeycomb core or corrugate core made of CF/gypsum sheets. A suitable glue can be, for example, starch, polyvinyl alcohol, polyvinyl acetate, polyacrylic acid etc. To produce the honeycomb core, a single CF/gypsum sheet or a two-layer CF/gypsum laminate was used. Three to ten-layer laminates were used to make the facing paper, while two to five-layer laminates were used to make the back paper. The thickness of novel ultra-light weight CF/gypsum board was based on the width of the honeycomb core. An 8 mm width was used in the present studies although it is also possible to use, for example, widths of from about 5 mm to about 10 mm. Widths of up to about 1 inch (about 25.4 mm), for example, may also be possible for such gypsum boards To produce the corrugate structure core, the wet CF/gypsum sheet or laminate (between 60% and 80% solid content) was passed through a high speed and high temperature corrugate-forming equipment.

A new type of lightweight gypsum panel with high strength and low density was prepared. The panel was made entirely of CF/gypsum handsheets that were laminated and/or corrugated. The two traditional gypsum facing papers or so-called skins which conventionally are heavy paper, manila paper or newsliner were replaced by two laminates made from a few layers of CF/gypsum sheets (10% or 20%). An advantage of using this new skin formulation as compared to the conventional Kraft paper is that the CF/gypsum facing papers possess increased fire resistance and are easy to be coated, dyed or painted.

The conventional gypsum core was substituted by a corrugated or a honeycomb structure made of a single or a thin laminate of CF/gypsum hand sheets. A hand-made prototype of this novel gypsum panel is shown in FIG. 27, where a honeycomb structure (A) is sandwiched between two CF/gypsum laminates (B). This product had a very low density (much lower than conventional panels) of about 0.25 g/cm$^3$ and still exhibited very high mechanical performance compared to ultra-light panel found on the market. The empty spaces created by the corrugated or honeycomb structure can be filled, for example, with a low-density mineral like perlite or a polymer to provide increased strength and/or fire-retardant and/or sound absorption properties.

While a description was made with particular reference to the specific embodiments, it will be understood that numerous modifications thereto will appear to those skilled in the art. Accordingly, the above description and accompanying drawings should be taken as specific examples and not in a limiting sense.

What is claimed is:

1. A gypsum panel comprising a first multi-layer sheet, a second multi-layer sheet and a core comprising a honeycomb or corrugated structure sandwiched between said first multi-layer sheet and said second multi-layer sheet, said first multi-layer sheet, said second multi-layer sheet and said honeycomb or corrugated structure each comprising cellulose filaments and $CaSO_4.2H_2O$.

2. The gypsum panel of claim 1, wherein said first multi-layer sheet is a facing, sheet and has from 2 to 10 layers.

3. The gypsum panel of claim 1, wherein said second multi-layer sheet is a backing sheet and has from 2 to 5 layers.

4. The gypsum panel of claim 1, wherein the density of said gypsum panel is less than about 0.45 g/cm$^3$.

5. The gypsum panel of claim 1, wherein the density of said gypsum panel is from about 0.20 g/cm$^3$ to about 0.30 g/cm$^3$.

* * * * *

UNITED STATES PATENT AND TRADEMARK OFFICE
CERTIFICATE OF CORRECTION

PATENT NO. : 10,011,528 B2
APPLICATION NO. : 14/876244
DATED : July 3, 2018
INVENTOR(S) : Dorris et al.

Page 1 of 1

It is certified that error appears in the above-identified patent and that said Letters Patent is hereby corrected as shown below:

In the Claims

Claim 1, Column 50, Line 17, "and CaSO4.2H2O" should read -- and CaSO4•2H2O --

Signed and Sealed this
Thirteenth Day of November, 2018

Andrei Iancu
*Director of the United States Patent and Trademark Office*